United States Patent
Moss et al.

(10) Patent No.: US 12,534,916 B2
(45) Date of Patent: Jan. 27, 2026

(54) MOUNTING DEVICE FOR A METAL PANEL

(71) Applicant: RMH Tech LLC, Colorado Springs, CO (US)

(72) Inventors: Jonathon Moss, Grandview, TX (US); Dustin M.M. Haddock, Colorado Springs, CO (US)

(73) Assignee: RMH Tech LLC, Colorado Springs, CO (US)

( * ) Notice: Subject to any disclaimer, the term of this patent is extended or adjusted under 35 U.S.C. 154(b) by 0 days.

(21) Appl. No.: 18/634,432

(22) Filed: Apr. 12, 2024

(65) Prior Publication Data

US 2024/0352735 A1 Oct. 24, 2024

Related U.S. Application Data

(60) Provisional application No. 63/459,391, filed on Apr. 14, 2023.

(51) Int. Cl.
*E04D 3/36* (2006.01)
*E04F 13/00* (2006.01)
(Continued)

(52) U.S. Cl.
CPC ............. *E04D 3/36* (2013.01); *E04F 13/00* (2013.01); *F16B 2/065* (2013.01); *F16B 5/065* (2013.01)

(58) Field of Classification Search
CPC .. E04D 3/36; E04F 13/00; F16B 2/065; F16B 5/065
See application file for complete search history.

(56) References Cited

U.S. PATENT DOCUMENTS

| | | | |
|---|---|---|---|
| 42,992 A | 5/1864 | Howe | |
| 97,316 A | 11/1869 | Rogers | |

(Continued)

FOREIGN PATENT DOCUMENTS

| | | | |
|---|---|---|---|
| AT | 13076 | 8/1903 | |
| AT | 26329 | 11/1906 | |

(Continued)

OTHER PUBLICATIONS

"6 Pcs Solar Panel Mid Clamps, Aluminum Solar Panel Brackets Roof Solar Mid Clamp Mounting Accessories Solar Mid Clamp for Solar Panel Mounting," Amazon, Feb. 14, 2023, 6 pages [retrieved online Mar. 27, 24 from: tinyurl.com/45tunvth].

(Continued)

*Primary Examiner* — Monica E Millner
(74) *Attorney, Agent, or Firm* — Sheridan Ross P.C.

(57) ABSTRACT

A mounting system selectively engageable to a panel projection extending from a metal panel defining a surface of a building. The mounting system comprises a mounting device with a body with a wall. First and second legs extend from the wall and are flexible with respect to the wall. The first leg comprises a first aperture that is unthreaded and which has a first interior diameter. The second leg comprises a second aperture which has a second interior diameter that is less than the first interior diameter. The second aperture may optionally be threaded. The mounting system further comprises a clamping fastener with a shaft that may extend into the first aperture and out of the second aperture. The clamping fastener may be tightened to draw the first and second legs together to engage the panel projection and removably secure the mounting device to the panel projection.

20 Claims, 14 Drawing Sheets

(51) Int. Cl.
*F16B 2/06* (2006.01)
*F16B 5/06* (2006.01)

(56) References Cited

U.S. PATENT DOCUMENTS

| | | |
|---|---|---|
| 106,580 A | 8/1870 | Hathorn |
| 189,431 A | 4/1877 | Creighton |
| 224,608 A | 2/1880 | Rendle |
| 250,580 A | 12/1881 | Rogers |
| 332,413 A | 12/1885 | List |
| 386,316 A | 7/1888 | Hawthorne |
| 405,605 A | 6/1889 | Sagendorph |
| 407,772 A | 7/1889 | Curtis et al. |
| 446,217 A | 2/1891 | Dickelman |
| 459,876 A | 9/1891 | Powers |
| 472,014 A | 3/1892 | Densmore |
| 473,512 A | 4/1892 | Laird |
| 491,173 A | 2/1893 | Hayward |
| 507,776 A | 10/1893 | Berger et al. |
| 529,774 A | 11/1894 | Baird |
| 602,983 A | 4/1898 | Folsom |
| 733,697 A | 7/1903 | Chronik |
| 756,884 A | 4/1904 | Parry |
| 831,445 A | 9/1906 | Kosmatka |
| 881,757 A | 3/1908 | Winsor |
| 884,850 A | 4/1908 | Peter |
| 927,522 A | 7/1909 | Gery |
| 933,784 A | 9/1909 | Peter |
| 939,516 A | 11/1909 | Laird |
| 942,693 A | 12/1909 | Wintermute |
| 1,054,091 A | 2/1913 | Darnall |
| 1,085,474 A | 1/1914 | Peterson |
| 1,136,460 A | 4/1915 | Wright |
| 1,230,363 A | 6/1917 | Baird |
| 1,279,669 A | 9/1918 | Deming |
| 1,330,309 A | 2/1920 | Dixon |
| 1,399,461 A | 12/1921 | Childs |
| 1,463,065 A | 7/1923 | Sieger |
| 1,465,042 A | 8/1923 | Hruska |
| 1,511,529 A | 10/1924 | Standlee |
| 1,620,428 A | 3/1927 | Becker |
| 1,681,830 A | 8/1928 | White |
| 1,723,166 A | 8/1929 | Hayman |
| 1,735,927 A | 11/1929 | Shaffer |
| 1,735,937 A | 11/1929 | Shaffer |
| 1,780,852 A | 11/1930 | Sullivan |
| 1,794,976 A | 3/1931 | Mueller |
| 1,812,009 A | 6/1931 | Lenke |
| 1,893,481 A | 1/1933 | Adams |
| 1,933,536 A | 11/1933 | Awbrey |
| 1,946,862 A | 2/1934 | Koch, Jr. |
| 1,957,933 A | 5/1934 | Brandl |
| 2,022,541 A | 11/1935 | Faistenhammer |
| 2,079,768 A | 5/1937 | Levow |
| 2,150,497 A | 3/1939 | Fernberg |
| 2,183,008 A | 12/1939 | Camp |
| 2,183,844 A | 12/1939 | Murphy |
| 2,192,720 A | 3/1940 | Tapman |
| 2,201,320 A | 5/1940 | Place |
| 2,243,322 A | 5/1941 | Uum |
| 2,250,401 A | 7/1941 | Sylvester |
| 2,274,010 A | 2/1942 | Stellin |
| 2,340,692 A | 2/1944 | Ridd |
| 2,356,833 A | 8/1944 | Doe |
| 2,429,833 A | 10/1947 | Luce |
| 2,443,362 A | 6/1948 | Tinnerman |
| 2,448,752 A | 9/1948 | Wagner |
| 2,457,250 A | 12/1948 | Macomber |
| 2,472,586 A | 6/1949 | Harvey |
| 2,504,776 A | 4/1950 | Woodfield et al. |
| 2,525,217 A | 10/1950 | Glitsch |
| 2,574,007 A | 11/1951 | Anderson |
| 2,658,247 A | 11/1953 | Heuer |
| 2,714,037 A | 7/1955 | Singer et al. |
| 2,730,381 A | 1/1956 | Curtiss |
| RE24,133 E | 3/1956 | Bloedow |
| 2,740,027 A | 3/1956 | Budd et al. |
| 2,808,491 A | 10/1957 | Rhee et al. |
| 2,810,173 A | 10/1957 | Bearden |
| 2,875,805 A | 3/1959 | Flora |
| 2,985,174 A | 5/1961 | Guth |
| 2,997,763 A | 8/1961 | Serfass |
| 3,039,161 A | 6/1962 | Gagnon |
| 3,064,772 A | 11/1962 | Clay |
| 3,095,672 A | 7/1963 | Di Tullio |
| 3,112,016 A | 11/1963 | Peterson |
| 3,136,206 A | 6/1964 | Adams |
| 3,194,524 A | 7/1965 | Trumbull |
| 3,208,119 A | 9/1965 | Seckerson |
| 3,221,467 A | 12/1965 | Henkels |
| 3,231,076 A | 1/1966 | Frieman |
| 3,232,393 A | 2/1966 | Attwood |
| 3,232,573 A | 2/1966 | Berman |
| 3,242,620 A | 3/1966 | Kaiser |
| 3,247,316 A | 4/1966 | Weimer, Jr. |
| 3,269,075 A | 8/1966 | Marini et al. |
| 3,288,409 A | 11/1966 | Bethea, Jr. |
| 3,296,750 A | 1/1967 | Zaleski |
| 3,298,653 A | 1/1967 | Omholt |
| 3,300,935 A | 1/1967 | Giorgio |
| 3,301,513 A | 1/1967 | Masao |
| 3,307,235 A | 3/1967 | Hennings |
| 3,318,057 A | 5/1967 | Norsworthy |
| 3,333,799 A | 8/1967 | Peterson |
| 3,335,995 A | 8/1967 | Pickles |
| 3,341,909 A | 9/1967 | Havener |
| 3,363,864 A | 1/1968 | Olgreen |
| 3,394,524 A | 7/1968 | Howarth |
| 3,411,190 A | 11/1968 | Augier |
| 3,411,252 A | 11/1968 | Boyle, Jr. |
| 3,425,127 A | 2/1969 | Long |
| 3,482,369 A | 12/1969 | Burke |
| 3,495,363 A | 2/1970 | Johnson |
| 3,496,691 A | 2/1970 | Seaburg et al. |
| 3,503,244 A | 3/1970 | Joslin |
| 3,523,709 A | 8/1970 | Heggy et al. |
| 3,527,619 A | 9/1970 | Miley |
| 3,528,050 A | 9/1970 | Hindenburg |
| 3,565,380 A | 2/1971 | Langren |
| 3,572,623 A | 3/1971 | Lapp |
| 3,590,543 A | 7/1971 | Heirich |
| 3,641,729 A | 2/1972 | Irvin |
| 3,656,747 A | 4/1972 | Revell, Jr. et al. |
| 3,667,182 A | 6/1972 | Stemler |
| 3,667,185 A | 6/1972 | Maurer |
| 3,715,705 A | 2/1973 | Kuo |
| 3,719,919 A | 3/1973 | Tibolla |
| 3,753,326 A | 8/1973 | Kaufman, Sr. |
| D229,392 S | 11/1973 | Faust |
| 3,778,537 A | 12/1973 | Miller |
| D229,743 S | 1/1974 | Moore |
| 3,792,560 A | 2/1974 | Naylor |
| 3,809,799 A | 5/1974 | Taylor |
| 3,810,069 A | 5/1974 | Jaconette, Jr. |
| 3,817,270 A | 6/1974 | Ehrens et al. |
| 3,824,664 A | 7/1974 | Seeff |
| 3,845,601 A | 11/1974 | Kostecky |
| 3,861,098 A | 1/1975 | Schaub |
| 3,864,789 A | 2/1975 | Leitner |
| 3,904,161 A | 9/1975 | Scott |
| 3,914,001 A | 10/1975 | Nelson et al. |
| 3,921,253 A | 11/1975 | Nelson |
| 3,934,385 A | 1/1976 | Paulus |
| 3,960,352 A | 6/1976 | Plattner et al. |
| 3,964,149 A | 6/1976 | Hugh |
| 3,965,540 A | 6/1976 | Moore |
| 3,984,951 A | 10/1976 | Hindman |
| 3,986,746 A | 10/1976 | Chartier |
| 3,998,018 A | 12/1976 | Hodges |
| 4,001,474 A | 1/1977 | Hereth |
| 4,007,574 A | 2/1977 | Riddell |
| 4,018,538 A | 4/1977 | Smyrni et al. |
| 4,034,532 A | 7/1977 | Reinwall, Jr. |
| 4,043,579 A | 8/1977 | Meyer |

(56) References Cited

U.S. PATENT DOCUMENTS

| | | |
|---|---|---|
| 4,051,289 A | 9/1977 | Adamson |
| 4,084,289 A | 4/1978 | Naimo |
| 4,100,709 A | 7/1978 | Good |
| 4,127,975 A | 12/1978 | Judkins |
| 4,130,970 A | 12/1978 | Cable |
| 4,132,390 A | 1/1979 | Pfarr, Jr. |
| 4,141,182 A | 2/1979 | McMullen |
| 4,147,257 A | 4/1979 | Zippel |
| 4,162,595 A | 7/1979 | Ramos et al. |
| 4,162,755 A | 7/1979 | Bott |
| 4,189,882 A | 2/1980 | Harrison et al. |
| 4,189,891 A | 2/1980 | Johnson et al. |
| 4,200,107 A | 4/1980 | Reid |
| 4,203,646 A | 5/1980 | Desso et al. |
| 4,203,648 A | 5/1980 | Seidler |
| 4,213,282 A | 7/1980 | Heckelsberg |
| 4,215,677 A | 8/1980 | Erickson |
| 4,223,053 A | 9/1980 | Brogan |
| 4,223,667 A | 9/1980 | Paymal |
| 4,252,458 A | 2/1981 | Keen |
| 4,261,338 A | 4/1981 | McAlister |
| 4,261,384 A | 4/1981 | Dahlbring |
| 4,263,474 A | 4/1981 | Tennant |
| 4,270,721 A | 6/1981 | Mainor, Jr. |
| 4,280,484 A | 7/1981 | Mancosu |
| 4,291,934 A | 9/1981 | Kund |
| 4,296,530 A | 10/1981 | Muller et al. |
| 4,307,976 A | 12/1981 | Butler |
| 4,321,416 A | 3/1982 | Tennant |
| 4,351,140 A | 9/1982 | Simpson |
| 4,358,916 A | 11/1982 | Lacasse |
| 4,366,656 A | 1/1983 | Simpson |
| 4,393,859 A | 7/1983 | Marossy et al. |
| 4,406,505 A | 9/1983 | Avramovich |
| 4,449,335 A | 5/1984 | Fahey |
| 4,456,321 A | 6/1984 | Jones et al. |
| 4,461,514 A | 7/1984 | Schwarz |
| 4,467,582 A | 8/1984 | Hague |
| 4,475,776 A | 10/1984 | Teramachi |
| D277,934 S | 3/1985 | Beckrot |
| D280,973 S | 10/1985 | Ferrell |
| 4,546,586 A | 10/1985 | Knudson |
| 4,560,224 A | 12/1985 | Weisenburger |
| 4,567,706 A | 2/1986 | Wendt |
| 4,570,405 A | 2/1986 | Knudson |
| 4,588,240 A | 5/1986 | Ruehl et al. |
| 4,593,877 A | 6/1986 | van der Wyk |
| 4,601,600 A | 7/1986 | Karlsson |
| 4,649,684 A | 3/1987 | Petree et al. |
| 4,656,794 A | 4/1987 | Thevenin et al. |
| 4,666,116 A | 5/1987 | Lloyd |
| 4,669,808 A | 6/1987 | Owen |
| 4,674,252 A | 6/1987 | Nicholas et al. |
| 4,682,454 A | 7/1987 | Simpson |
| 4,686,809 A | 8/1987 | Skelton |
| 4,701,586 A | 10/1987 | Hagberg |
| 4,704,058 A | 11/1987 | Crunwell |
| 4,753,425 A | 6/1988 | Yang |
| 4,773,791 A | 9/1988 | Hartkorn |
| 4,782,642 A | 11/1988 | Conville |
| 4,799,444 A | 1/1989 | Lisowski |
| 4,805,364 A | 2/1989 | Smolik |
| 4,809,476 A | 3/1989 | Satchell |
| 4,810,573 A | 3/1989 | Harriett |
| 4,835,927 A | 6/1989 | Michlovic |
| 4,840,529 A | 6/1989 | Phillips |
| 4,848,858 A | 7/1989 | Suzuki |
| 4,854,096 A | 8/1989 | Smolik |
| 4,864,081 A | 9/1989 | Bates |
| D304,421 S | 11/1989 | Holdaway |
| 4,878,331 A | 11/1989 | Taylor |
| 4,883,397 A | 11/1989 | Dubost |
| 4,895,338 A | 1/1990 | Froutzis |
| 4,901,963 A | 2/1990 | Yoder |
| 4,901,964 A | 2/1990 | McConnell |
| 4,905,444 A | 3/1990 | Semaan |
| 4,909,011 A | 3/1990 | Freeman et al. |
| 4,949,929 A | 8/1990 | Kesselman et al. |
| 4,961,712 A | 10/1990 | Schwenk et al. |
| D312,315 S | 11/1990 | Westphal |
| 4,970,833 A | 11/1990 | Porter |
| 4,987,699 A | 1/1991 | Gold |
| 4,991,368 A | 2/1991 | Amstutz |
| 4,993,959 A | 2/1991 | Randolph |
| 5,007,612 A | 4/1991 | Manfre |
| 5,019,111 A | 5/1991 | Dempsey et al. |
| 5,036,949 A | 8/1991 | Crocker et al. |
| 5,039,352 A | 8/1991 | Mueller |
| D322,634 S | 12/1991 | Callas |
| 5,092,939 A | 3/1992 | Nath et al. |
| 5,094,435 A | 3/1992 | Depperman |
| D326,403 S | 5/1992 | Kleiss |
| 5,118,571 A | 6/1992 | Petersen |
| 5,119,612 A | 6/1992 | Taylor et al. |
| 5,125,608 A | 6/1992 | McMaster et al. |
| 5,127,205 A | 7/1992 | Eidson |
| 5,138,820 A | 8/1992 | Pearce |
| 5,140,793 A | 8/1992 | Knudson |
| 5,152,107 A | 10/1992 | Strickert |
| 5,154,385 A | 10/1992 | Lindberg et al. |
| 5,164,020 A | 11/1992 | Wagner et al. |
| 5,176,462 A | 1/1993 | Chen |
| 5,187,911 A | 2/1993 | Cotter |
| 5,209,619 A | 5/1993 | Rinderer |
| 5,213,300 A | 5/1993 | Rees |
| 5,222,340 A | 6/1993 | Bellem |
| 5,224,427 A | 7/1993 | Riches et al. |
| 5,228,248 A | 7/1993 | Haddock |
| 5,251,993 A | 10/1993 | Sigourney |
| 5,268,038 A | 12/1993 | Riermeier et al. |
| 5,271,194 A | 12/1993 | Drew |
| 5,277,006 A | 1/1994 | Ruster |
| 5,282,340 A | 2/1994 | Cline et al. |
| 5,287,670 A | 2/1994 | Funaki |
| 5,290,366 A | 3/1994 | Riermeier et al. |
| 5,307,601 A | 5/1994 | McCracken |
| 5,312,079 A | 5/1994 | Little, Jr. |
| 5,313,752 A | 5/1994 | Hatzinikolas |
| D347,701 S | 6/1994 | McCracken |
| 5,352,154 A | 10/1994 | Rotter et al. |
| 5,355,646 A | 10/1994 | Bischel |
| 5,356,519 A | 10/1994 | Grabscheid et al. |
| 5,356,705 A | 10/1994 | Kelch et al. |
| D351,989 S | 11/1994 | Cline et al. |
| 5,363,615 A | 11/1994 | Christopher et al. |
| 5,363,624 A | 11/1994 | Cotter |
| 5,379,567 A | 1/1995 | Vahey |
| 5,390,453 A | 2/1995 | Untiedt |
| 5,391,084 A | 2/1995 | Kreitzman |
| 5,392,574 A | 2/1995 | Sayers |
| 5,408,797 A | 4/1995 | Bellem |
| 5,409,549 A | 4/1995 | Mori |
| 5,413,063 A | 5/1995 | King |
| 5,413,397 A | 5/1995 | Gold |
| 5,417,028 A | 5/1995 | Meyer |
| 5,425,209 A | 6/1995 | Funaki |
| 5,426,906 A | 6/1995 | McCracken |
| 5,439,307 A | 8/1995 | Steinhilber |
| 5,453,027 A | 9/1995 | Buell et al. |
| D364,338 S | 11/1995 | Cline |
| 5,479,752 A | 1/1996 | Menegoli |
| 5,482,234 A | 1/1996 | Lyon |
| 5,483,772 A | 1/1996 | Haddock |
| 5,483,782 A | 1/1996 | Hall |
| 5,491,931 A | 2/1996 | Haddock |
| 5,497,591 A | 3/1996 | Nelson |
| 5,511,348 A | 4/1996 | Cornell |
| 5,522,185 A | 6/1996 | Cline |
| 5,533,839 A | 7/1996 | Shimada |
| D372,421 S | 8/1996 | Cline |
| 5,557,903 A | 9/1996 | Haddock |
| D375,449 S | 11/1996 | Dahlberg |
| 5,571,338 A | 11/1996 | Kadonome et al. |
| 5,596,858 A | 1/1997 | Jordan |

(56) References Cited

U.S. PATENT DOCUMENTS

| | | |
|---|---|---|
| 5,596,859 A | 1/1997 | Horton et al. |
| 5,598,785 A | 2/1997 | Zaguroli, Jr. |
| 5,600,971 A | 2/1997 | Suk |
| D378,343 S | 3/1997 | Macor |
| 5,609,326 A | 3/1997 | Stearns et al. |
| 5,613,328 A | 3/1997 | Alley |
| 5,634,618 A | 6/1997 | Farmer, Jr. et al. |
| 5,640,812 A | 6/1997 | Crowley et al. |
| 5,647,178 A | 7/1997 | Cline |
| 5,651,837 A | 7/1997 | Ohtsuka et al. |
| 5,660,008 A | 8/1997 | Bevilacqua |
| 5,664,750 A | 9/1997 | Cohen |
| 5,667,181 A | 9/1997 | van Leeuwen et al. |
| D384,574 S | 10/1997 | Cox |
| 5,681,191 A | 10/1997 | Robicheau et al. |
| 5,688,131 A | 11/1997 | Byfield, Jr. |
| D387,064 S | 12/1997 | Heine |
| D387,443 S | 12/1997 | Blankenbiller |
| 5,694,721 A | 12/1997 | Haddock |
| 5,697,197 A | 12/1997 | Simpson |
| 5,715,633 A | 2/1998 | Raz |
| 5,715,640 A | 2/1998 | Haddock |
| 5,732,513 A | 3/1998 | Alley |
| 5,743,063 A | 4/1998 | Boozer |
| 5,743,497 A | 4/1998 | Michael |
| 5,746,029 A | 5/1998 | Ullman |
| 5,755,824 A | 5/1998 | Blechschmidt et al. |
| 5,765,310 A | 6/1998 | Gold |
| 5,765,329 A | 6/1998 | Huang |
| 5,787,653 A | 8/1998 | Sakai et al. |
| 5,794,386 A | 8/1998 | Klein |
| 5,809,703 A | 9/1998 | Kelly |
| 5,826,379 A | 10/1998 | Curry |
| 5,826,390 A | 10/1998 | Sacks |
| 5,828,008 A | 10/1998 | Lockwood et al. |
| 5,829,723 A | 11/1998 | Brunner et al. |
| 5,842,318 A | 12/1998 | Bass et al. |
| 5,853,296 A | 12/1998 | Gunther et al. |
| 5,857,301 A | 1/1999 | Fujita |
| 5,885,118 A | 3/1999 | Billenstein et al. |
| 5,890,340 A | 4/1999 | Kafarowski |
| 5,897,088 A | 4/1999 | Kirschner |
| 5,901,507 A | 5/1999 | Smeja et al. |
| 5,911,663 A | 6/1999 | Eidson |
| 5,942,046 A | 8/1999 | Kahlfuss et al. |
| 5,970,586 A | 10/1999 | Demel et al. |
| 5,983,588 A | 11/1999 | Haddock |
| 5,987,714 A | 11/1999 | Smith |
| 5,994,640 A | 11/1999 | Bansemir et al. |
| 5,997,368 A | 12/1999 | Mello et al. |
| 6,029,415 A | 2/2000 | Culpepper et al. |
| D424,410 S | 5/2000 | Lodi |
| 6,073,410 A | 6/2000 | Schimpf et al. |
| 6,073,920 A | 6/2000 | Colley |
| 6,079,678 A | 6/2000 | Schott et al. |
| 6,083,010 A | 7/2000 | Daoud |
| 6,088,979 A | 7/2000 | Neal |
| 6,095,462 A | 8/2000 | Morgan |
| 6,099,203 A | 8/2000 | Landes |
| 6,105,317 A | 8/2000 | Tomiuchi et al. |
| 6,106,310 A | 8/2000 | Davis et al. |
| 6,111,189 A | 8/2000 | Garvison et al. |
| 6,119,317 A | 9/2000 | Pfister |
| 6,132,070 A | 10/2000 | Vosika et al. |
| 6,158,180 A | 12/2000 | Edwards |
| 6,164,033 A | 12/2000 | Haddock |
| 6,182,403 B1 | 2/2001 | Mimura et al. |
| 6,186,799 B1 | 2/2001 | Mello |
| 6,206,991 B1 | 3/2001 | Starr |
| 6,223,477 B1 | 5/2001 | Alley |
| 6,237,297 B1 | 5/2001 | Paroly |
| 6,253,496 B1 | 7/2001 | Gilchrist |
| 6,256,934 B1 | 7/2001 | Alley |
| 6,269,596 B1 | 8/2001 | Ohtsuka et al. |
| 6,276,285 B1 | 8/2001 | Ruch |
| 6,312,283 B1 | 11/2001 | Hio |
| 6,320,114 B1 | 11/2001 | Kuechler |
| 6,336,616 B1 | 1/2002 | Lin |
| 6,354,045 B1 | 3/2002 | Boone et al. |
| 6,360,491 B1 | 3/2002 | Ullman |
| 6,364,262 B1 | 4/2002 | Gibson et al. |
| 6,364,374 B1 | 4/2002 | Noone et al. |
| 6,370,828 B1 | 4/2002 | Genschorek |
| 6,382,569 B1 | 5/2002 | Schattner et al. |
| 6,385,914 B2 | 5/2002 | Alley |
| 6,393,796 B1 | 5/2002 | Goettl et al. |
| 6,443,680 B1 | 9/2002 | Bodin |
| 6,449,814 B1 | 9/2002 | Dinsmore |
| 6,453,623 B1 | 9/2002 | Nelson et al. |
| 6,470,629 B1 | 10/2002 | Haddock |
| 6,497,080 B1 | 12/2002 | Malcolm |
| 6,499,259 B1 | 12/2002 | Hockman |
| 6,508,442 B1 | 1/2003 | Dolez |
| 6,521,821 B2 | 2/2003 | Makita et al. |
| 6,534,702 B1 | 3/2003 | Makita et al. |
| 6,536,166 B1 | 3/2003 | Alley |
| 6,536,729 B1 | 3/2003 | Haddock |
| 6,576,830 B2 | 6/2003 | Nagao et al. |
| 6,588,722 B2 | 7/2003 | Eguchi |
| 6,602,016 B2 | 8/2003 | Eckart et al. |
| 6,622,441 B2 | 9/2003 | Miller |
| 6,637,671 B2 | 10/2003 | Alley |
| 6,647,671 B1 | 11/2003 | Alley |
| 6,655,633 B1 | 12/2003 | Chapman, Jr. |
| 6,665,991 B2 | 12/2003 | Hasan |
| 6,688,047 B1 | 2/2004 | McNichol |
| D487,595 S | 3/2004 | Sherman |
| 6,715,256 B1 | 4/2004 | Fischer |
| 6,718,718 B2 | 4/2004 | Haddock |
| 6,725,623 B1 | 4/2004 | Riddell et al. |
| 6,730,841 B2 | 5/2004 | Heckeroth |
| 6,732,982 B1 | 5/2004 | Messinger |
| 6,751,919 B2 | 6/2004 | Calixto |
| D495,595 S | 9/2004 | Dressler |
| D496,738 S | 9/2004 | Sherman |
| 6,799,742 B2 | 10/2004 | Nakamura et al. |
| 6,834,466 B2 | 12/2004 | Trevorrow et al. |
| 6,848,230 B2 | 2/2005 | Kopish |
| 6,918,217 B2 | 7/2005 | Jakob-Bamberg et al. |
| 6,918,727 B2 | 7/2005 | Huang |
| 6,922,948 B2 | 8/2005 | Smeja et al. |
| 6,967,278 B2 | 11/2005 | Hatsukaiwa et al. |
| D513,171 S | 12/2005 | Richardson |
| 7,012,188 B2 | 3/2006 | Erling |
| 7,013,612 B2 | 3/2006 | Haddock |
| 7,063,763 B2 | 6/2006 | Chapman, Jr. |
| 7,096,638 B2 | 8/2006 | Osterland |
| 7,100,338 B2 | 9/2006 | Haddock |
| 7,104,020 B1 | 9/2006 | Suttle |
| 7,127,852 B1 | 10/2006 | Dressler |
| 7,128,583 B2 | 10/2006 | Tsuo |
| D532,291 S | 11/2006 | Geers |
| 7,191,794 B2 | 3/2007 | Hodges |
| 7,195,513 B1 | 3/2007 | Gherardini |
| 7,219,863 B1 | 5/2007 | Collett, II |
| D547,262 S | 7/2007 | Ullman |
| 7,240,770 B2 | 7/2007 | Mullins et al. |
| 7,260,918 B2 | 8/2007 | Liebendorfer |
| 7,260,919 B1 | 8/2007 | Spransy |
| 7,281,695 B2 | 10/2007 | Jordan |
| 7,386,922 B1 | 6/2008 | Taylor et al. |
| 7,406,924 B1 | 8/2008 | Impey |
| 7,410,139 B1 | 8/2008 | Rorich |
| D576,107 S | 9/2008 | Sayres |
| 7,431,252 B2 | 10/2008 | Birli et al. |
| 7,435,134 B2 | 10/2008 | Lenox |
| 7,451,573 B2 | 11/2008 | Orszulak et al. |
| 7,458,555 B2 | 12/2008 | Mastropaolo et al. |
| 7,459,196 B2 | 12/2008 | Sturm |
| 7,469,511 B2 | 12/2008 | Wobber |
| 7,493,730 B2 | 2/2009 | Fennell, Jr. |
| D589,337 S | 3/2009 | Karlsson |
| 7,513,080 B1 | 4/2009 | Showalter |
| 7,516,580 B2 | 4/2009 | Fennell, Jr. |

(56) References Cited

U.S. PATENT DOCUMENTS

| | | |
|---|---|---|
| 7,568,871 B2 | 8/2009 | Chopp, Jr. et al. |
| 7,574,839 B1 | 8/2009 | Simpson |
| 7,578,711 B2 | 8/2009 | Robinson |
| D600,543 S | 9/2009 | Coles |
| 7,600,349 B2 | 10/2009 | Liebendorfer |
| 7,621,090 B2 | 11/2009 | Kelley |
| 7,634,875 B2 | 12/2009 | Genschorek |
| 7,658,356 B1 | 2/2010 | Nehls |
| 7,686,625 B1 | 3/2010 | Dyer et al. |
| 7,703,256 B2 | 4/2010 | Haddock |
| 7,707,800 B2 | 5/2010 | Kannisto |
| 7,712,278 B2 | 5/2010 | Lonardi |
| 7,717,387 B2 | 5/2010 | Naheem |
| 7,721,492 B2 | 5/2010 | Plaisted et al. |
| 7,731,138 B2 | 6/2010 | Wiesner et al. |
| 7,733,667 B2 | 6/2010 | Qin et al. |
| 7,758,003 B2 | 7/2010 | Pourtier et al. |
| 7,758,011 B2 | 7/2010 | Haddock |
| 7,762,027 B1 | 7/2010 | Wentworth et al. |
| 7,766,292 B2 | 8/2010 | Liebendorfer |
| 7,780,472 B2 | 8/2010 | Lenox |
| 7,788,874 B2 | 9/2010 | Miller |
| 7,788,879 B2 | 9/2010 | Brandes et al. |
| 7,824,191 B1 | 11/2010 | Browder |
| 7,827,920 B2 | 11/2010 | Beck et al. |
| 7,845,127 B2 | 12/2010 | Brescia |
| 7,847,181 B2 | 12/2010 | Brescia |
| 7,861,480 B2 | 1/2011 | Wendelburg et al. |
| 7,861,485 B1 | 1/2011 | Wentworth et al. |
| 7,874,117 B1 | 1/2011 | Simpson |
| 7,891,618 B2 | 2/2011 | Carnevali |
| 7,895,808 B1 | 3/2011 | Wentworth et al. |
| 7,905,064 B1 | 3/2011 | Wentworth et al. |
| 7,915,519 B2 | 3/2011 | Kobayashi |
| 7,926,777 B2 | 4/2011 | Koesema, Jr. |
| 7,954,287 B2 | 6/2011 | Bravo et al. |
| 7,976,257 B2 | 7/2011 | Kufner et al. |
| 7,988,464 B2 | 8/2011 | Kossak et al. |
| 8,011,153 B2 | 9/2011 | Orchard |
| 8,066,200 B2 | 11/2011 | Hepner et al. |
| 8,070,119 B2 | 12/2011 | Taylor |
| 8,092,129 B2 | 1/2012 | Wiley et al. |
| 8,096,503 B2 | 1/2012 | Verweyen |
| 8,099,837 B2 | 1/2012 | Santlin et al. |
| D653,611 S | 2/2012 | Lee |
| D653,940 S | 2/2012 | Yasher |
| 8,109,048 B2 | 2/2012 | West |
| 8,146,299 B2 | 4/2012 | Stearns et al. |
| 8,151,522 B2 | 4/2012 | Stearns et al. |
| 8,153,700 B2 | 4/2012 | Stearns et al. |
| D658,977 S | 5/2012 | Riddell et al. |
| 8,181,926 B2 | 5/2012 | Magno, Jr. et al. |
| 8,226,061 B2 | 7/2012 | Nehls |
| 8,251,326 B2 | 8/2012 | McPheeters |
| 8,272,172 B2 | 9/2012 | Li |
| 8,294,026 B2 | 10/2012 | Wang et al. |
| D670,160 S | 11/2012 | Bitarchas |
| 8,312,678 B1 | 11/2012 | Haddock |
| 8,316,590 B2 | 11/2012 | Cusson |
| 8,316,621 B2 | 11/2012 | Safari Kermanshahi et al. |
| D674,513 S | 1/2013 | Liu |
| 8,344,239 B2 | 1/2013 | Plaisted |
| 8,347,572 B2 | 1/2013 | Piedmont |
| 8,375,654 B1 | 2/2013 | West et al. |
| 8,387,319 B1 | 3/2013 | Gilles-Gagnon et al. |
| 8,404,963 B2 | 3/2013 | Kobayashi |
| 8,407,895 B2 | 4/2013 | Hartelius et al. |
| 8,413,946 B2 | 4/2013 | Hartelius et al. |
| 8,424,821 B2 | 4/2013 | Liu |
| 8,430,372 B2 | 4/2013 | Haddock |
| D681,438 S | 5/2013 | Chen |
| D681,439 S | 5/2013 | Chen |
| 8,448,405 B2 | 5/2013 | Schaefer et al. |
| 8,453,986 B2 | 6/2013 | Schnitzer |
| 8,458,967 B2 | 6/2013 | Kalkanoglu et al. |
| 8,495,997 B1 | 7/2013 | Laubach |
| 8,505,254 B2 | 8/2013 | Welter et al. |
| 8,528,888 B2 | 9/2013 | Header |
| 8,567,030 B2 | 10/2013 | Koch |
| 8,584,424 B2 | 11/2013 | Smith |
| 8,590,223 B2 | 11/2013 | Kilgore et al. |
| 8,596,009 B2 | 12/2013 | Baxter |
| 8,627,617 B2 | 1/2014 | Haddock et al. |
| 8,627,632 B2 | 1/2014 | Werner et al. |
| D699,176 S | 2/2014 | Salomon et al. |
| 8,640,402 B1 | 2/2014 | Bilge |
| 8,647,009 B2 | 2/2014 | Kobayashi |
| 8,656,649 B2 | 2/2014 | Haddock |
| 8,661,765 B2 | 3/2014 | Schaefer |
| 8,683,751 B2 | 4/2014 | Stearns |
| 8,695,290 B1 | 4/2014 | Kim et al. |
| 8,701,254 B2 | 4/2014 | Lin |
| 8,701,354 B2 | 4/2014 | Stearns et al. |
| 8,701,372 B2 | 4/2014 | Nuernberger et al. |
| 8,713,881 B2 | 5/2014 | DuPont |
| 8,732,917 B2 | 5/2014 | Zeilenga et al. |
| 8,733,027 B1 | 5/2014 | Marston et al. |
| 8,745,935 B2 | 6/2014 | DuPont et al. |
| 8,752,338 B2 | 6/2014 | Schaefer et al. |
| 8,756,870 B2 | 6/2014 | Teller et al. |
| 8,769,911 B2 | 7/2014 | Montgomery |
| 8,770,885 B2 | 7/2014 | Myers |
| 8,776,456 B1 | 7/2014 | Schrock |
| 8,782,983 B2 | 7/2014 | Stearns |
| 8,791,611 B2 | 7/2014 | Arnould et al. |
| 8,806,813 B2 | 8/2014 | Plaisted et al. |
| 8,806,815 B1 | 8/2014 | Liu et al. |
| 8,813,441 B2 | 8/2014 | Rizzo |
| 8,826,163 B1 | 9/2014 | Chanin et al. |
| 8,826,618 B2 | 9/2014 | Stearns |
| 8,829,330 B2 | 9/2014 | Meyer et al. |
| 8,833,714 B2 | 9/2014 | Haddock et al. |
| 8,839,573 B2 | 9/2014 | Cusson et al. |
| 8,839,575 B1 | 9/2014 | Liu et al. |
| 8,844,234 B2 | 9/2014 | Haddock et al. |
| 8,850,754 B2 | 10/2014 | Rizzo |
| 8,854,829 B1 | 10/2014 | Bopp et al. |
| 8,888,431 B2 | 11/2014 | Haney |
| 8,893,441 B1 | 11/2014 | Hess, III et al. |
| 8,894,424 B2 | 11/2014 | DuPont |
| D718,703 S | 12/2014 | Rizzo |
| D718,704 S | 12/2014 | Rizzo |
| 8,904,718 B2 | 12/2014 | Schick et al. |
| 8,910,928 B2 | 12/2014 | Header |
| 8,919,053 B2 | 12/2014 | West |
| 8,920,586 B2 | 12/2014 | Poulakis |
| 8,925,263 B2 | 1/2015 | Haddock et al. |
| 8,932,075 B2 | 1/2015 | Reibke |
| 8,935,893 B2 | 1/2015 | Liu et al. |
| 8,938,932 B1 | 1/2015 | Wentworth et al. |
| 8,950,157 B1 | 2/2015 | Schrock |
| 8,955,259 B2 | 2/2015 | Hemingway |
| 8,966,833 B2 | 3/2015 | Ally |
| 8,991,065 B1 | 3/2015 | Schrock |
| 8,998,660 B2 | 4/2015 | Bakos |
| 9,003,728 B2 | 4/2015 | Asci |
| 9,003,733 B1 | 4/2015 | Simpson et al. |
| 9,010,042 B2 | 4/2015 | Anderson et al. |
| 9,011,034 B2 | 4/2015 | Liu |
| 9,052,123 B2 | 6/2015 | Anderson et al. |
| 9,065,191 B2 | 6/2015 | Martin et al. |
| 9,068,339 B2 | 6/2015 | Schaefer et al. |
| 9,076,899 B2 | 7/2015 | Schrock |
| 9,080,792 B2 | 7/2015 | Patton |
| 9,085,900 B2 | 7/2015 | Haddock |
| 9,086,185 B2 | 7/2015 | Haddock |
| 9,097,443 B2 | 8/2015 | Liu et al. |
| 9,127,451 B1 | 9/2015 | Boor |
| 9,134,044 B2 | 9/2015 | Stearns et al. |
| 9,147,785 B2 | 9/2015 | Haddock et al. |
| 9,147,986 B2 | 9/2015 | Redel |
| D740,113 S | 10/2015 | Olenick |
| 9,166,524 B2 | 10/2015 | West et al. |
| 9,175,878 B2 | 11/2015 | Kemmer et al. |

(56) References Cited

U.S. PATENT DOCUMENTS

| | | |
|---|---|---|
| 9,175,881 B2 | 11/2015 | Schrock et al. |
| 9,194,130 B1 | 11/2015 | Stanley |
| 9,194,613 B2 | 11/2015 | Nuernberger et al. |
| 9,200,456 B2 | 12/2015 | Murphy |
| 9,222,263 B2 | 12/2015 | Haddock |
| 9,223,907 B2 | 12/2015 | Chanin et al. |
| 9,243,817 B2 | 1/2016 | West |
| 9,273,708 B2 | 3/2016 | Urban |
| 9,273,885 B2 | 3/2016 | Rodrigues et al. |
| 9,291,369 B2 | 3/2016 | West et al. |
| 9,299,868 B2 | 3/2016 | Thomas |
| 9,306,490 B2 | 4/2016 | Haddock et al. |
| 9,309,910 B2 | 4/2016 | Anderson et al. |
| 9,331,629 B2 | 5/2016 | Cheung et al. |
| 9,341,285 B2 | 5/2016 | Magno, Jr. et al. |
| 9,376,812 B2 | 6/2016 | Porter |
| 9,413,286 B2 | 8/2016 | Danning |
| 9,416,803 B1 | 8/2016 | McGarity et al. |
| 9,431,953 B2 | 8/2016 | Stearns |
| 9,447,988 B2 | 9/2016 | Stearns et al. |
| 9,473,064 B2 | 10/2016 | Schaefer |
| 9,473,066 B2 | 10/2016 | Stephan et al. |
| 9,479,110 B2 | 10/2016 | Patton et al. |
| 9,496,697 B1 | 11/2016 | Wentworth |
| 9,518,596 B2 | 12/2016 | West et al. |
| 9,528,725 B2 | 12/2016 | McPheeters |
| 9,530,916 B2 | 12/2016 | Haddock et al. |
| 9,531,319 B2 | 12/2016 | Braunstein et al. |
| 9,534,390 B2 | 1/2017 | Pendley et al. |
| 9,587,427 B2 | 3/2017 | Webb |
| 9,599,280 B2 | 3/2017 | West et al. |
| 9,608,559 B2 | 3/2017 | Haddock et al. |
| 9,611,652 B2 | 4/2017 | Haddock et al. |
| 9,647,433 B2 | 5/2017 | Meine |
| 9,647,607 B2 | 5/2017 | Patton et al. |
| 9,660,570 B2 | 5/2017 | Stephan et al. |
| 9,689,411 B2 | 6/2017 | Meine et al. |
| 9,712,106 B2 | 7/2017 | Wentworth et al. |
| 9,714,670 B2 | 7/2017 | Header |
| 9,722,532 B2 | 8/2017 | Almy |
| 9,732,512 B2 | 8/2017 | Haddock |
| 9,742,173 B2 | 8/2017 | Wentworth |
| 9,755,572 B2 | 9/2017 | Wentworth et al. |
| D800,055 S | 10/2017 | Rothschild |
| 9,813,012 B2 | 11/2017 | Wentworth et al. |
| 9,813,013 B2 | 11/2017 | McPheeters et al. |
| 9,819,303 B2 | 11/2017 | Ash |
| 9,831,817 B2 | 11/2017 | Rothschild |
| 9,845,584 B1 | 12/2017 | Goldammer |
| 9,845,599 B2 | 12/2017 | Bogh et al. |
| 9,850,661 B2 | 12/2017 | Kovacs |
| 9,853,593 B2 | 12/2017 | Cinnamon et al. |
| 9,853,594 B2 | 12/2017 | Almy |
| 9,863,665 B2 | 1/2018 | West |
| 9,865,938 B2 | 1/2018 | Meine et al. |
| 9,876,463 B2 | 1/2018 | Jasmin |
| D810,008 S | 2/2018 | Mollison |
| 9,893,676 B2 | 2/2018 | Anderson et al. |
| 9,893,677 B1 | 2/2018 | Liu |
| 9,920,516 B2 | 3/2018 | Alter |
| 9,920,958 B2 | 3/2018 | Haddock et al. |
| 9,926,706 B2 | 3/2018 | Hockman |
| 9,966,745 B2 | 5/2018 | Wentworth |
| 9,985,361 B2 | 5/2018 | Martin |
| 9,985,575 B2 | 5/2018 | Stearns et al. |
| 9,988,816 B2 | 6/2018 | Zhang et al. |
| 10,021,986 B1 | 7/2018 | Lin |
| 10,036,414 B2 | 7/2018 | Wiley et al. |
| 10,036,576 B1 | 7/2018 | Robinson |
| D827,160 S | 8/2018 | Menton |
| 10,053,856 B2 | 8/2018 | Haddock |
| 10,054,336 B2 | 8/2018 | Haddock et al. |
| D827,873 S | 9/2018 | Menton |
| D827,874 S | 9/2018 | Menton |
| 10,077,562 B2 | 9/2018 | Haddock et al. |
| 10,088,201 B2 | 10/2018 | Stephan |
| 10,090,800 B2 | 10/2018 | McPheeters |
| 10,103,682 B2 | 10/2018 | Haddock et al. |
| 10,103,683 B2 | 10/2018 | Wentworth |
| 10,106,987 B2 | 10/2018 | Haddock et al. |
| 10,141,662 B2 | 11/2018 | Bernard et al. |
| 10,186,791 B2 | 1/2019 | Meine et al. |
| D841,096 S | 2/2019 | Boyer |
| 10,202,991 B2 | 2/2019 | Lewis |
| 10,202,995 B2 | 2/2019 | Stickelberger et al. |
| 10,205,418 B2 | 2/2019 | Nayar |
| 10,208,874 B2 | 2/2019 | Geiger et al. |
| 10,211,773 B2 | 2/2019 | Jasmin et al. |
| 10,211,775 B1 | 2/2019 | Wentworth et al. |
| 10,218,305 B1 | 2/2019 | Schrock |
| 10,240,820 B2 | 3/2019 | Ash et al. |
| D846,978 S | 4/2019 | Dupont-Madinier |
| 10,256,767 B1 | 4/2019 | Sinai et al. |
| 10,291,176 B2 | 5/2019 | Wentworth et al. |
| 10,298,169 B2 | 5/2019 | Martin |
| 10,302,333 B2 | 5/2019 | McPheeters |
| 10,312,855 B2 | 6/2019 | Lester et al. |
| 10,323,418 B2 | 6/2019 | Karkheck |
| 10,323,861 B2 | 6/2019 | Peng |
| D853,954 S | 7/2019 | McPheeters |
| 10,337,764 B2 | 7/2019 | Ash et al. |
| 10,359,069 B2 | 7/2019 | Ash et al. |
| 10,385,573 B2 | 8/2019 | Van Leuven |
| 10,396,704 B2 | 8/2019 | Goodman |
| 10,418,931 B2 | 9/2019 | McPheeters |
| D863,604 S | 10/2019 | Sexton |
| 10,432,133 B2 | 10/2019 | Braunstein |
| 10,443,896 B2 | 10/2019 | Haddock et al. |
| 10,454,190 B1 | 10/2019 | Martin |
| RE47,733 E | 11/2019 | West |
| 10,472,828 B2 | 11/2019 | Stearns et al. |
| 10,502,457 B2 | 12/2019 | Haddock et al. |
| 10,505,492 B2 | 12/2019 | Hudson et al. |
| 10,511,252 B2 | 12/2019 | Wentworth et al. |
| 10,530,293 B2 | 1/2020 | Legall et al. |
| 10,551,090 B2 | 2/2020 | De Vogel et al. |
| 10,584,447 B2 | 3/2020 | Fenile |
| 10,594,251 B2 | 3/2020 | Stearns et al. |
| 10,622,935 B1 | 4/2020 | Liu |
| 10,634,175 B2 * | 4/2020 | Haddock .................. F24S 25/63 |
| 10,640,980 B2 | 5/2020 | Haddock |
| 10,641,300 B2 | 5/2020 | Header |
| 10,644,643 B2 | 5/2020 | Stearns et al. |
| D887,963 S | 6/2020 | Yang |
| 10,673,151 B2 | 6/2020 | Ash et al. |
| 10,676,933 B2 | 6/2020 | Van Leuven |
| 10,686,401 B2 | 6/2020 | Ash et al. |
| D890,085 S | 7/2020 | Baird |
| D890,601 S | 7/2020 | Gori |
| D890,602 S | 7/2020 | Gori |
| 10,731,355 B2 | 8/2020 | Haddock et al. |
| 10,739,039 B2 | 8/2020 | Werner |
| 10,749,459 B1 | 8/2020 | Liu et al. |
| 10,749,466 B2 | 8/2020 | Smeja |
| 10,763,777 B2 | 9/2020 | Stearns et al. |
| 10,797,634 B1 | 10/2020 | Jasmin et al. |
| 10,816,240 B2 | 10/2020 | Robinson |
| D902,163 S | 11/2020 | Ice |
| 10,837,476 B2 | 11/2020 | Lewis |
| D904,861 S | 12/2020 | McWilliams |
| 10,851,826 B2 | 12/2020 | Ash et al. |
| 10,859,292 B2 | 12/2020 | Haddock et al. |
| 10,868,491 B2 | 12/2020 | Wentworth et al. |
| 10,903,785 B2 | 1/2021 | Haddock et al. |
| D909,853 S | 2/2021 | Jasmin |
| 10,931,225 B2 | 2/2021 | Yang et al. |
| 10,948,002 B2 | 3/2021 | Haddock |
| 11,009,262 B2 | 5/2021 | Ash et al. |
| 11,012,023 B2 | 5/2021 | Stearns et al. |
| D920,769 S | 6/2021 | Kovacs |
| D923,203 S | 6/2021 | Muther |
| D923,823 S | 6/2021 | Muther |
| 11,035,126 B2 | 6/2021 | Haddock et al. |
| 11,041,310 B1 | 6/2021 | Haddock et al. |

(56) References Cited

U.S. PATENT DOCUMENTS

| | | |
|---|---|---|
| 11,085,188 B2 | 8/2021 | Haddock |
| 11,118,353 B2 | 9/2021 | Stearns et al. |
| 11,121,484 B2 | 9/2021 | Ash et al. |
| 11,121,669 B2 | 9/2021 | Stearns et al. |
| 11,139,773 B2 | 10/2021 | Eriksson |
| 11,139,774 B2 | 10/2021 | Wentworth et al. |
| 11,189,941 B2 | 11/2021 | Ash et al. |
| D939,332 S | 12/2021 | Kovacs |
| 11,196,187 B2 | 12/2021 | Ash et al. |
| 11,201,581 B2 | 12/2021 | Stearns et al. |
| 11,296,648 B1 | 4/2022 | Jasmin et al. |
| 11,333,179 B2 | 5/2022 | Haddock |
| 11,352,793 B2 | 6/2022 | Haddock et al. |
| 11,368,005 B2 | 6/2022 | Meine et al. |
| D962,047 S | 8/2022 | Muther |
| 11,512,474 B2 | 11/2022 | Haddock et al. |
| 11,549,724 B2 | 1/2023 | Zhu |
| 11,552,591 B2 | 1/2023 | Jasmin et al. |
| 11,573,033 B2 | 2/2023 | Haddock et al. |
| 11,575,343 B2 | 2/2023 | Wentworth et al. |
| D982,117 S | 3/2023 | Liu |
| 11,616,468 B2 | 3/2023 | Haddock et al. |
| D983,015 S | 4/2023 | Jasmin et al. |
| D983,016 S | 4/2023 | Jasmin et al. |
| D983,017 S | 4/2023 | Jasmin et al. |
| D983,018 S | 4/2023 | Jasmin et al. |
| D983,019 S | 4/2023 | Jasmin et al. |
| 11,621,665 B2 | 4/2023 | Jasmin et al. |
| D984,872 S | 5/2023 | Jasmin et al. |
| 11,646,692 B2 | 5/2023 | Wentworth et al. |
| 11,668,332 B2 * | 6/2023 | Haddock ............... H02S 20/23 52/173.3 |
| 11,739,529 B2 | 8/2023 | Haddock et al. |
| 11,742,793 B2 * | 8/2023 | Garza ................... H02S 30/00 248/229.1 |
| 11,750,143 B1 | 9/2023 | Jasmin et al. |
| 11,757,400 B1 | 9/2023 | Jasmin et al. |
| 11,770,097 B1 | 9/2023 | Jasmin et al. |
| 11,774,143 B2 | 10/2023 | Leitch et al. |
| 11,788,291 B2 | 10/2023 | Haddock et al. |
| 11,808,043 B2 | 11/2023 | Haddock |
| 11,815,292 B2 | 11/2023 | Markiewicz |
| 11,848,638 B1 | 12/2023 | Jasmin |
| 11,876,482 B1 | 1/2024 | Jasmin et al. |
| 11,881,808 B1 | 1/2024 | Jasmin et al. |
| 11,885,139 B2 | 1/2024 | Haddock et al. |
| 11,949,373 B1 | 4/2024 | Jasmin et al. |
| 11,965,337 B2 | 4/2024 | Haddock et al. |
| D1,025,763 S | 5/2024 | Hu |
| D1,030,453 S | 6/2024 | Fayfield |
| D1,030,634 S | 6/2024 | Lin |
| 12,009,774 B1 | 6/2024 | Jasmin |
| 12,018,861 B2 | 6/2024 | Haddock |
| D1,035,419 S | 7/2024 | Johnson |
| 12,044,443 B2 | 7/2024 | Haddock et al. |
| D1,037,839 S | 8/2024 | Dunahay |
| 12,057,801 B1 | 8/2024 | Jasmin et al. |
| D1,041,036 S | 9/2024 | Gangumalla |
| D1,055,199 S | 12/2024 | Zimmer |
| D1,057,910 S | 1/2025 | Markopoulos |
| D1,058,511 S | 1/2025 | Lin |
| D1,059,534 S | 1/2025 | Roberson |
| 12,203,496 B2 * | 1/2025 | Moss ................... E04D 1/2942 |
| D1,065,012 S | 3/2025 | Yamanaka |
| D1,067,363 S | 3/2025 | Roberson |
| 12,281,750 B2 | 4/2025 | Stephan |
| 12,300,985 B2 | 5/2025 | Ash et al. |
| 12,312,812 B2 | 5/2025 | Stearns et al. |
| 2002/0026765 A1 | 3/2002 | Vahey |
| 2002/0088196 A1 | 7/2002 | Haddock |
| 2002/0160635 A1 | 10/2002 | Kurrer et al. |
| 2003/0015637 A1 | 1/2003 | Liebendorfer |
| 2003/0062078 A1 | 4/2003 | Mimura |
| 2003/0070368 A1 | 4/2003 | Shingleton |
| 2003/0080267 A1 | 5/2003 | Eslick |
| 2003/0131551 A1 | 7/2003 | Mollinger et al. |
| 2003/0146346 A1 | 8/2003 | Chapman, Jr. |
| 2003/0173460 A1 | 9/2003 | Chapman, Jr. |
| 2003/0201009 A1 | 10/2003 | Nakajima et al. |
| 2004/0035065 A1 | 2/2004 | Orszulak et al. |
| 2004/0055233 A1 | 3/2004 | Showalter |
| 2004/0164208 A1 | 8/2004 | Nielson et al. |
| 2004/0231949 A1 | 11/2004 | Le et al. |
| 2004/0237465 A1 | 12/2004 | Refond |
| 2005/0095062 A1 | 5/2005 | Iverson et al. |
| 2005/0102958 A1 | 5/2005 | Anderson |
| 2005/0115176 A1 | 6/2005 | Russell |
| 2005/0117997 A1 | 6/2005 | Pinzl |
| 2005/0210769 A1 | 9/2005 | Harvey |
| 2005/0257434 A1 | 11/2005 | Hockman |
| 2006/0065805 A1 | 3/2006 | Barton et al. |
| 2006/0075691 A1 | 4/2006 | Verkamlp |
| 2006/0096061 A1 | 5/2006 | Weiland et al. |
| 2006/0118163 A1 | 6/2006 | Plaisted et al. |
| 2006/0174571 A1 | 8/2006 | Panasik et al. |
| 2006/0174931 A1 | 8/2006 | Mapes et al. |
| 2006/0230587 A1 | 10/2006 | Okada |
| 2006/0254192 A1 | 11/2006 | Fennell, Jr. |
| 2007/0075198 A1 | 4/2007 | Foser |
| 2007/0131273 A1 | 6/2007 | Kobayashi |
| 2007/0194191 A1 | 8/2007 | Persson |
| 2007/0199590 A1 | 8/2007 | Tanaka et al. |
| 2007/0241238 A1 | 10/2007 | Neace |
| 2007/0246039 A1 | 10/2007 | Brazier et al. |
| 2007/0248434 A1 | 10/2007 | Wiley et al. |
| 2007/0289229 A1 | 12/2007 | Aldo |
| 2007/0289233 A1 | 12/2007 | Haddock |
| 2008/0035140 A1 | 2/2008 | Placer et al. |
| 2008/0041011 A1 | 2/2008 | Kannisto |
| 2008/0095591 A1 | 4/2008 | Wu |
| 2008/0184639 A1 | 8/2008 | Cotter |
| 2008/0190047 A1 | 8/2008 | Allen |
| 2008/0236520 A1 | 10/2008 | Maehara et al. |
| 2008/0265232 A1 | 10/2008 | Terrels et al. |
| 2008/0292424 A1 | 11/2008 | Kufner |
| 2008/0302407 A1 | 12/2008 | Kobayashi |
| 2009/0000220 A1 | 1/2009 | Lenox |
| 2009/0007520 A1 | 1/2009 | Navon |
| 2009/0194098 A1 | 8/2009 | Placer |
| 2009/0223741 A1 | 9/2009 | Picard, Jr. |
| 2009/0229213 A1 | 9/2009 | Mistelski |
| 2009/0230205 A1 | 9/2009 | Hepner et al. |
| 2009/0320826 A1 | 12/2009 | Kufner |
| 2010/0012805 A1 | 1/2010 | Taylor |
| 2010/0058701 A1 | 3/2010 | Yao et al. |
| 2010/0133040 A1 | 6/2010 | London |
| 2010/0154784 A1 | 6/2010 | King et al. |
| 2010/0162641 A1 | 7/2010 | Reyal et al. |
| 2010/0171016 A1 | 7/2010 | Haddock |
| 2010/0175738 A1 | 7/2010 | Huss et al. |
| 2010/0192334 A1 | 8/2010 | Reichle et al. |
| 2010/0192505 A1 | 8/2010 | Schaefer et al. |
| 2010/0193651 A1 | 8/2010 | Railsback et al. |
| 2010/0206303 A1 | 8/2010 | Thorne |
| 2010/0212720 A1 | 8/2010 | Meyer et al. |
| 2010/0276558 A1 | 11/2010 | Faust et al. |
| 2010/0281784 A1 | 11/2010 | Leo |
| 2010/0282290 A1 | 11/2010 | Schwarze |
| 2010/0288337 A1 | 11/2010 | Rizzo |
| 2010/0293874 A1 | 11/2010 | Liebendorfer |
| 2010/0314517 A1 | 12/2010 | Patzer |
| 2011/0000151 A1 | 1/2011 | Hochreiter |
| 2011/0039458 A1 | 2/2011 | Byrne |
| 2011/0078892 A1 | 4/2011 | Hartelius et al. |
| 2011/0088340 A1 | 4/2011 | Stobbe |
| 2011/0120047 A1 | 5/2011 | Stearns et al. |
| 2011/0138585 A1 | 6/2011 | Kmita et al. |
| 2011/0154750 A1 | 6/2011 | Welter et al. |
| 2011/0162299 A1 | 7/2011 | Azzolini |
| 2011/0174360 A1 | 7/2011 | Plaisted et al. |
| 2011/0179606 A1 | 7/2011 | Magno, Jr. et al. |
| 2011/0209745 A1 | 9/2011 | Korman |
| 2011/0214365 A1 | 9/2011 | Aftanas |
| 2011/0214388 A1 | 9/2011 | London |

(56) References Cited

U.S. PATENT DOCUMENTS

| | | |
|---|---|---|
| 2011/0232212 A1 | 9/2011 | Pierson et al. |
| 2011/0239546 A1 | 10/2011 | Tsuzuki et al. |
| 2011/0247292 A1 | 10/2011 | Li |
| 2011/0260027 A1 | 10/2011 | Farnham, Jr. |
| 2011/0271611 A1 | 11/2011 | Maracci et al. |
| 2011/0272545 A1 | 11/2011 | Liu |
| 2011/0277296 A1 | 11/2011 | Ramos |
| 2011/0314752 A1 | 12/2011 | Meier |
| 2012/0001046 A1* | 1/2012 | Schmotz ............... F16B 5/0685 248/316.1 |
| 2012/0073630 A1 | 3/2012 | Wu |
| 2012/0079781 A1 | 4/2012 | Koller |
| 2012/0085041 A1 | 4/2012 | Place |
| 2012/0099943 A1 | 4/2012 | Chiu |
| 2012/0102853 A1 | 5/2012 | Rizzo |
| 2012/0153108 A1 | 6/2012 | Schneider |
| 2012/0167364 A1 | 7/2012 | Koch et al. |
| 2012/0175322 A1 | 7/2012 | Park et al. |
| 2012/0192519 A1 | 8/2012 | Ray |
| 2012/0193310 A1 | 8/2012 | Fluhrer et al. |
| 2012/0201601 A1 | 8/2012 | Rizzo |
| 2012/0223033 A1 | 9/2012 | Molek |
| 2012/0244729 A1 | 9/2012 | Rivera et al. |
| 2012/0248271 A1 | 10/2012 | Zeilenga |
| 2012/0298188 A1 | 11/2012 | West et al. |
| 2012/0299233 A1 | 11/2012 | Header |
| 2012/0325761 A1 | 12/2012 | Kubsch et al. |
| 2013/0011187 A1 | 1/2013 | Schuit et al. |
| 2013/0014809 A1 | 1/2013 | Sagayama |
| 2013/0048056 A1 | 2/2013 | Kilgore et al. |
| 2013/0074428 A1 | 3/2013 | Allen |
| 2013/0089388 A1 | 4/2013 | Liu et al. |
| 2013/0091692 A1 | 4/2013 | Stanley |
| 2013/0117973 A1 | 5/2013 | Murasaki |
| 2013/0118545 A1 | 5/2013 | Bosler et al. |
| 2013/0149030 A1 | 6/2013 | Merhar et al. |
| 2013/0167470 A1 | 7/2013 | Montgomery et al. |
| 2013/0168525 A1 | 7/2013 | Haddock |
| 2013/0220403 A1 | 8/2013 | Rizzo |
| 2013/0227833 A1 | 9/2013 | Rizzo |
| 2013/0263917 A1 | 10/2013 | Hamamura |
| 2013/0313043 A1 | 11/2013 | Lallier |
| 2013/0334151 A1 | 12/2013 | Kanczuzewski et al. |
| 2013/0340358 A1 | 12/2013 | Danning |
| 2014/0000681 A1 | 1/2014 | Zhao et al. |
| 2014/0003861 A1 | 1/2014 | Cheung |
| 2014/0041202 A1 | 2/2014 | Schnitzer et al. |
| 2014/0042286 A1 | 2/2014 | Jaffari |
| 2014/0048498 A1 | 2/2014 | Kuan |
| 2014/0069048 A1 | 3/2014 | Ally |
| 2014/0096462 A1 | 4/2014 | Haddock |
| 2014/0096463 A1 | 4/2014 | Prentice |
| 2014/0179133 A1 | 6/2014 | Redel |
| 2014/0220834 A1 | 8/2014 | Rizzo |
| 2014/0231605 A1 | 8/2014 | Sharpe et al. |
| 2014/0260068 A1 | 9/2014 | Pendley et al. |
| 2014/0283467 A1 | 9/2014 | Chabas et al. |
| 2014/0290718 A1 | 10/2014 | Jackson, Jr. |
| 2014/0338273 A1 | 11/2014 | Stapleton |
| 2014/0341645 A1 | 11/2014 | Liu et al. |
| 2014/0345212 A1 | 11/2014 | Yoon |
| 2015/0052834 A1 | 2/2015 | Gies et al. |
| 2015/0060620 A1 | 3/2015 | Smeja |
| 2015/0107168 A1 | 4/2015 | Kobayashi |
| 2015/0129517 A1 | 5/2015 | Wildes |
| 2015/0171787 A1 | 6/2015 | Genschorek |
| 2015/0200620 A1 | 7/2015 | Haddock et al. |
| 2015/0214884 A1 | 7/2015 | Rizzo |
| 2015/0249423 A1 | 9/2015 | Braunstein et al. |
| 2015/0316086 A1 | 11/2015 | Urban |
| 2016/0025262 A1 | 1/2016 | Stearns et al. |
| 2016/0043686 A1 | 2/2016 | Hsueh |
| 2016/0049901 A1 | 2/2016 | Muther et al. |
| 2016/0060869 A1 | 3/2016 | Smeja |
| 2016/0079909 A1 | 3/2016 | Franklin |
| 2016/0087576 A1 | 3/2016 | Johansen et al. |
| 2016/0111835 A1 | 4/2016 | Nayar |
| 2016/0111997 A1 | 4/2016 | Ganshaw et al. |
| 2016/0111998 A1 | 4/2016 | Schmid |
| 2016/0130815 A1 | 5/2016 | Menegoli |
| 2016/0160492 A1 | 6/2016 | Gower |
| 2016/0160524 A1 | 6/2016 | Malins |
| 2016/0176105 A1 | 6/2016 | Stanley |
| 2016/0177984 A1 | 6/2016 | Kovacs et al. |
| 2016/0233820 A1 | 8/2016 | Redel |
| 2016/0268958 A1 | 9/2016 | Wildes et al. |
| 2016/0308487 A1 | 10/2016 | Molina |
| 2017/0040928 A1 | 2/2017 | Schuit et al. |
| 2017/0040931 A1 | 2/2017 | Schuit |
| 2017/0067258 A1 | 3/2017 | Stearns et al. |
| 2017/0073974 A1 | 3/2017 | Kovacs |
| 2017/0107723 A1 | 4/2017 | Stearns et al. |
| 2017/0237386 A1 | 8/2017 | Stephan et al. |
| 2017/0301265 A1 | 10/2017 | Kyle et al. |
| 2017/0302220 A1 | 10/2017 | Martin |
| 2017/0302221 A1 | 10/2017 | Jasmin |
| 2017/0336021 A1 | 11/2017 | Anderson |
| 2018/0013382 A1 | 1/2018 | Smeja |
| 2018/0045363 A1 | 2/2018 | Mitrovic |
| 2018/0062570 A1 | 3/2018 | Murakami |
| 2018/0109014 A1 | 4/2018 | Martin |
| 2018/0119425 A1 | 5/2018 | Kovacs |
| 2018/0123505 A1 | 5/2018 | Prat et al. |
| 2018/0167026 A1 | 6/2018 | Xie |
| 2018/0323744 A1 | 11/2018 | Hudson |
| 2019/0013772 A1 | 1/2019 | Bamat et al. |
| 2019/0049151 A1 | 2/2019 | Harris et al. |
| 2019/0068114 A1 | 2/2019 | Lu |
| 2019/0106885 A1 | 4/2019 | Stearns et al. |
| 2019/0123460 A1 | 4/2019 | Ash et al. |
| 2019/0165717 A1 | 5/2019 | Haddock et al. |
| 2019/0178274 A1 | 6/2019 | Katz |
| 2019/0195252 A1 | 6/2019 | Pryor et al. |
| 2019/0221696 A1 | 7/2019 | Kubo et al. |
| 2019/0226214 A1 | 7/2019 | Van Leuven |
| 2019/0273460 A1 | 9/2019 | Kovacs |
| 2019/0285224 A1 | 9/2019 | McKechnie et al. |
| 2019/0326847 A1 | 10/2019 | Zuritis |
| 2019/0330853 A1 | 10/2019 | Van Leuven |
| 2019/0343085 A1 | 11/2019 | Donado |
| 2019/0345719 A1 | 11/2019 | Header |
| 2019/0363667 A1 | 11/2019 | Braunstein et al. |
| 2019/0372501 A1 | 12/2019 | Wada et al. |
| 2020/0144959 A1 | 5/2020 | Stearns et al. |
| 2020/0191180 A1* | 6/2020 | Haddock .................. F16B 2/10 |
| 2020/0208463 A1 | 7/2020 | Mascarenhas et al. |
| 2020/0208658 A1 | 7/2020 | Roman |
| 2020/0252023 A1 | 8/2020 | Stearns et al. |
| 2020/0278077 A1 | 9/2020 | Xie |
| 2020/0313603 A1 | 10/2020 | Uppu |
| 2020/0313604 A1 | 10/2020 | Harris et al. |
| 2020/0313611 A1 | 10/2020 | Ash et al. |
| 2020/0318349 A1 | 10/2020 | Stearns et al. |
| 2020/0321763 A1 | 10/2020 | Joshi et al. |
| 2020/0362632 A1 | 11/2020 | Fort |
| 2021/0005115 A1 | 1/2021 | Johnson |
| 2021/0028741 A1 | 1/2021 | Stearns et al. |
| 2021/0067085 A1 | 3/2021 | Stearns et al. |
| 2021/0079947 A1 | 3/2021 | Ash et al. |
| 2021/0104973 A1 | 4/2021 | Stearns et al. |
| 2021/0111546 A1 | 4/2021 | Varale |
| 2021/0159843 A1 | 5/2021 | Stearns et al. |
| 2021/0167720 A1 | 6/2021 | Stearns et al. |
| 2021/0184626 A1 | 6/2021 | Yang et al. |
| 2021/0194157 A1 | 6/2021 | Ash et al. |
| 2021/0265940 A1 | 8/2021 | Stearns et al. |
| 2021/0376781 A1 | 12/2021 | Stearns et al. |
| 2021/0376782 A1 | 12/2021 | Stearns et al. |
| 2021/0388618 A1 | 12/2021 | Stearns et al. |
| 2022/0010823 A1* | 1/2022 | Moss ..................... E04D 13/10 |
| 2022/0140771 A1 | 5/2022 | Stearns et al. |
| 2022/0145634 A1 | 5/2022 | Stearns et al. |
| 2022/0149545 A1 | 5/2022 | Ash et al. |
| 2022/0178586 A1 | 6/2022 | Ash et al. |

(56) References Cited

U.S. PATENT DOCUMENTS

| | | |
|---|---|---|
| 2022/0278516 A1 | 9/2022 | Meine et al. |
| 2023/0036926 A1 | 2/2023 | Jovanovic et al. |
| 2023/0151834 A1 | 5/2023 | Kovacs |
| 2023/0170840 A1 | 6/2023 | Stearns et al. |
| 2023/0198460 A1 | 6/2023 | Jasmin et al. |
| 2023/0223895 A1 | 7/2023 | Haddock et al. |
| 2023/0261606 A1 | 8/2023 | Stearns et al. |
| 2023/0279883 A1 | 9/2023 | Haddock et al. |
| 2023/0336108 A1 | 10/2023 | Morano |
| 2023/0396208 A1 | 12/2023 | Pedlar et al. |
| 2023/0399850 A1 | 12/2023 | Haddock et al. |
| 2023/0402958 A1 | 12/2023 | Jasmin |
| 2024/0014770 A1 | 1/2024 | Moss et al. |
| 2024/0022207 A1 | 1/2024 | Jasmin et al. |
| 2024/0027103 A1 | 1/2024 | Leitch et al. |
| 2024/0068237 A1 | 2/2024 | Haddock |
| 2024/0097415 A1 | 3/2024 | Ash et al. |
| 2024/0167730 A1 | 5/2024 | Jasmin et al. |
| 2024/0171115 A1 | 5/2024 | Jasmin et al. |
| 2024/0195347 A1 | 6/2024 | Jasmin |
| 2024/0227688 A1 | 7/2024 | Morano |
| 2024/0377105 A1 | 11/2024 | Haddock et al. |
| 2025/0015580 A1 | 1/2025 | Meine |
| 2025/0055412 A1 | 2/2025 | Moss |
| 2025/0080036 A1 | 3/2025 | Moss et al. |
| 2025/0146294 A1 | 5/2025 | Haddock et al. |
| 2025/0154971 A1 | 5/2025 | Haddock |
| 2025/0155164 A1 | 5/2025 | Leitch et al. |

FOREIGN PATENT DOCUMENTS

| | | |
|---|---|---|
| AT | 298762 | 5/1972 |
| AT | 509330 | 8/2011 |
| AU | 2005201707 | 11/2006 |
| AU | 2009101276 | 1/2010 |
| AU | 2009245849 | 6/2010 |
| AU | 2014362215 | 6/2015 |
| AU | 2017203660 | 10/2018 |
| AU | 2016294152 | 12/2018 |
| CA | 2704915 | 9/2011 |
| CA | 2751963 | 3/2013 |
| CH | 204783 | 5/1939 |
| CH | 388590 | 2/1965 |
| CH | 469159 | 2/1969 |
| CH | 583400 | 12/1976 |
| CH | 671063 | 7/1989 |
| CN | 201635272 | 11/2010 |
| CN | 102257225 | 11/2011 |
| CN | 202025767 | 11/2011 |
| CN | 202577780 | 12/2012 |
| CN | 103774795 | 5/2014 |
| CN | 203951411 | 11/2014 |
| CN | 104254654 | 12/2014 |
| CN | 105208941 | 12/2015 |
| CN | 206628755 | 11/2017 |
| CN | 206717199 | 12/2017 |
| CN | 206737192 | 12/2017 |
| CN | 206849001 | 1/2018 |
| CN | 108086790 | 5/2018 |
| CN | 108105222 | 6/2018 |
| CN | 108331266 | 7/2018 |
| CN | 208986874 | 6/2019 |
| CN | 305195428 | 6/2019 |
| CN | 305231426 | 6/2019 |
| CN | 308419779 | 1/2024 |
| CN | 308679871 | 6/2024 |
| CN | 309210641 | 4/2025 |
| CN | 309251254 | 4/2025 |
| CN | 309264557 | 4/2025 |
| CO | 6511275 | 8/2012 |
| DE | 298762 | 4/1916 |
| DE | 941690 | 4/1956 |
| DE | 2126082 | 12/1972 |
| DE | 2523087 | 11/1976 |
| DE | 2556095 | 6/1977 |
| DE | 2846451 | 5/1980 |
| DE | 3326223 | 4/1984 |
| DE | 3617225 | 11/1987 |
| DE | 3723020 | 1/1989 |
| DE | 3728831 | 1/1989 |
| DE | 9112788 | 12/1991 |
| DE | 4115240 | 10/1992 |
| DE | 19529351 | 2/1997 |
| DE | 10056177 | 5/2002 |
| DE | 10062697 | 7/2002 |
| DE | 10152354 | 5/2003 |
| DE | 10224437 | 12/2003 |
| DE | 10344202 | 4/2004 |
| DE | 202005006951 | 8/2005 |
| DE | 102005002828 | 8/2006 |
| DE | 202006015336 | 12/2006 |
| DE | 102005039495 | 3/2007 |
| DE | 202007002252 | 4/2007 |
| DE | 202007002232 | 5/2007 |
| DE | 102007023177 | 3/2008 |
| DE | 202007018367 | 7/2008 |
| DE | 102007036206 | 2/2009 |
| DE | 202009010984 | 12/2009 |
| DE | 102008032985 | 1/2010 |
| DE | 102009018362 | 11/2010 |
| DE | 102009035996 | 11/2010 |
| DE | 102009040671 | 3/2011 |
| DE | 202011001761 | 5/2011 |
| DE | 202010007234 | 10/2011 |
| DE | 102010035804 | 3/2012 |
| DE | 102011100484 | 11/2012 |
| DE | 102011050856 | 12/2012 |
| DE | 202012103417 | 12/2012 |
| DE | 102011113289 | 3/2013 |
| DE | 202013002857 | 5/2013 |
| DE | 102013204954 | 9/2014 |
| DE | 202014102469 | 9/2014 |
| DE | 202015102936 | 9/2016 |
| DE | 202012013476 | 2/2017 |
| DE | 102017128371 | 6/2019 |
| EM | 008636021-0004 | 8/2021 |
| EM | 015066767-0001 | 7/2024 |
| EM | 015066767-0002 | 7/2024 |
| EM | 015066767-0003 | 7/2024 |
| EM | 015066767-0004 | 7/2024 |
| EM | 015090992-0003 | 1/2025 |
| EP | 0481905 | 4/1992 |
| EP | 0722023 | 7/1996 |
| EP | 0952272 | 10/1999 |
| EP | 1126098 | 8/2001 |
| EP | 1447494 | 8/2004 |
| EP | 1804008 | 7/2007 |
| EP | 2105971 | 9/2009 |
| EP | 2327942 | 6/2011 |
| EP | 2375185 | 10/2011 |
| EP | 2520877 | 11/2012 |
| EP | 2568231 | 3/2013 |
| EP | 2746695 | 6/2014 |
| EP | 2666925 | 4/2015 |
| EP | 2528166 | 9/2015 |
| EP | 3092350 | 4/2019 |
| EP | 3364124 | 10/2019 |
| EP | 3552307 | 10/2019 |
| EP | 3361183 | 12/2019 |
| EP | 4329192 | 2/2024 |
| FR | 469159 | 7/1914 |
| FR | 1215468 | 4/1960 |
| FR | 2468209 | 4/1981 |
| FR | 2515236 | 4/1983 |
| FR | 2638772 | 5/1990 |
| FR | 2697060 | 4/1994 |
| FR | 2793827 | 11/2000 |
| FR | 2950375 | 3/2011 |
| FR | 2958953 | 10/2011 |
| FR | 2971577 | 8/2012 |
| FR | 2983890 | 6/2013 |
| FR | 2997169 | 4/2014 |
| FR | 3074369 | 12/2019 |
| GB | 2149829 | 6/1985 |

(56) References Cited

FOREIGN PATENT DOCUMENTS

| | | |
|---|---|---|
| GB | 2364077 | 1/2002 |
| GB | 2430946 | 4/2007 |
| GB | 2465484 | 5/2010 |
| GB | 2476104 | 6/2011 |
| JE | 2011-236611 | 11/2011 |
| JP | S56-158486 | 12/1981 |
| JP | H03-166452 | 7/1991 |
| JP | H04-73367 | 3/1992 |
| JP | H04-366294 | 12/1992 |
| JP | H05-346055 | 12/1993 |
| JP | H08-189150 | 7/1996 |
| JP | H09-177272 | 7/1997 |
| JP | H09-256562 | 9/1997 |
| JP | H11-172861 | 6/1999 |
| JP | 2000-120235 | 4/2000 |
| JP | 2000-179106 | 6/2000 |
| JP | 2000-234423 | 8/2000 |
| JP | 2000-303638 | 10/2000 |
| JP | 2001-193231 | 6/2001 |
| JP | 2001-182238 | 7/2001 |
| JP | 2001-303724 | 10/2001 |
| JP | 2002-146978 | 5/2002 |
| JP | 2002-180609 | 6/2002 |
| JP | 2003-096986 | 4/2003 |
| JP | 2003-155803 | 5/2003 |
| JP | 2003-213854 | 7/2003 |
| JP | 3475781 | 12/2003 |
| JP | 2004-060358 | 2/2004 |
| JP | 2004-068270 | 3/2004 |
| JP | 2004-092134 | 3/2004 |
| JP | 2004-116658 | 4/2004 |
| JP | 2004-124583 | 4/2004 |
| JP | 2004-153626 | 6/2004 |
| JP | 2004-264009 | 9/2004 |
| JP | 2004-278145 | 10/2004 |
| JP | 2005-171623 | 6/2005 |
| JP | 2005-322821 | 11/2005 |
| JP | 2006-057357 | 3/2006 |
| JP | 2006-097291 | 4/2006 |
| JP | 2006-144268 | 6/2006 |
| JP | 2009-052278 | 3/2009 |
| JP | 2009-179955 | 8/2009 |
| JP | 2009-185599 | 8/2009 |
| JP | 4381634 | 12/2009 |
| JP | 2010-196422 | 9/2010 |
| JP | 2011-069130 | 4/2011 |
| JP | 2011-185014 | 9/2011 |
| JP | 2012-144903 | 8/2012 |
| JP | 2013-083044 | 5/2013 |
| JP | 2013-136892 | 7/2013 |
| JP | 2014-034872 | 2/2014 |
| JP | 2014-047460 | 3/2014 |
| JP | 6033922 | 11/2016 |
| JP | 2018-091009 | 6/2018 |
| JP | 2018-131729 | 8/2018 |
| JP | D1749360 | 7/2023 |
| KR | 100957530 | 5/2010 |
| MX | 2017016056 | 8/2018 |
| NL | 2021378 | 1/2020 |
| NL | 2021379 | 1/2020 |
| NL | 2021380 | 1/2020 |
| NL | 2021740 | 5/2020 |
| PT | 3066398 | 12/2019 |
| PT | 3066399 | 12/2019 |
| WO | WO 96/08617 | 3/1996 |
| WO | WO 96/30606 | 10/1996 |
| WO | WO 97/08399 | 3/1997 |
| WO | WO 99/55982 | 11/1999 |
| WO | WO 01/39331 | 5/2001 |
| WO | WO 03/098126 | 11/2003 |
| WO | WO 2008/021714 | 2/2008 |
| WO | WO 2008/028151 | 3/2008 |
| WO | WO 2008/152748 | 12/2008 |
| WO | WO D071894-023 | 6/2009 |
| WO | WO 2010/112049 | 10/2010 |
| WO | WO 2010/113003 | 10/2010 |
| WO | WO 2010/121830 | 10/2010 |
| WO | WO 2010/140878 | 12/2010 |
| WO | WO 2011/019460 | 2/2011 |
| WO | WO 2011/082730 | 7/2011 |
| WO | WO 2011/154019 | 12/2011 |
| WO | WO 2012/014203 | 2/2012 |
| WO | WO 2012/017711 | 2/2012 |
| WO | WO 2012/048056 | 4/2012 |
| WO | WO 2012/116121 | 8/2012 |
| WO | WO 2012/116777 | 9/2012 |
| WO | WO 2013/009375 | 1/2013 |
| WO | WO 2013/092428 | 6/2013 |
| WO | WO 2014/194576 | 12/2014 |
| WO | WO 2015/061113 | 4/2015 |
| WO | WO 2016/198305 | 12/2016 |
| WO | WO 2016/204941 | 12/2016 |
| WO | WO 2018/169391 | 9/2018 |
| WO | WO 2019/239024 | 12/2019 |
| WO | WO 2020/022879 | 1/2020 |
| WO | WO 2020/022880 | 1/2020 |
| WO | WO 2020/162746 | 8/2020 |
| WO | WO 2020/187472 | 9/2020 |
| WO | WO 2021/043407 | 3/2021 |
| WO | WO 2021/061866 | 4/2021 |
| WO | WO 2021/086185 | 5/2021 |
| WO | WO 2021/102062 | 5/2021 |
| WO | WO 2021/119458 | 6/2021 |
| WO | WO 2022/240909 | 11/2022 |
| WO | WO 2023/028101 | 3/2023 |
| WO | WO 2023/177662 | 9/2023 |
| WO | WO 2023/192199 | 10/2023 |
| WO | WO-2024216014 A2 * | 10/2024 ............... E04D 3/36 |

OTHER PUBLICATIONS

"Ace Clamp Cut Sheet | 5031 Z1-2," Ace Clamp, Nov. 2018, 1 page.
"ADJ Heavy Duty Lighting C-clamp," Sweetwater, 2011, 3 pages [retrieved online from: http://web.archive.org/web/20111112045516/http://www.sweetwater.com/store/detail/CClamp/].
"Aerocompact® Compactmetal TR Checklist," Aerocompact, Aug. 30, 2021, CL TR ENG EU V1, 2 pages [retrieved online from: cdn.intelligencebank.com/eu/share/8MnR/YJMd/ZBPL4/original/AEROCOMPACT_CL_TR_ENG_V1_WEB].
"Aerocompact® Compactmetal TR," Aerocompact, Sep. 2, 2021, PB TR ENG EU V1, 3 pages [retrieved online from: cdn.intelligencebank.com/eu/share/8MnR/qMBXP/VYrWa/original/AEROCOMPACT_Leaflet_TR_ENG_V1_Web].
"Aluminum," Wikipedia, Jul. 3, 2016, 21 pages [retrieved Oct. 3, 2017 from: en.wikipedia.org/w1ki/Aluminium].
"ClampFit-H Product Sheet," Schletter GmbH, Kirchdorf, Germany, Nov. 2015, 2 pages.
"Code: The SR-EC-010," Lockseam Ltd., Received Nov. 9, 2022, Datasheet SR-EC-010 Version 2.0, 6 pages.
"CompactMETAL TR59 | TR74 Assembly Instructions," Aerocompact, Sep. 2021, 27 pages.
"ERK-TRB-C16 RiverClack Roofing Profile Interface," Enerack, 2021, 2 pages [retrieved online from: www.enerack.com/erk-trb-c16-riverclack-roofing-profile-interface-p00231p1.html].
"EZ Grip Metal Deck Mount," SunModo Corp., 2019, 1 page.
"EZ Grip Metal Deck Mount," SunModo Corp., 2019, Product page, 3 pages [retrieved online May 30, 2019 from: sunmodo.com/product/ez-grip-metal-deck-mount/#].
"Fix2000 check list," Schletter GmbH, last updated Jul. 2010, 1 page.
"Grounding Clip for Electrical Protection," ARaymond, 2016, 2 pages.
"Installation Instructions for Rayvolt®—Grounding clip for Framed PV Modules," ARaymond, Feb. 2016, Version 2.2, 1 page.
"Kee Walk—Roof Top Walkway," Simplified Safety, 2011, 3 pages [retrieved online from: https://web.archive.org/web/20120207115154/http://simplifiedsafety.com/solutions/keewalk-rooftop-walkway/].
"KeeLine® The Safety Solution for Horizontal Life Lines," Kee Safety, Ltd. 2012, 2 pages [retrieved online from: https://web.archive.org/web/20120305120830/http://keesafety.co.uk/products/kee_line].

(56) References Cited

OTHER PUBLICATIONS

"LM-KS-700," Lumax Energy, 2018, 1 page.
"LM-TBR-VL," Lumax Energy, Oct. 2018, 1 page [retrieved online from: https://lumaxenergy.co.za/wp-content/uploads/2018/12/Lumax-Energy-LM-TBR-VL.pdf/].
"Metal Roof Deck Mount Kit," SunModo Corp., Oct. 16, 2018, Product Drawing, 1 page.
"Miller Fusion Roof Anchor Post," Miller Fall Protection, 2011, 3 pages [retrieved online from: https://web.archive.org/web/20111211154954/www.millerfallprotection.com/fall-protection-products/roofing-products/miller-fusion-roof-anchor-post].
"MLPE Mount," Unirac, Dec. 2016, 1 page.
"New 'Alzone 360 system'", Arrid, 2008, 34 pages [retrieved online from: https://web.archive.org/web/20120317120735/www.arrid.com.au/?act=racking_parts].
"Non-Penetrative Clamps with Roofs," Clenergy, Dec. 2021, Datasheet, 5 pages.
"Oil Canning - Solutions," Pac-Clad, 2001, 2 pages [retrieved online from: pac-clad.com/aiapresentation/sld021.htm].
"Oil Canning," Metal Construction Association, 2003, Technical Bulletin #95-1060, 2 pages.
"ProteaBracket™ Brochure," Metal Roof Innovations, Ltd., 2019, 2 pages.
"ProteaBracket™ Install Instructions," Metal Roof Innovations, Ltd., 2022, 2 pages.
"PV-ezRack Klip-Iok Interface," Clenergy, 2020, 1 page.
"PV-ezRack SolarRoof-Black Anodized," Clenergy, 2020, 4 pages.
"Rail System," Pegasus Solar, 2021, 2 pages.
"REES-Snow Retention Systems," Weerbewind, 2010, 3 pages [retrieved online from: https://web.archive.org/web/20100310075027/www.rees-oberstdorf.de/en/products/snow-retention-system.html].
"Renusol 420082 Mid Clamp (G)," TradeSparky, 2024, 6 pages [retrieved online Mar. 27, 24 from: www.tradesparky.com/solarsparky/mounting/reusol/mids/renusol-420082-mid-clamp-g].
"S-5! WindClamp™ Install," Metal Roof Innovations, Ltd., 2014, 1 page.
"Slot definition," Merriam-Webster Dictionary, 2022, 1 page [retrieved online Aug. 24, 2022 from www.merriam-webster.com/dictionary/slot].
"Solar mount. System," Schletter GmbH, 2012, 1 page [retrieved online from: https://web.archive.org/web/20120316154604/www.schletter.de/152-1-Solar-mounting-systems.html].
"Standing Seam Metal Roof Solar Clamps," Mibet Energy, 2021, 13 pages [retrieved online Mar. 27, 24 from: www.mbt-energy.com/products/roof-pv/list-1.html].
"Standing Seam Rail Free One Sheet," SunModo, Corp., 2020, 2 pages.
"Standing Seam RiverClack Clamp," Shanghai Woqin New Energy Technology Co., LTD., 2018, 4 pages [retrieved online on Mar. 23, 2022 from: www.wochnmount.com/Details.html?product_id=36].
"SunDock Standing Seam PV Mounting System Installation Manual," SunModo, 2019, Doc. No. D10160-V006, 14 pages.
"SunDock™ Standing Seam Rail-Free Attachment System," SunModo Corp., 2018, 1 page.
"Universal Clamps Brochure for Web," Universal Clamps, 2020, 2 pages.
"Universal Klip-Iok Interface pre-assembly with Cross Connector Clamp," Clenergy, 2020, 1 page.
"Universal Klip-Iok Interface pre-assembly with Tin Interface A with ezClick module," Clenergy, 2020, 1 page.
"Wiley Grounding & Bonding Solutions," Hubbell, 2020, 2 pages [retrieved online from: www.hubbell.com/wiley/en/grounding-and-bonding].
"Wind Clamp Double LOK," Metal Roof Innovations, Ltd., Mar. 7, 2011, Drawing No. WC15-A-0-A_CCD, 1 page.
"Wind Clamp Ultra DEK," Metal Roof Innovations, Ltd., Mar. 7, 2011, Drawing No. WC14-A-0-A_CCD, 1 page.
"Wind Clamps for Metal Roofs," Metal Roof Innovations, Ltd., 2017, Version 081717, 2 pages.
"QRail® System, Installation Manual," Quick Mount PV, Jul. 2019, Rev. 4.2, 48 pages.
Gallo "Oil-Canning," Metal Roofing Alliance, Ask-the-experts forum, Jun. 7, 2005, 4 pages [retrieved online from: www.metalroofingalliance.net/v2/forums/printview.cfm?action=mboard.members/viewmessages& ForumTopicID=4921&ForumCategoryID=1].
Haddock "History and Materials," Metalmag, Metal roofing from A (Aluminum) to Z (Zinc)—Part I, Sep./Oct. 2001, 4 pages.
Haddock "Metallic Coatings for Carbon Steel," Metalmag, Metal roofing from a (Aluminum) to Z (Zinc)—Part II, Nov./Dec. 2001, 8 pages.
Notice of Allowance with English Translation for China Patent Application No. 202330662042.1, dated Apr. 17, 2024 4 pages.
Notice of Allowance with English Translation for China Patent Application No. 202330662061.4, dated Apr. 17, 2024 4 pages.
Notice of Allowance with English Translation for China Patent Application No. 202330662073.7, dated Apr. 17, 2024 4 pages.
Official Action for India Design Application No. 397559-001, dated Nov. 28, 2023 2 pages.
Official Action for New Zealand Design Patent Application No. 432728, dated Oct. 31, 2023 2 pages.
Invitation to Pay Additional Fees for International (PCT) Patent Application No. PCT/US2024/024244, dated Jul. 5, 2024 3 pages.
"Aluminium Alloy Roof Mounting Clamp Bracket," Amazon.com, posted Jan. 5, 2020, 3 pages [retrieved online Apr. 11, 25 from: www.amazon.com/Aexit-Aluminium-Diamond-Mounting-Bracket/dp/B07MLF4BWJ].
Aluminum Roof Mount clamp down with Fastening Rail, DH Gate, 2025, 5 pages [retrieved online from: www.dhgate.com/product/solar-panel-module-aluminum-bracket-rail/963547197.html?skuld=1239162678779494408].
"ARRID Australia—System," ARRID Australia, 9 pages [retrieved online May 28, 25 from: www.arrid.com.au/?act=system].
"Mini C Clamps," Amazon.com, posted Dec. 1, 2021, 12 pages [retrieved online Apr. 11, 25 from: www.amazon.com/Stainless-0-83-Inch-Mounting-Universal/dp/B09MTHNCDW?ref_=ast_sto_dp&th=1].
Proteabracket, posted date unavailable [online], [retrieved May 28, 2025]. Retrieved from internet: https://metalplusllc.com/producU proteabracket/ (Year: 2025).
S-5! ProteaBracket, posted date unavailable [online], [retrieved May 28, 2025]. Retrieved from internet: https://solartekcorp.com/products/s-5-proteabracket-attachment-w-set-screws (Year: 2025).
Solar Mount for Exposed Fastener, Trapezoidal, and Ribbed Metal Roofs, posted date available [Aug. 27, 2024], [retrieved May 28, 2025]. Retrieved from internet: https://roofi ngmagazine.com/solar-mount-for-exposed-fastener-trapezoidal-and-ribbed-metal-roofs/ (Year: 2024).
Solar System Panel Mounting Structure Roof Brackets, Hina, 2025, 5 pages [retrieved online from: www.hainafastener.com/Stainless-Steel-Metal-Adjustable-Mount-Bracket-PV-Bracket-Solar-System-Panel-Mounting-Structure-Roof-Brackets-Aluminum-Bracket-Tile-Roof-Bracket-Solar-Brackets-pd40964455.html].
"Solar Panel Mounting Brackets," Amazon.com, posted online Jan. 10, 2022, 6 pages [retrieved online May 28, 25 from: a.co/d/12tvWi9].
Sustainable 8 Panel Solar Mounting Kit, Sustainable.co.za, 2025, 7 pages [retrieved online from: www.sustainable.co.za/products/sustainable-8-panel-solar-mounting-kit].
"UniRac SunFrame Cap Strip Screw," EcoDirect, posted online Sep. 3, 2020, 3 pages [retrieved online May 28, 25 from: www.ecodirect.com/UniRac-209001C-1-Cap-Strip-Screw-Clear-p/unirac-209001c.htm].
International Search Report and Written Opinion for International (PCT) Patent Application No. PCT/US24/24244, dated Sep. 11, 2024 21 pages.
Notice of Acceptance for South Africa Design Patent Application No. A2023/01119, dated Jun. 14, 2024 2 pages.
Notice of Acceptance for South Africa Design Patent Application No. A2023/01120, dated Jun. 14, 2024.
Official Action for U.S. Appl. No. 29/874,164, dated Dec. 20, 2024 12 pages.

(56) References Cited

OTHER PUBLICATIONS

Official Action for U.S. Appl. No. 29/874,164, dated Apr. 17, 2025 6 pages.

* cited by examiner

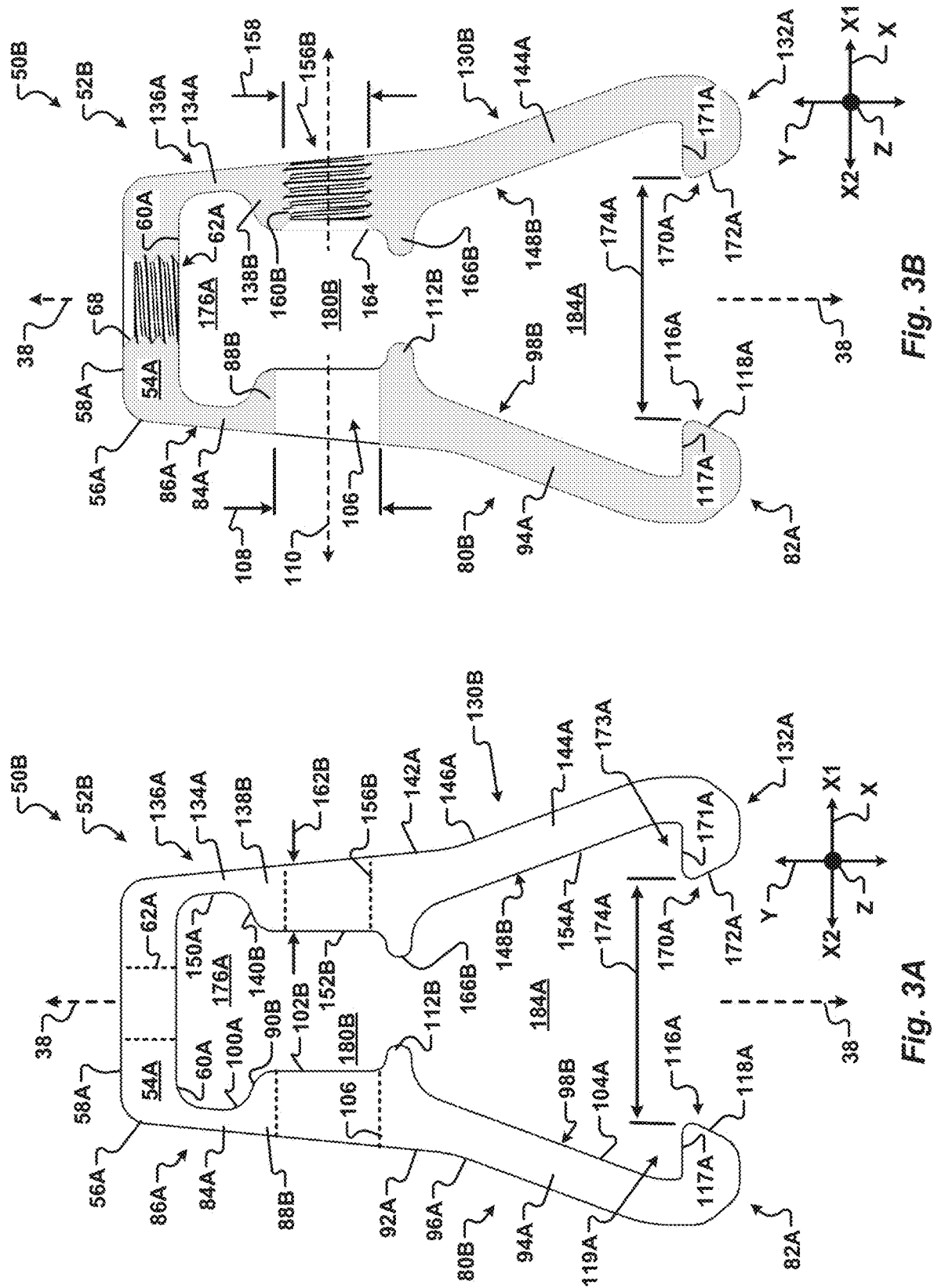

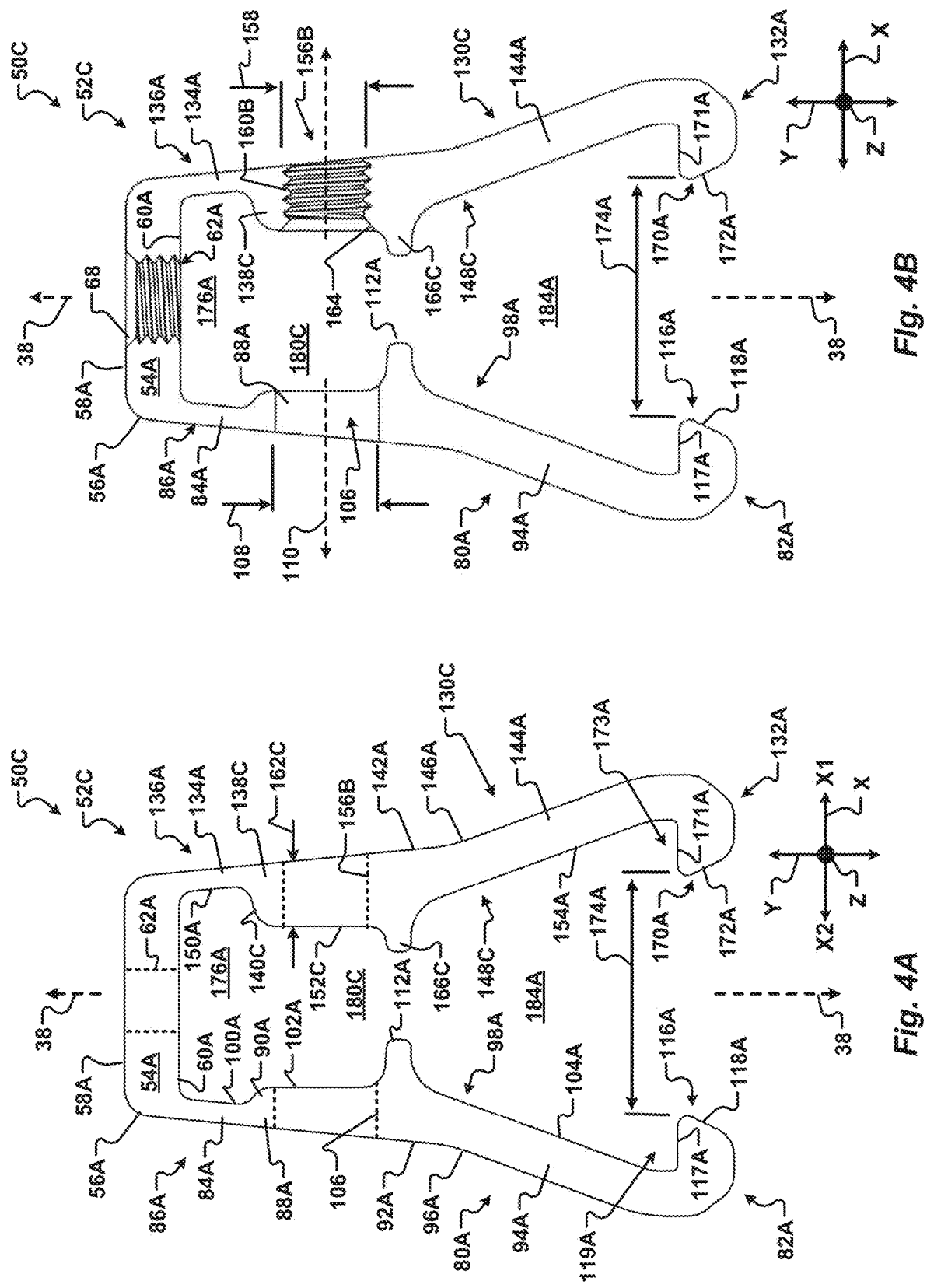

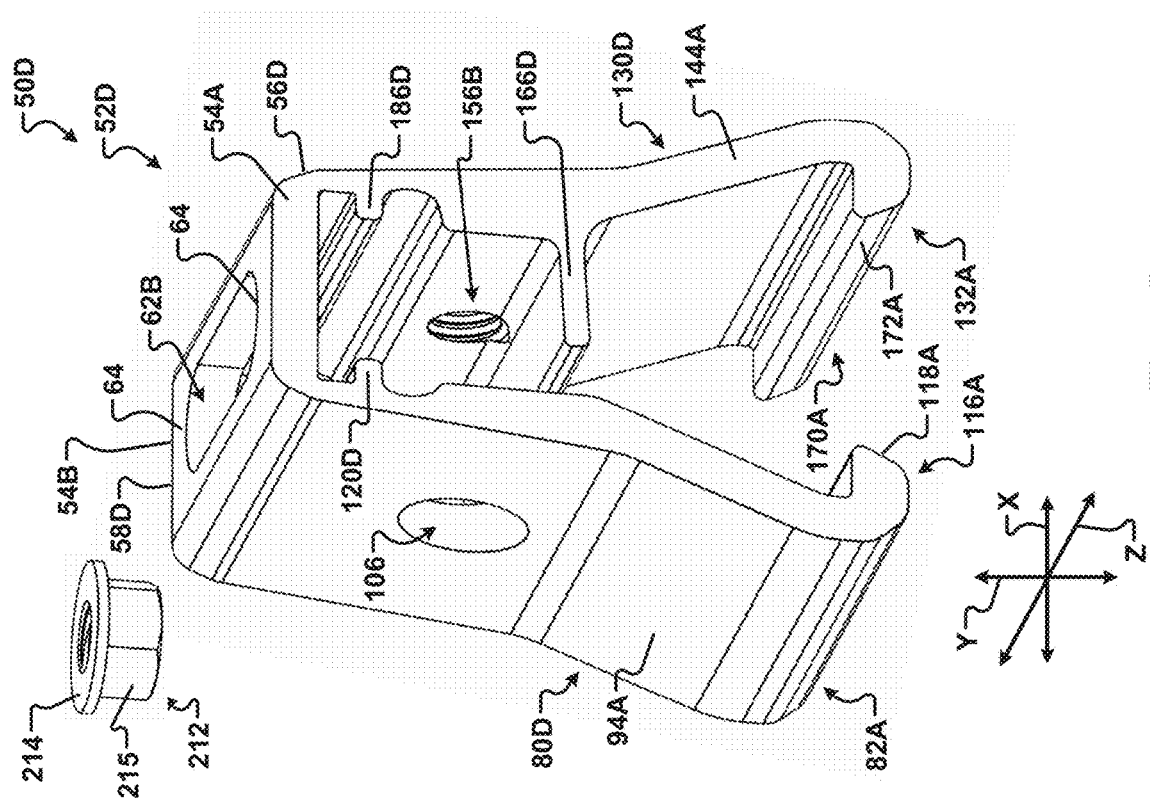
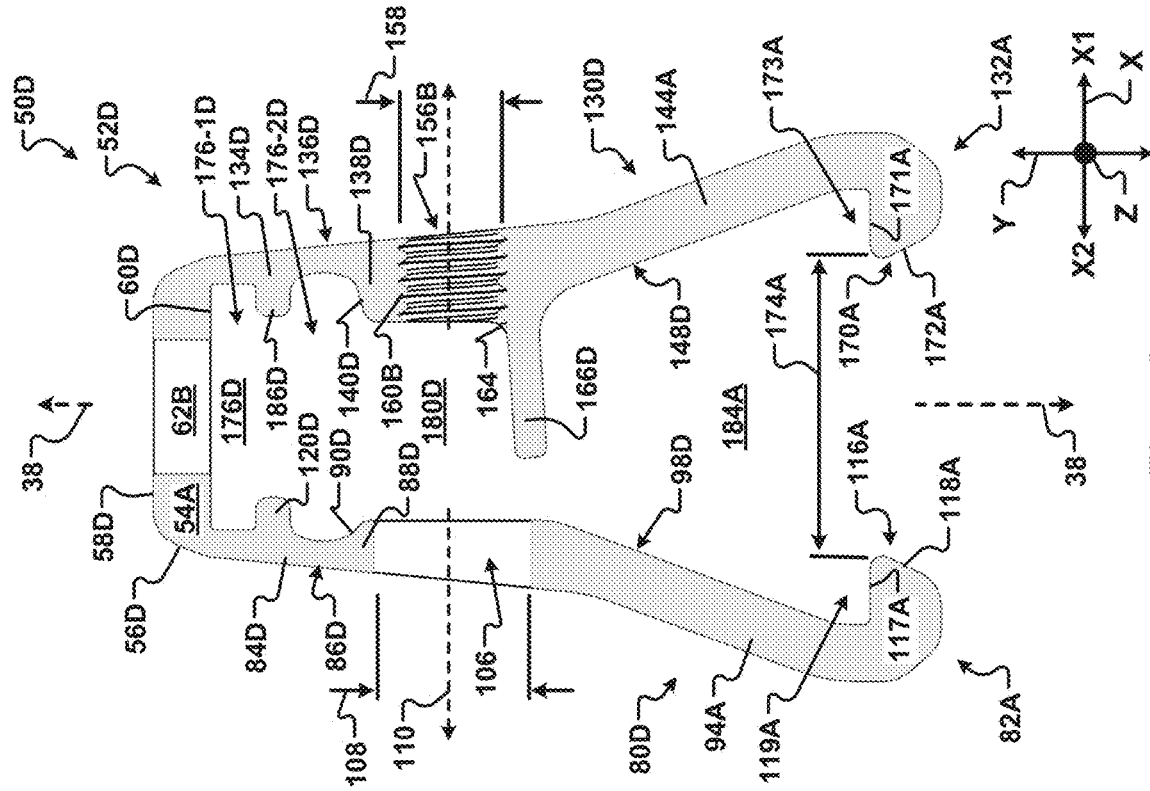
Fig. 5B
Fig. 5A

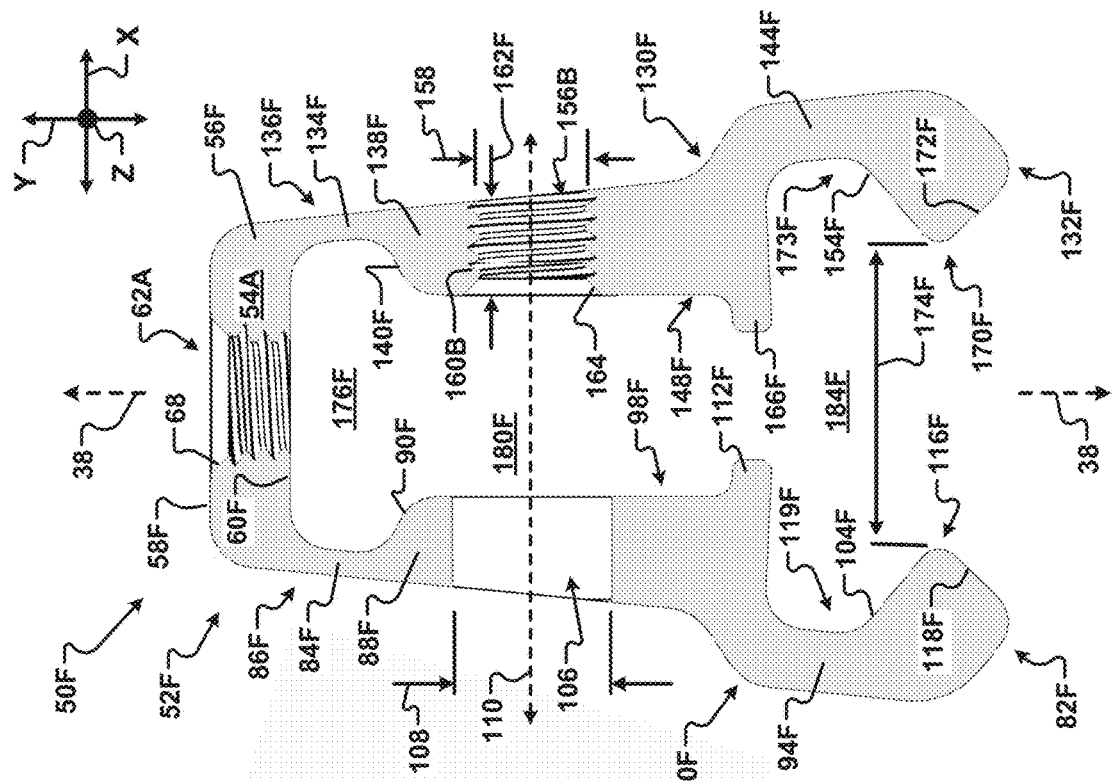
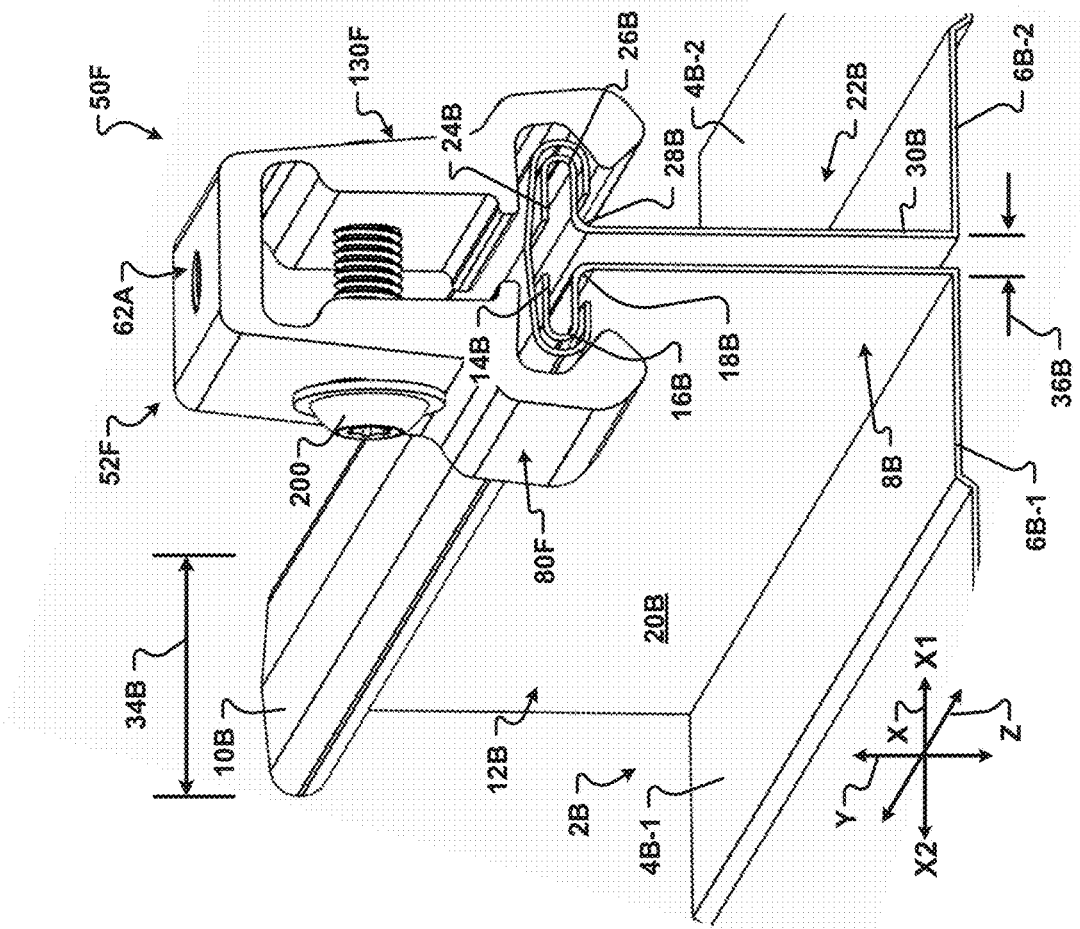
Fig. 7B
Fig. 7A

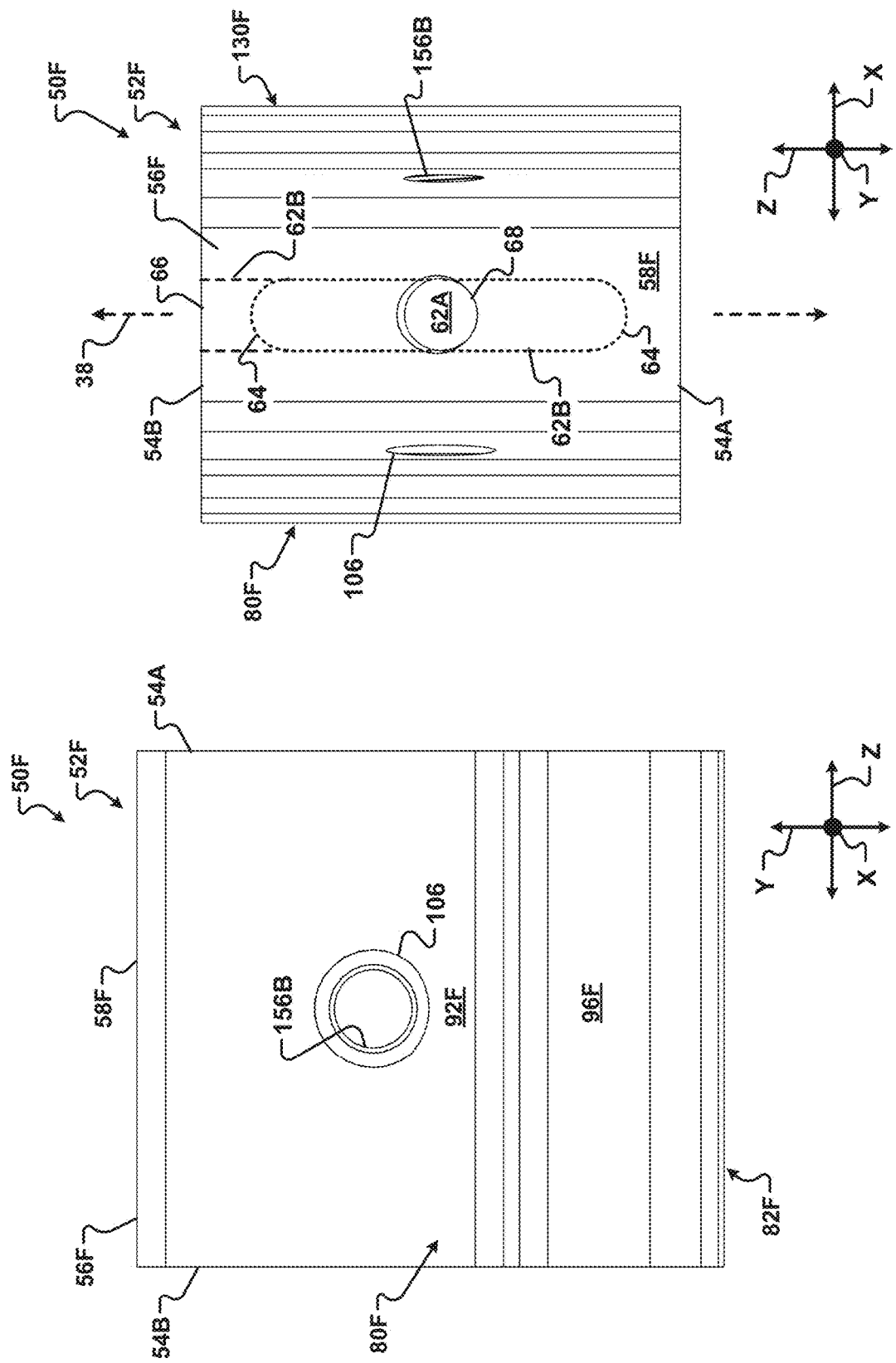

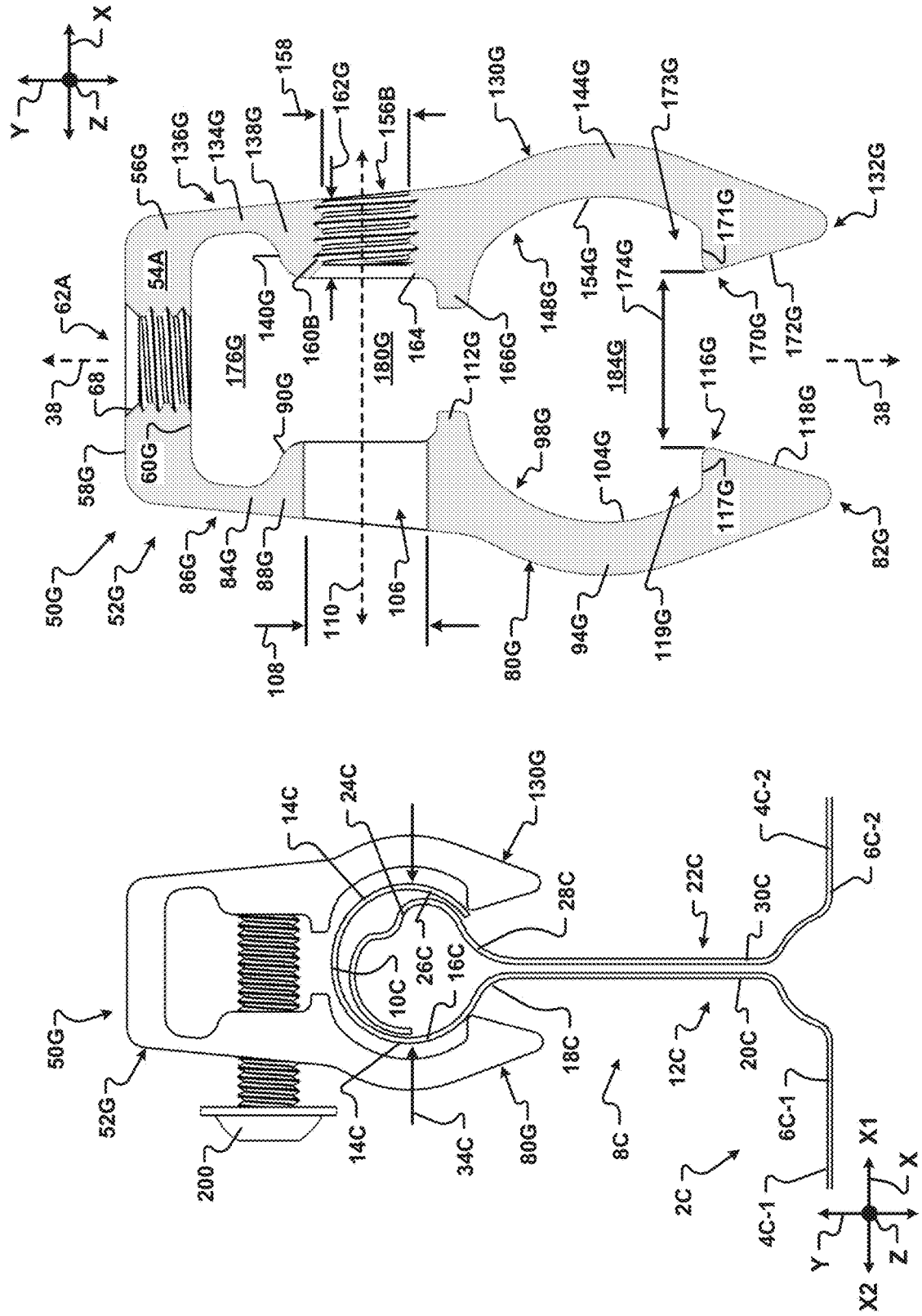

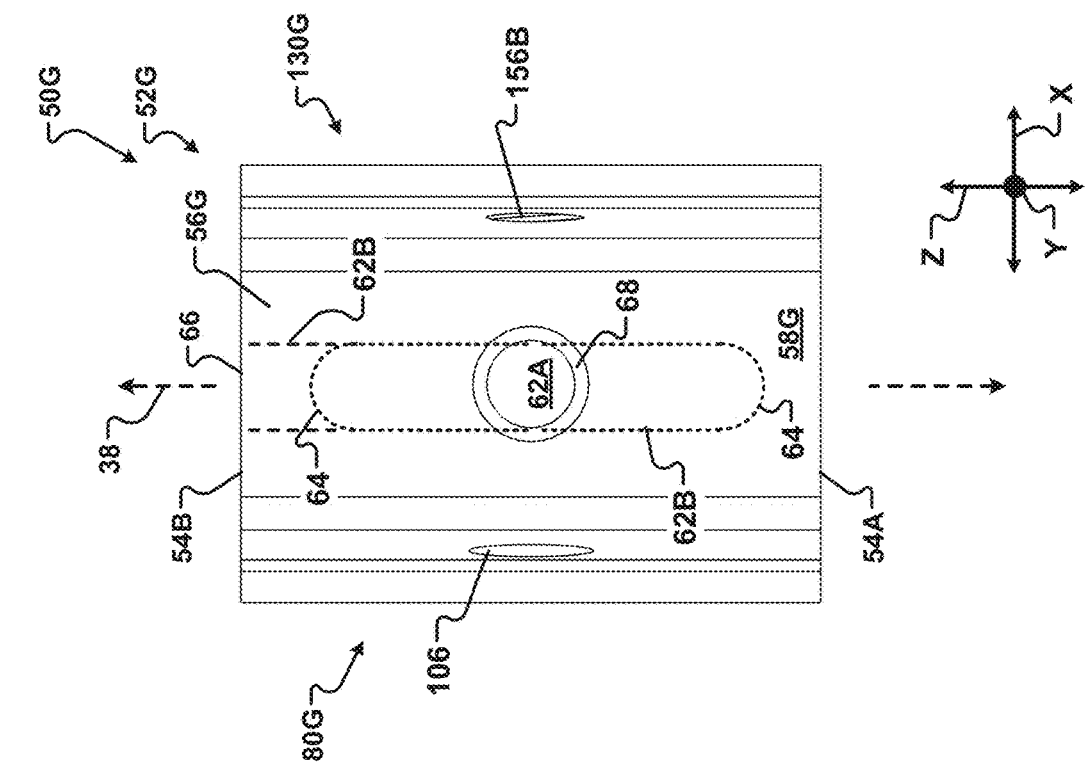
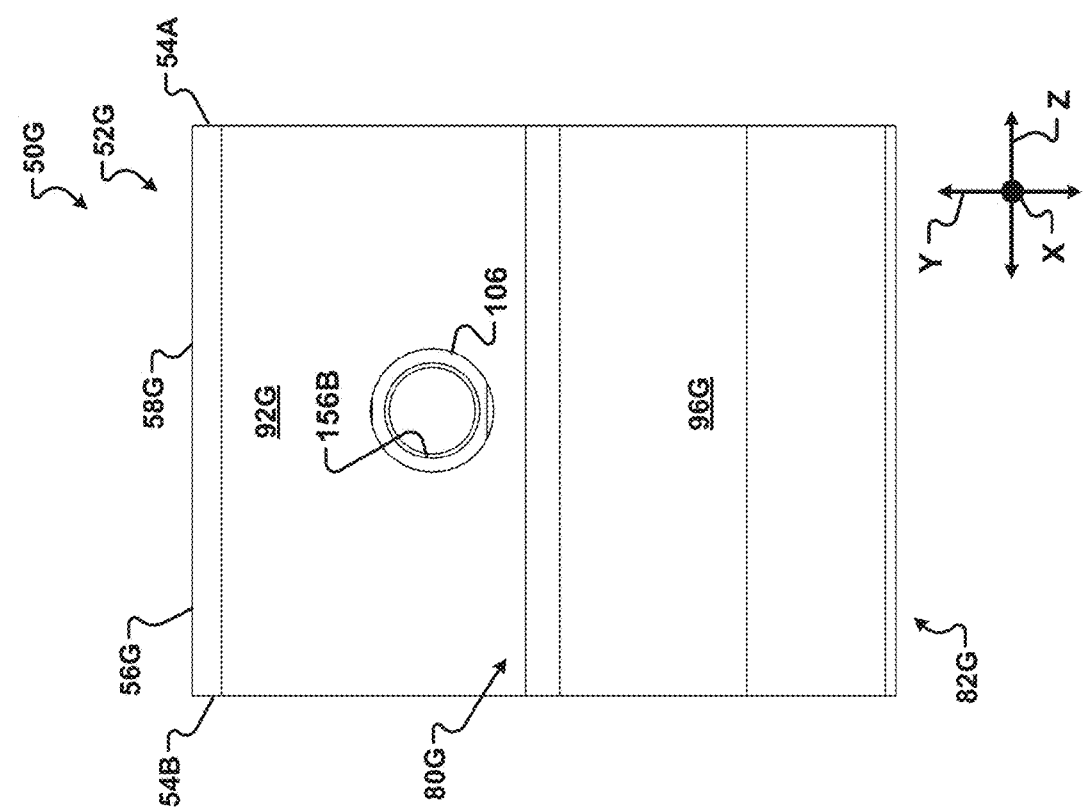
Fig. 8D
Fig. 8C

MOUNTING DEVICE FOR A METAL PANEL

CROSS-REFERENCE TO RELATED APPLICATIONS

This application claims the benefit of priority under 35 U.S.C. § 119(e) to U.S. Provisional Patent Application No. 63/459,391, filed on Apr. 14, 2023, the entirety of which is incorporated herein by reference.

FIELD

The present disclosure relates to mounting devices or clamps configured to be secured to a projection extending from a metal panel defining a roof or a sidewall of a building.

BACKGROUND

Metal panels are frequently used to construct parts of buildings such as roofs and sidewalls. During construction, adjacent panels are connected at joints, which are weatherproof and protect the building from the external environment. One type of joint is a standing seam joint that extends or protrudes away from the main surfaces of the panels. The standing seam mechanically joins two adjacent metal panels. These seamed joints may have many different configurations, including a single fold, double fold, snap seam, snap lock, nail strip, batten cap, T-seam, and bulb seam. Some roof joints, including bulb seams, may be slidably connected to an underlying halter or clip, such that the roof joint "floats" on the underlying halter or clip. Some metal panels have ribs that extend from the panel. The ribs are positioned between seams that join the metal panel to adjacent metal panels.

It is often desirable to install various types of structures such as heating units, air conditioning units, ventilation equipment, solar panels, snow retention systems, and the like on metal panels, particularly metal panels used to form a roof. These structures can be secured to the metal panel with fasteners. However, installing structures on the roof in a manner that punctures the metal panel or which requires the formation of a hole through the metal panel is undesirable. Puncturing the metal panel or a roof joint with a fastener that forms or requires a hole presents leakage and corrosion issues for the roof, and holes in the metal panel are aesthetically displeasing. Further, forming holes through a metal panel may void a warranty provided by the manufacturer.

Mounting devices can provide a location for these structures to mount to a roof Typically, a mounting device is secured to a fold, a joint or a seam between two metal panels or to a rib extending from a metal panel (collectively referred to herein as "a panel projection") without puncturing the metal panel. A structure may then be connected to the mounting device. Mounting devices can be secured to the roof by squeezing or clamping to the panel projection that extends away from the roof.

Some known mounting devices include multiple components that must be assembled properly to securely engage the panel projection. This takes time and increases the cost of installing the mounting devices. If the components are improperly aligned, or assembled incorrectly, the mounting device may not properly engage the panel projection which may damage the roof and cause a risk that structures which are subsequently secured to the mounting device will come loose.

Other mounting devices include set screws or other threaded fasteners that are driven against a portion of the panel projection (such as against a sidewall). As the fastener is driven against the panel projection, rotation of the end of the fastener against the panel projection can scratch the metal panel or damage protective coatings on the metal panel. Another problem is that the fastener may bend or deform the panel projection. Further, for mounting devices configured to engage a roof joint (such as a bulb seam) installed on a support (e.g., a halter or a clip), it is undesirable for a fastener driven against the roof joint to squeeze the roof joint to an extent that it is no longer able to float on the support. As will be appreciated by one of skill in the art, the supports (the halter or clip) are designed to permit thermal movement of the metal panel and associated components. If a mounting device damages the support, the metal panels may not be able to move in response to thermal cycling which may degrade the integrity of the roof joint. Also, a mounting device may crush the bulb of a roof joint which can damage the integrity of the roof joint, potentially allowing moisture and other external elements through the roof and into the building. Damaging the integrity of the roof joint can also make replacement or disassembly of the roof joint and/or the associated metal panels more difficult.

SUMMARY

Accordingly, there is a need for a mounting device which can be secured to a panel projection quickly and easily without damaging the panel projection, with the mounting device being economical to produce.

A first aspect of the disclosure is a mounting system selectively engageable to a panel projection extending from a surface of a building. The mounting system comprises: (1) amounting device with a body, the body comprising: (a) a wall with an upper surface and an attachment aperture extending through the upper surface; (b) a first leg that extends from the wall to a first free end, the first leg comprising: (i) a first inside surface; and (ii) a first aperture extending along a first axis through the first leg, the first aperture being unthreaded and having a first interior diameter; (c) a second leg that extends from the wall to a second free end, the second leg comprising: (i) a second inside surface facing the first inside surface; and (ii) a second aperture extending through the second leg, the second aperture having a second interior diameter that is less than the first interior diameter, and the first axis extends through the second aperture; (d) a receptacle for the panel projection defined by portions of the first and second inside surfaces, the receptacle positioned between the first and second apertures and the first and second free ends of the first and second legs; and (2) a clamping fastener, comprising: (a) a head with a first outer diameter that is greater than the first interior diameter of the first aperture; (b) a shaft extending from the head, the shaft comprising a second outer diameter that is less than: the first outer diameter, the first interior diameter of the first aperture, and the second interior diameter of the second aperture; and (c) an exterior thread.

In some embodiments, the mounting system of the first aspect further comprises: (a) a first protuberance extending from the first inside surface of the first leg in a first lateral direction, the first aperture extending through the first leg at a position between the wall and the first protuberance; and (b) a second protuberance extending from the second inside surface of the second leg in a second lateral direction that is opposite to the first lateral direction, the second protuberance extending toward the first protuberance, and the second aperture extending through the second leg at a position between the wall and the second protuberance.

In some embodiments the mounting system of the first aspect may comprise the previous embodiment and optionally bottom surfaces of the first and second protuberances are positioned proximate to an endwall of the panel projection when the body is engaged to the panel projection.

In at least some embodiments, the second aperture is unthreaded.

In at least one embodiment, the mounting system of the first aspect may include any one or more of the previous embodiments and optionally the second aperture has an interior thread configured to engage the exterior thread of the clamping fastener.

In some embodiments the mounting system of the first aspect includes one or more of the previous embodiments and the exterior thread of the clamping fastener has a thread pitch, and optionally the second aperture has a length at least two times greater than the thread pitch. In one or more embodiments, the length of the second aperture is at least four times greater than the thread pitch.

The mounting system of the first aspect may include one or more of the previous embodiments, and optionally the second aperture has a length of at least 3 mm.

In at least one embodiment, the length of the second aperture is about 4 mm.

In some embodiments, the length of the second aperture is between about 3 mm and about 7 mm.

In at least some embodiments, the body is configured to be engaged to the panel projection with the panel projection positioned within the receptacle and with the shaft of the clamping fastener extending through the first aperture into threaded engagement with the second aperture, and the body is configured such that the shaft of the clamping fastener does not contact the endwall of the panel projection.

In some embodiments the mounting system of the first aspect includes any one or more of the previous embodiments and may further comprise one or more of: (a) a first hook proximate to the first free end of the first leg, the first hook extending in a first lateral direction toward the second leg; and (b) a second hook proximate to the second free end of the second leg, the second hook extending in a second lateral direction substantially opposite to the first lateral direction.

In at least one embodiment, when the body is engaged to the panel projection: (a) the first hook of the first leg is positioned at least partially within a first recess on a first side of the panel projection; and (b) the second hook of the second leg is positioned at least partially within a second recess on a second side of the panel projection.

In some embodiments the mounting system of the first aspect includes any one or more of the previous embodiments and the first and second legs are flexibly deflectable from a first position to a second position. In the first position, the first and second hooks are separated by a first distance. In the second position, the first and second hooks are separated by a second distance that is greater than the first distance.

The mounting system of the first aspect may include any one or more of the previous embodiments and in some embodiments, when the body is engaged to the panel projection, the exterior thread of the shaft is engaged with the interior thread of the second aperture and the head of the clamping fastener is adjacent to an outside surface of the first leg.

In some embodiments the mounting system of the first aspect includes any one or more of the previous embodiments and further comprises: (a) a first portion of the first leg extending from the wall, the first portion defining a first hinge such that the first leg is flexible relative to the wall; (b) a second portion of the first leg extending from the first portion; and (c) a third portion of the first leg extending from the second portion to the first free end.

In at least one embodiment, the first portion has a first thickness measured in a lateral dimension, and the second portion has a second thickness measured in the lateral dimension, the second thickness being greater than the first thickness.

In at least one embodiment, the first portion of the first leg bends when the first leg moves from the first position to the second position.

The body is configured such that, when the head of the clamping fastener is not applying a force to the body, the second portion is oriented at a first angle with respect to a vertical reference plane that bisects the body and extends through the attachment aperture. Further, when the head of the clamping fastener is applying a force to an outside surface of the second portion of the first leg, the orientation of the second portion changes to a second angle with respect to the vertical reference plane.

In at least one embodiment, the second angle is between about −5° and about 5°.

In some embodiments the mounting system of the first aspect includes any one or more of the previous embodiments, and optionally the first aperture extends through the second portion of the first leg.

The first portion of the first leg has a first thickness and the second portion of the first leg has a second thickness. In at least one embodiment, the second thickness is greater than the first thickness.

In some embodiments the mounting system of the first aspect includes any one or more of the previous embodiments and optionally further comprises: (a) a medial slot positioned between medial portions of the first and second inside surfaces, the medial slot having a medial slot width measured in a lateral direction, wherein the first and second apertures extend through the medial portions of the first and second inside surfaces; and (b) an upper slot positioned between the medial slot and the wall, the upper slot having an upper slot width measured in the lateral direction that is greater than the medial slot width, the upper slot adapted to receive a nut configured to engage a threaded shaft of a fastener extending through the attachment aperture.

The mounting system of the first aspect optionally includes any one or more of the previous embodiments and in some embodiments further comprises a countersink formed in the second inside surface at an intersection with the second aperture such that the countersink faces the first aperture.

In one or more embodiments, the first interior diameter is at least approximately 8 mm.

The second interior diameter is optionally between approximately 5 mm and 8 mm.

In some embodiments the mounting system of the first aspect includes any one or more of the previous embodiments and optionally the attachment aperture extends through a lower surface of the wall.

The mounting system of the first aspect may include any one or more of the previous embodiments and in some embodiments the attachment aperture is threaded.

Optionally, in some embodiments, the wall has a thickness such that an interior thread of the attachment aperture has a length of at least two times greater than a thread pitch of the interior thread.

In some embodiments, the interior thread of the attachment aperture has at least two revolutions within the attachment aperture.

In at least one embodiment, the wall has a thickness of between about 0.15 inch and about 0.3 inch (between about 3.81 mm and about 7.62 mm).

Optionally, the thickness of the wall is about 0.2 inch (about 5.1 mm).

The attachment aperture optionally is elongated in a longitudinal direction to define a slot, the longitudinal direction being orthogonal to the lateral direction.

In some embodiments the mounting system of the first aspect includes any one or more of the previous embodiments and in some embodiments the upper surface of the wall is generally planar.

The body is optionally configured such that no portion of the body extends above the upper surface of the wall.

In one or more embodiment, the mounting system of the first aspect further comprises a body that is formed by an extrusion process, and wherein the body is of a one-piece construction.

The mounting system of the first aspect optionally includes any one or more of the previous embodiments, and in some embodiments the body is configured such that, when the shaft of the clamping fastener is not extending through the first and second apertures, the body is in a first state and the first leg is only connected to the second leg by the wall.

In some embodiments the mounting system of the first aspect includes any one or more of the previous embodiments and optionally the body is formed of an aluminum alloy.

The mounting system of the first aspect may include any one or more of the previous embodiments and optionally the first leg has a first shape in an end view and the second leg has a second shape in the end view, the second shape being identical to the first shape.

In at least some embodiments, the panel projection extending from a building surface is a rib extending from a metal panel and the body is configured to engage the rib.

In some other embodiments, the panel projection is a seam or a joint where two metal panels are joined together and the body is configured to engage the seam or joint.

The mounting system of the first aspect may include any one or more of the previous embodiments and in some embodiments a first portion of the first inside surface extends between the first protuberance and the first free end, the first portion being concave and having an arcuate shape, and wherein the body is configured to engage a panel projection comprising a bulb seam.

The mounting system of the first aspect optionally includes any one or more of the previous embodiments, and in some embodiments the body is symmetric with respect to a vertical reference plane that extends in a vertical dimension and a longitudinal dimension and intersects the attachment aperture.

A second aspect of the disclosure is a mounting body selectively engageable to a panel projection extending from a surface of a building, comprising: (a) a wall with an upper surface and an attachment aperture extending through the upper surface; (b) a first leg that extends from the wall to a first free end, the first leg comprising: (i) a first inside surface; (ii) a first portion extending from the wall and having a first thickness measured in a lateral dimension; (iii) a second portion extending from the first portion, the second portion having a second thickness measured in the lateral dimension, the second thickness being greater than the first thickness; and (iv) a first aperture formed through the second portion and extending along a first axis through the first leg; (c) a second leg that extends from the wall to a second free end, the second leg comprising: (i) a second inside surface facing the first inside surface; (ii) a third portion extending from the wall and having a third thickness measured in the lateral dimension; (iii) a fourth portion extending from the third portion, the fourth portion having a fourth thickness measured in the lateral dimension, the fourth thickness being greater than the third thickness; and (iv) a second aperture formed through the fourth portion, the first axis extending through the second aperture; and (d) a receptacle for the panel projection defined by portions of the first and second inside surfaces, the receptacle positioned between the first and second apertures and the first and second free ends of the first and second legs.

In some embodiments, the first aperture is unthreaded.

In at least one embodiment, the first aperture has a first interior diameter, and the second aperture has a second interior diameter that is less than the first interior diameter.

In one or more embodiments, the first interior diameter is at least approximately 8 mm.

Optionally, the second interior diameter is between approximately 5 mm and 8 mm.

The body of the second aspect optionally includes any one or more of the previous embodiments and in some embodiments further comprises a countersink formed in the second inside surface at an intersection with the second aperture, the countersink facing the first aperture.

The mounting system of the second aspect may include any one or more of the previous embodiments and in some embodiments the attachment aperture is threaded.

Optionally, in some embodiments, the wall has a thickness such that an interior thread of the attachment aperture has a length of at least two times greater than a thread pitch of the interior thread.

In some embodiments, the interior thread of the attachment aperture has at least two revolutions within the attachment aperture.

In at least one embodiment, the wall has a thickness of between about 0.15 inch and about 0.3 inch (between about 3.81 mm and about 7.62 mm).

Optionally, the thickness of the wall is about 0.2 inch (about 5.1 mm).

The mounting body of the second aspect may include one or more of the previous embodiments, and optionally, when the mounting body is in a first position, the first aperture is concentrically aligned with the second aperture.

In some embodiments, the second aperture is unthreaded.

Alternatively, the mounting body of the second aspect includes one or more of the previous embodiments, and the second aperture optionally has an interior thread.

The mounting body of the second aspect may include any one or more of the previous embodiments and optionally the interior thread of the second aperture has a thread pitch.

In some optional embodiments, the second aperture has a length at least two times greater than the thread pitch such that the interior thread has at least two revolutions within the second aperture.

In one or more embodiments, the length of the second aperture is at least four times greater than the thread pitch such that the interior thread has at least four revolutions within the second aperture.

In at least one embodiment of the second aspect, the fourth thickness of the fourth portion is at least about 3 mm.

The mounting body of the second aspect may include one or more of the previous embodiments, and optionally, the fourth thickness is between about 3 mm and about 7 mm.

The mounting body of the second aspect optionally includes any one or more of the previous embodiments and in some embodiments further comprises a countersink formed in the second inside surface at an intersection with the second aperture, the countersink facing the first aperture.

In some embodiments the mounting system of the second aspect includes any one or more of the previous embodiments and the first and second legs are flexibly deflectable from a first position to a second position. In the first position, first and second hooks of the first and second legs are separated by a first distance. In the second position, the first and second hooks are separated by a second distance that is greater than the first distance.

In at least one embodiment, one or more of the first portion and the third portion bend when the first and second legs move from the first position to the second position.

In some embodiments the body of the second aspect includes any one or more of the previous embodiments and in some embodiments the upper surface of the wall is generally planar.

The body is optionally configured such that no portion of the body extends above the upper surface of the wall.

In one or more embodiment, the body is formed by an extrusion process, and the body is of a one-piece construction.

The body of the second aspect optionally includes any one or more of the previous embodiments, and in some embodiments the body is configured such that, when a shaft of a clamping fastener is not extending through the first and second apertures, the body is in a first state and the first leg is only connected to the second leg by the wall.

In some embodiments the body of the second aspect includes any one or more of the previous embodiments and optionally the body is formed of an aluminum alloy.

The body of the second aspect may include any one or more of the previous embodiments and optionally the first leg has a first shape in an end view and the second leg has a second shape in the end view, the second shape being identical to the first shape.

The body of the second aspect optionally includes any one or more of the previous embodiments, and in some embodiments the body is symmetric with respect to a vertical reference plane that extends in a vertical dimension and a longitudinal dimension and intersects the attachment aperture.

A third aspect of the present disclosure is a mounting body selectively engageable to a panel projection extending from a surface of a building, comprising: (a) a wall with an upper surface; (b) a first leg that extends from the wall to a first free end, the first leg comprising: (1) a first inside surface; (2) a first portion extending from the wall; (3) a second portion extending from the first portion such that the first portion is positioned between the wall and the second portion; and (4) a first aperture formed through the second portion and extending along a first axis through the first leg; (c) a second leg that extends from the wall to a second free end, the second leg comprising: (1) a second inside surface facing the first inside surface; (2) a third portion extending from the wall; (3) a fourth portion extending from the third portion such that the third portion is positioned between the wall and the fourth portion; and (4) a second aperture formed through the fourth portion, the second aperture having a length of at least 3 mm measured in a lateral dimension, the second aperture aligned with the first aperture such that the first axis extends through the second aperture; and (d) a receptacle for the panel projection defined by portions of the first and second inside surfaces, the receptacle positioned between the first and second apertures and the first and second free ends of the first and second legs.

In some embodiments, the first aperture is unthreaded.

In at least one embodiment, the first aperture has a first interior diameter, and the second aperture has a second interior diameter that is less than the first interior diameter.

In one or more embodiments, the first interior diameter is at least approximately 8 mm.

Optionally, the second interior diameter is between approximately 5 mm and 8 mm.

The body of the third aspect optionally includes any one or more of the previous embodiments and in some embodiments further comprises a countersink formed in the second inside surface at an intersection with the second aperture, the countersink facing the first aperture.

The mounting system of the second third may include any one or more of the previous embodiments and in some embodiments the attachment aperture is threaded.

Optionally, in some embodiments, the wall has a thickness such that an interior thread of the attachment aperture has a length of at least two times greater than a thread pitch of the interior thread.

In some embodiments, the interior thread of the attachment aperture has at least two revolutions within the attachment aperture.

In at least one embodiment, the wall has a thickness of between about 0.15 inch and about 0.3 inch (between about 3.81 mm and about 7.62 mm).

Optionally, the thickness of the wall is about 0.2 inch (about 5.1 mm).

The mounting body of the third aspect may include one or more of the previous embodiments, and optionally, when the mounting body is in a first position, the first aperture is concentrically aligned with the second aperture.

In some embodiments, the second aperture is unthreaded.

Alternatively, the mounting body of the third aspect includes one or more of the previous embodiments, and the second aperture optionally has an interior thread.

The mounting body of the third aspect may include any one or more of the previous embodiments and optionally the interior thread of the second aperture has a thread pitch.

In some optional embodiments, the second aperture has a length at least two times greater than the thread pitch such that the interior thread has at least two revolutions within the second aperture.

In one or more embodiments, the length of the second aperture is at least four times greater than the thread pitch such that the interior thread has at least four revolutions within the second aperture.

In at least one embodiment of the third aspect, the fourth thickness of the fourth portion is at least about 3 mm.

The mounting body of the third aspect may include one or more of the previous embodiments, and optionally, the fourth thickness is between about 3 mm and about 7 mm.

The mounting body of the third aspect optionally includes any one or more of the previous embodiments and in some embodiments further comprises a countersink formed in the second inside surface at an intersection with the second aperture, the countersink facing the first aperture.

In some embodiments the mounting system of the third aspect includes any one or more of the previous embodiments and the first and second legs are flexibly deflectable from a first position to a second position.

In the first position, first and second hooks of the first and second legs are separated by a first distance. In the second position, the first and second hooks are separated by a second distance that is greater than the first distance.

In at least one embodiment, one or more of the first portion of the first leg and the third portion of the second leg bend when the first and second legs move from the first position to the second position.

In some embodiments the body of the third aspect includes any one or more of the previous embodiments and in some embodiments the upper surface of the wall is generally planar.

The body is optionally configured such that no portion of the body extends above the upper surface of the wall.

In one or more embodiment, the body is formed by an extrusion process, and the body is of a one-piece construction.

The body of the third aspect optionally includes any one or more of the previous embodiments, and in some embodiments the body is configured such that, when a shaft of a clamping fastener is not extending through the first and second apertures, the body is in a first state and the first leg is only connected to the second leg by the wall.

In some embodiments the body of the third aspect includes any one or more of the previous embodiments and optionally the body is formed of an aluminum alloy.

The body of the third aspect may include any one or more of the previous embodiments and optionally the first leg has a first shape in an end view and the second leg has a second shape in the end view, the second shape being identical to the first shape.

The body of the third aspect optionally includes any one or more of the previous embodiments, and in some embodiments the body is symmetric with respect to a vertical reference plane that extends in a vertical dimension and a longitudinal dimension and intersects the attachment aperture.

A fourth aspect of the disclosure is a method of securing a mounting device to a panel projection extending from a surface of a building. The method comprises: (a) providing the mounting device which comprises a body with a wall, a first leg which extends from the wall and includes a first hook, and a second leg which extends from the wall and includes a second hook; (b) positioning the body with a first ramp of the first leg adjacent to a first sidewall of the panel projection and a second ramp of the second leg adjacent to a second sidewall of the panel projection, wherein the body is in a first state and the first and second hooks are separated by a first distance; (c) pressing the body downwardly such that the first ramp contacts a first upper portion of the first sidewall and the second ramp contacts a second upper portion of the second sidewall, wherein at least a first one of the legs bends outwardly away from a second one of the legs and the body transitions to a second state, wherein in the second state the first and second hooks are separated by a second distance that is greater than the first distance; (d) continuing to press the body downwardly until the first and second ramps descend below a first ridge of the first sidewall and a second ridge of the second sidewall, wherein at least the first one of the legs bends inwardly toward the second one of the legs and the body transitions to a third state, wherein the first and second hooks are separated by a third distance in the third state, wherein the panel projection has a first width measured through the first and second ridges, the first width being greater than the third distance, wherein the first hook is positioned in a first recess of the panel projection between the first upper portion and a base of the panel projection and the second hook is positioned in second recess of the panel projection between the second upper portion and the base; and (c) locking the position of the first leg relative to the second leg with a clamping fastener to prevent the first and second legs from bending outwardly, wherein the clamping fastener comprises a shaft that extends into a first aperture through the first leg and out of a second aperture through the second leg, and wherein the first and second hooks may not move upwardly above the first and second ridges.

In some embodiments, locking the position of the first and second legs comprises rotating the shaft of the clamping fastener around its longitudinal axis to engage an internal thread of the second aperture, wherein the shaft has an exterior thread.

Alternatively, in some embodiments locking the position of the first and second legs comprises threating a nut onto the shaft of the clamping fastener, wherein a head of the clamping fastener is adjacent to the first sidewall and the nut is adjacent to the second sidewall.

In some embodiments, the first aperture is unthreaded.

The method of the fourth aspect may include one or more of the previous embodiments, and in at least one embodiment, the first aperture has a first interior diameter that is greater than a second interior diameter of the second aperture.

A fifth aspect of the disclosure is a method of manufacturing a mounting device, comprising: (a) providing an aluminum material; (b) extruding the aluminum material through a die to form an extrusion; (c) cutting the extrusion to a predetermined length to form a body of the mounting device, the body comprising: (1) a wall with an upper surface; (b) a first leg that extends from the wall to a first free end; (c) a second leg that extends from the wall to a second free end; and (d) a receptacle defined between portions of a first inside surface of the first leg and a second inside surface of the second leg; (d) forming an attachment aperture extending through the upper surface; (e) forming a first aperture extending along a first axis through the first leg, the first aperture having a first interior diameter; and (f) forming a second aperture extending through the second leg, the second aperture having a second interior diameter that is less that the first interior diameter, wherein the first axis extends through the second aperture.

In some embodiments, the first and second apertures are formed in a single operation.

The method of the fifth aspect may comprise the previous embodiment and optionally a forming apparatus forms the first aperture starting from an exterior surface of the first leg and then forms the second aperture from the second inside surface of the second leg to the exterior surface of the seg leg.

In at least one embodiment, the first aperture is unthreaded.

In some embodiments, the method includes one or more of the previous embodiments and further comprises forming a thread in the second aperture.

The method may include any one or more of the previous embodiments, and in some embodiments the method further comprises forming a countersink in the second inside surface at an intersection with the second aperture, wherein the countersink faces the first aperture.

The method of the fifth aspect optionally includes one or more of the previous embodiments, and in some embodiments the first and second apertures are coaxially aligned.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". When used with a number or a range, the terms "about" and "approximately" indicate the number or range may be "a little above" or "a little below" the endpoint with a degree of flexibility as would be generally recognized by those skilled in the art. Further, the terms "about" and "approximately" may include the exact endpoint, unless specifically stated otherwise. Accordingly, unless otherwise indicated, all numbers expressing quantities, dimensions, conditions, ratios, angles, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 10% of the stated value.

The term "parallel" means two objects are oriented at an angle within plus or minus 0° to 5° unless otherwise indicated. Similarly, the term "perpendicular" means two objects are oriented at angle of from 85° to 95° unless otherwise indicated.

The use of "substantially" in the present disclosure, when referring to a measurable quantity (e.g., a diameter or other distance) and used for purposes of comparison, is intended to mean within 5% of the comparative quantity. The terms "substantially similar to," "substantially the same as," and "substantially equal to," as used herein, should be interpreted as if explicitly reciting and encompassing the special case in which the items of comparison are "similar to," "the same as" and "equal to," respectively.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

All external references are hereby incorporated by reference in their entirety whether explicitly stated or not.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

FIG. 3A is a front elevation view of a mounting device according to a second embodiment of the present disclosure;

FIG. 3B is a front cross-sectional elevation view of the mounting device of FIG. 3A;

FIG. 4A is a front elevation view of a mounting device according to a third embodiment of the present disclosure;

FIG. 4B is a front cross-sectional elevation view of the mounting device of FIG. 4A;

FIG. 5A is a front cross-sectional elevation view of a mounting device according to a fourth embodiment of the present disclosure;

FIG. 5B is a front perspective view of the mounting device of FIG. 5A;

FIG. 7A is a front perspective view of a mounting device according to a sixth embodiment of the present disclosure engaged to the T-seam panel projection of a second embodiment;

FIG. 7B is a front cross-sectional elevation view of the mounting device of FIG. 7A;

FIG. 7C is a left side elevation view of the mounting device of FIG. 7A;

FIG. 7D is a top plan view of the mounting device of FIG. 7A;

FIG. 8A is a front elevation view of a mounting device according to a seventh embodiment of the present disclosure engaged to the bulb seam panel projection of a third embodiment;

FIG. 8B is a front cross-sectional elevation view of the mounting device of FIG. 8A;

FIG. 8C is a left side elevation view of the mounting device of FIG. 8A; and FIG. 8D is a top plan view of the mounting device of FIG. 8A.

Figure 1:
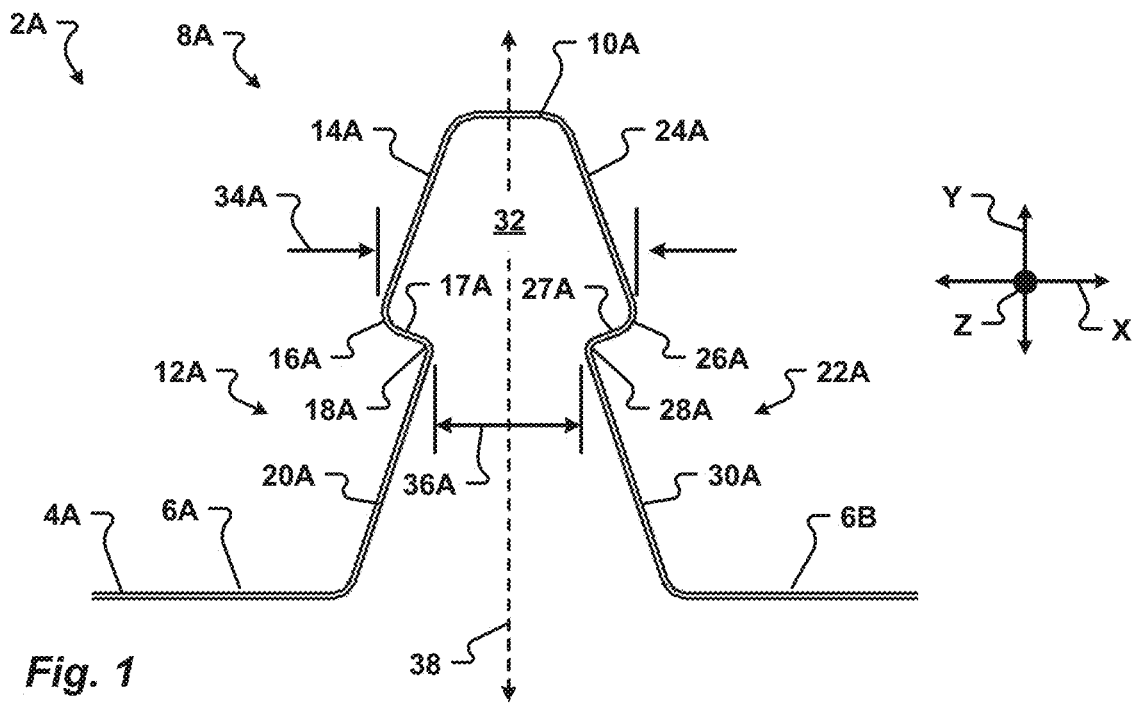
FIG. 1 is a front elevation view of a panel projection of a first embodiment.

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

In the following description of various embodiments, components of mounting devices of different embodiments are identified by the same reference numbers. Those corresponding components between two embodiments that differ in at least some respect are identified by the same reference number, but may include suffix such as a letter.

The following is a listing of components according to various embodiments of the present disclosure, and as shown in the drawings:

| Number | Component |
|---|---|
| 2 | Building surface |
| 4 | Metal panel |
| 6 | Base |
| 8 | Panel projection (rib, bulb seam, T seam) |
| 10 | Endwall or crown |
| 12 | First sidewall |
| 14 | First upper portion |
| 16 | First ridge |
| 17 | Flange |
| 18 | First recess |
| 20 | First lower portion |
| 22 | Second sidewall |
| 24 | Second upper portion |
| 26 | Second ridge |
| 27 | Flange |
| 28 | Second recess |
| 30 | Second lower portion |
| 32 | Hollow interior |
| 34 | First width (separating first and second ridges) |
| 36 | Second width (separating first and second recesses) |
| 38 | Vertical reference plane |
| 50 | Mounting device (or Mounting system) |
| 52 | Body |
| 54A | First end |
| 54B | Second end |
| 56 | Wall |
| 58 | Upper surface |
| 60 | Lower surface |
| 62A | Attachment aperture |
| 62B | Attachment slot |
| 64 | Closed end of slot |
| 66 | Open end of slot |
| 68 | Countersink or chamfer |
| 80 | First leg |
| 82 | First free end |
| 84 | First portion |

-continued

| Number | Component |
|---|---|
| 86 | First hinge |
| 88 | Second portion |
| 90 | First ledge |
| 92 | First exterior portion |
| 94 | Third portion |
| 96 | Second exterior portion |
| 98 | First inside surface |
| 100 | First interior surface |
| 102 | Second interior surface |
| 104 | Third interior surface |
| 106 | First aperture |
| 108 | First interior diameter |
| 110 | Axis of first aperture |
| 112 | First protuberance |
| 116 | First hook |
| 117 | Lock shelf |
| 118 | First ramp |
| 119 | Cavity |
| 120 | First base projection |
| 130 | Second leg |
| 132 | Second free end |
| 134 | Fourth portion |
| 136 | Second hinge |
| 138 | Fifth portion |
| 140 | Second ledge |
| 142 | Third exterior portion |
| 144 | Sixth portion |
| 146 | Fourth exterior portion |
| 148 | Second inside surface |
| 150 | Fourth interior surface |
| 152 | Fifth interior surface |
| 154 | Sixth interior surface |
| 156A | Second aperture (unthreaded) |
| 156B | Second aperture (threaded) |
| 158 | Second interior diameter |
| 160 | Interior thread |
| 162 | Length of the second aperture |
| 164 | Countersink of second aperture |
| 166 | Second protuberance |
| 170 | Second hook |
| 171 | Second lock shelf |
| 172 | Second ramp |
| 173 | Cavity |
| 174 | First distance between first and second hooks |
| 176 | Upper slot |
| 176-1 | First upper slot portion |
| 176-2 | Second upper slot portion |
| 180 | Medial slot |
| 184 | Receptacle |
| 186 | Second base projection |
| 200 | Clamping fastener |
| 202 | Head |
| 204 | First outer diameter |
| 206 | Shaft |
| 208 | Exterior thread |
| 210 | Second outer diameter |
| 212 | Nut |
| 214 | Nut flange |
| 215 | Nut body |
| 216 | Thread pitch |
| 220 | Attachment fastener |
| 222 | Attachment |
| 224 | Mounting plate |
| 226 | Stanchion or standoff |
| 228 | PV clamp |
| X | Lateral dimension |
| X1 | First lateral direction |
| X2 | Second lateral direction |
| Y | Vertical dimension |
| Z | Longitudinal (or extrusion) dimension |

DETAILED DESCRIPTION

FIG. 1 illustrates a building surface 2A (for example, a portion of a roof) defined by a metal panel 4A. A panel projection 8A extends from base portions 6A, 6B of the metal panel 4A. The panel projection 8A may have different shapes and dimensions. As will be appreciated by one of skill in the art, the panel projection 8A illustrated in FIG. 1 is known as a "High Rib" or "HR" profile.

The building surface 2A and the panel projection 8A may be defined by a plurality of metal panels 4A that are interconnected in any appropriate manner (e.g., an edge portion of one metal panel 4A may be "nested" or disposed in overlapping relation with an edge portion of another metal panel). The panel projection 8A generally comprises a first sidewall 12A spaced from a second sidewall 22A with an endwall 10A (or "crown") that extends between the first and second sidewalls 12A, 22A. The first and second sidewalls 12A, 22A generally converge toward one another progressing away from associated base portions 6A, 6B.

The first sidewall 12A includes a first upper portion 14A that descends away from the endwall 10A. The first upper portion 14A extends from the endwall 10A to a first ridge 16A that runs in a longitudinal dimension Z for the length of the panel projection 8A. A first recess 18A is positioned directly below the first ridge 16A (between the first ridge 16A and the base portion 6A). A first lower portion 20A of the first sidewall 12A descends from the first recess 18A to the base portion 6A. Accordingly, the first recess 18A may be described as being between the first ridge 16A and the first lower portion 20A.

In some embodiments, the first and second sidewalls 12A, 22A are mirror images of one another, with the first sidewall 12A positioned on a first side of a vertical reference plane 38 that bisects the endwall 10A. The second sidewall 22A is positioned on a second side of the vertical reference plane 38. The vertical reference plane 38 extends in a vertical dimension Y and the longitudinal dimension Z. The vertical dimension Y and the longitudinal dimension Z are orthogonal to each other and to a lateral dimension X. Accordingly, the vertical reference plane 38 is defined by the vertical dimension Y and the longitudinal dimension Z.

The second sidewall 22A comprises a second upper portion 24A opposite the first upper portion 14A of the first sidewall 12A. The second upper portion 24A of the second sidewall 22A extends from the endwall 10A to a second ridge 26A that extends the length of the panel projection 8A in the longitudinal dimension Z. A second recess 28A and the second ridge 26A separate a second lower portion 30A of the second sidewall from the second upper portion 24A. The panel projection 8A has a hollow interior 32.

The first and second ridges 16A, 26A are separated by a first width 34A measured in the lateral dimension X. A second width 36A measured in the lateral dimension X separates the first and second recesses 18A, 28A, with the second width 36A being less than the first width 34A.

Referring now to FIGS. 2A-2G, a mounting device 50A (or mounting system) according to embodiments of the present disclosure is generally illustrated secured to a panel projection 8A. The mounting device 50A is configured to be "snapped" over the ridges 16A, 26A of the panel projection 8A and then secured to the panel projection by a clamping fastener 200. To secure the mounting device 50A to the panel projection 8A, the mounting device 50A is positioned above the panel projection 8A and then pressed downwardly in the vertical dimension Y. The first and second ridges 16A, 26A cause legs 80A, 130A of the mounting device to bend, flex, or deflect outwardly in the lateral dimension X at first and second hinges 86A, 136A to fit over the ridges. After lower hooks 116A, 170A of the legs descend below the ridges 16A, 26A, the legs 80A, 130A return (or snap) at least partially back to their initial shape and the lower hooks 116A, 170A fit into the recesses 18A, 28A of the panel projection 8A.

As discussed in detail further herein, the outward bending or deflecting of the legs 80A, 130A may be caused by a wall 56A and/or at least a portion of the legs 80A, 130A bending, flexing, or deflecting in at least a semi-elastic manner. For instance, the wall 56A and/or the at least a portion of the legs 80A, 130A may operate similar to a "living" hinge during the bending, flexing, or deflecting outward and subsequent at least partial return to the initial shape. In this regard, the mounting device 50A may be initially secured to the panel projection 8A once snapped onto the panel projection 8A.

The clamping fastener 200 extending through the mounting device 50A is then tightened. The clamping fastener 200 generally includes a shaft 206 extending from a head 202. The head 202 has a first outer diameter 204 that is greater than a second outer diameter 210 of the shaft (illustrated in FIG. 2F). In some embodiments, the second outer diameter 210 is from 6 mm to 10 mm, or 8 mm (commonly referred to as "M8" diameter).

At least a portion (or optionally all) of the shaft 206 has an exterior thread 208. More specifically, in at least one embodiment, the exterior thread 208 extends from the head 202 to a free end of the shaft. In at least some embodiments of the disclosure, the clamping fastener 200 secures to a nut 212 on an end of the shaft 206 opposite the head 202.

Alternatively, in other embodiments, only a portion of the shaft 206 is threaded. Accordingly, in at least one embodiment, the exterior thread 208 extends from the free end of the shaft 206 about ¼, ⅓, ½, ⅔, or ¾ of the length of the shaft to the head 202. Thus, at least a portion of the shaft 206 proximate to the head 202 is unthreaded.

As the clamping fastener 200 is tightened using the nut 212, the legs 80A, 130A are drawn together to secure the mounting device 50A to the panel projection 8A. In one or more embodiments, the mounting device 50A may bend as the clamping fastener 200 is tightened, altering the orientation of the legs 80A, 130A with respect to each other. In this regard, the mounting device 50A may be further secured to the panel projection 8A once snapped onto the panel projection 8A via the tightening of the clamping fastener 200, such that the mounting device 50A is mated to the panel projection 8A without unintended or inadvertent movement.

However, although embodiments of the present disclosure are directed to the at least partial return of the wall 56A and/or the at least a portion of the legs 80A, 130A to the initial shape after snapping onto the panel projection 8A, such that the mounting device 50A is initially secured to and at least partially mated with the panel projection 8A, in some embodiments only the tightening of the clamping fastener 200 provides a sufficient securing force to cause the mounting device 50A to mate without movement to the panel projection 50A, without departing from the scope of the present disclosure.

Referring now to FIGS. 2B-2G, the mounting device 50A generally comprises a body 52A with a first end 54A and a second end 54B spaced from the first end in the longitudinal dimension Z. In some embodiments, the body is formed of an aluminum alloy. The body 52A is formed by an extrusion process, such as a forward extrusion process, and subsequently cut to a predetermined length as measured in the longitudinal dimension Z from the first end 54A to the second end 54B. Accordingly, in at least one embodiment, the body 52A is unitary and may be described as being formed of one-piece of material.

Optionally, the body 52A may be vertically symmetrical with respect to a vertical reference plane 38. The vertical reference plane 38 bisects the body 52A and extends in the vertical dimension Y and the longitudinal dimension Z. Forming the body 52A such that it is vertically symmetrical is beneficial because it improves machinability and helps with the extrusion process. For example, when the body 52A is vertically symmetrical, jigs used to hold the body for machining operations after extrusion may be used to engage either side of the body. In this manner, forming the body 52A to be vertically symmetrical beneficially prevents human error when the machining operations are performed after extrusion because either leg 80A, 130A could be positioned against a jig when forming apertures 106, 156.

Also, during extrusion, the vertically symmetrical body ensures even flow of metal through the die, and increases the life of a die used for the extrusion process. In contrast, when the body 52 is not symmetrical, more work may be required to design the extrusion profile and additions to the extrusion profile may be required to ensure metal flows as intended during the extrusion process.

The body 52A includes a wall 56A with an upper surface 58A and a lower surface 60A. In some embodiments, the upper surface 58A is generally planar. The upper surface and the lower surface are optionally approximately parallel in some embodiments.

An attachment aperture 62A extends at least partially through the wall 56A and is configured to receive an attachment fastener 220. In some embodiments, the attachment aperture penetrates both the upper and lower surfaces 58A, 60A. Alternatively, in one or more embodiments the attachment aperture 62A does not extend through the lower surface 60A.

In some embodiments, the attachment aperture 62A is threaded. Alternatively, in some other embodiments, the attachment aperture 62A is unthreaded. For example, such as where the attachment aperture 62A is unthreaded, a nut, cotter pin, or other fastener may secure an attachment fastener 220 within the attachment aperture 62A once inserted.

The attachment aperture 62A may optionally include a countersink 68. The countersink 68 is beneficial because it makes forming the attachment aperture 62A easier. The countersink 68 also makes it easier for a user to thread the attachment fastener 220 into the attachment aperture 62A when the attachment aperture 62A is threaded by preventing cross-threading. This is beneficial when mounting objects (such as large, rectangular photovoltaic panels) to the mounting device 50A because, as will be appreciated by one of skill in the art, the user frequently must reach over the object to fit the attachment fastener into the attachment aperture 62A.

Figure 2A:
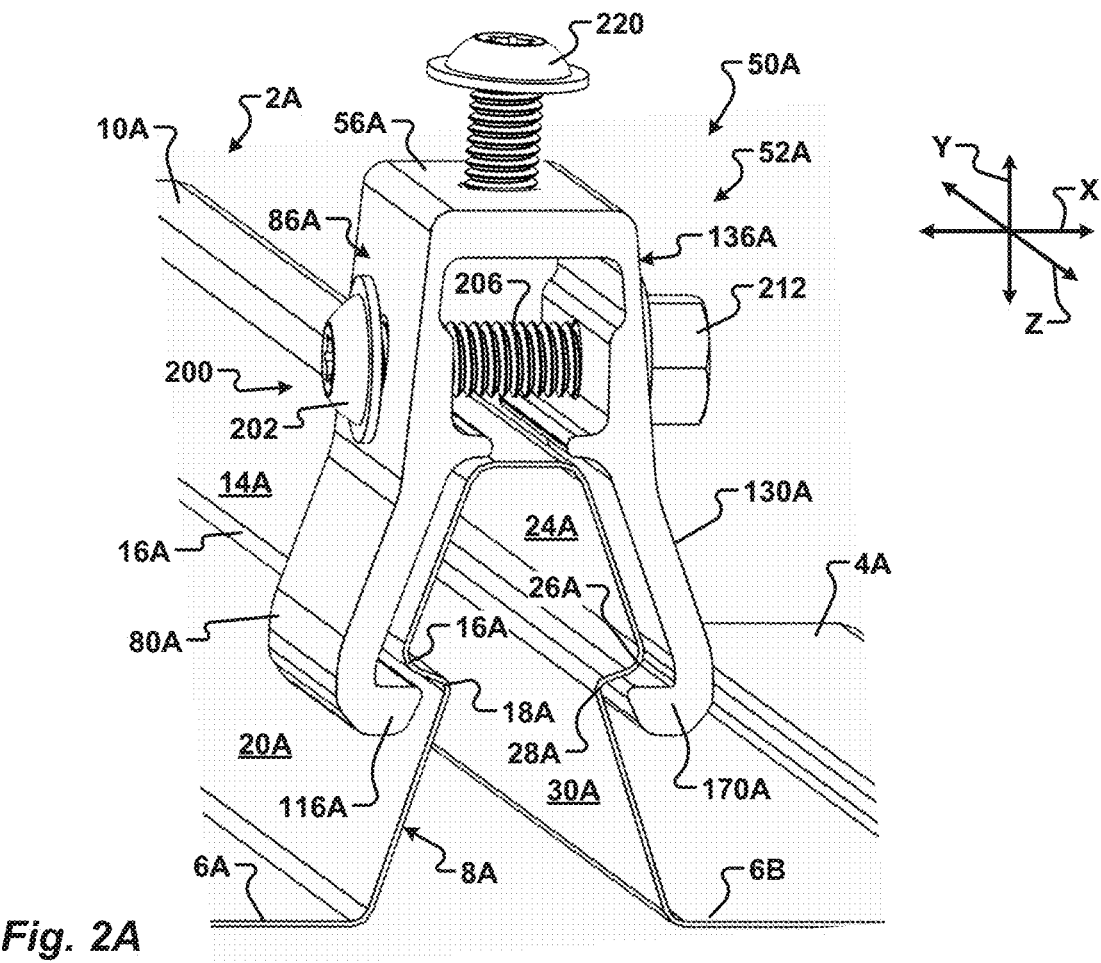
FIG. 2A is a front perspective view of a mounting device according to a first embodiment of the present disclosure engaged to the panel projection of FIG. 1.
Figure 2B:
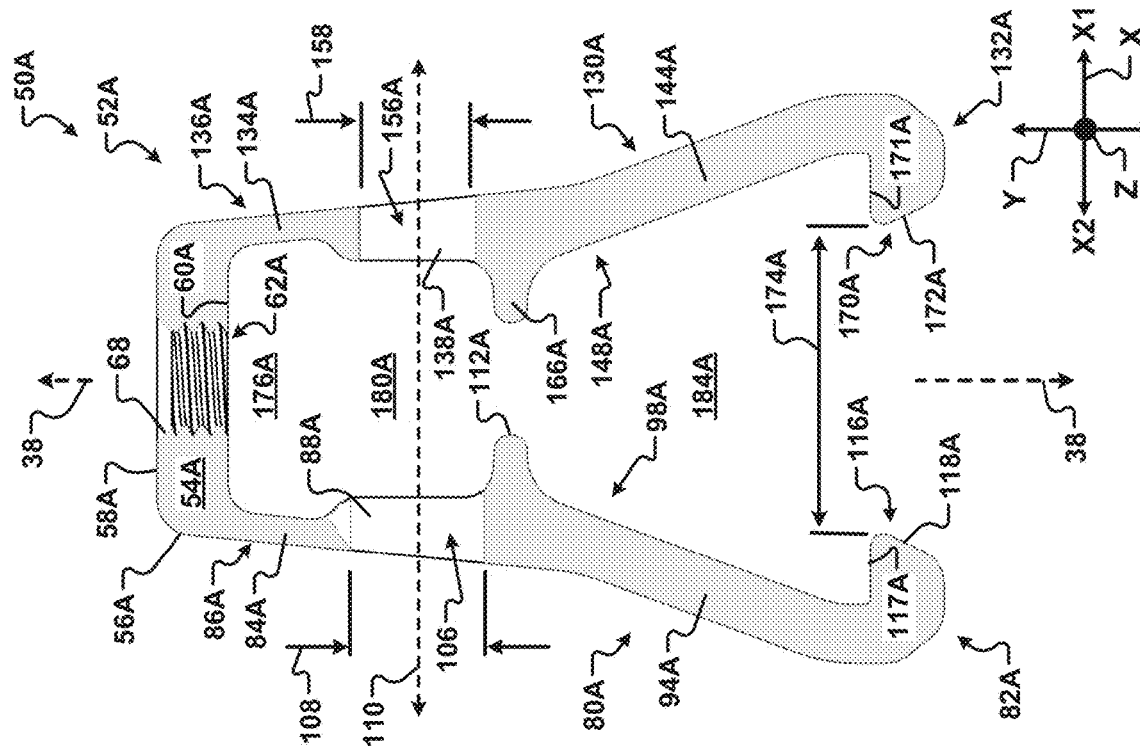
FIG. 2B is a front elevation view of the mounting device of FIG. 2A.
Figure 2C:
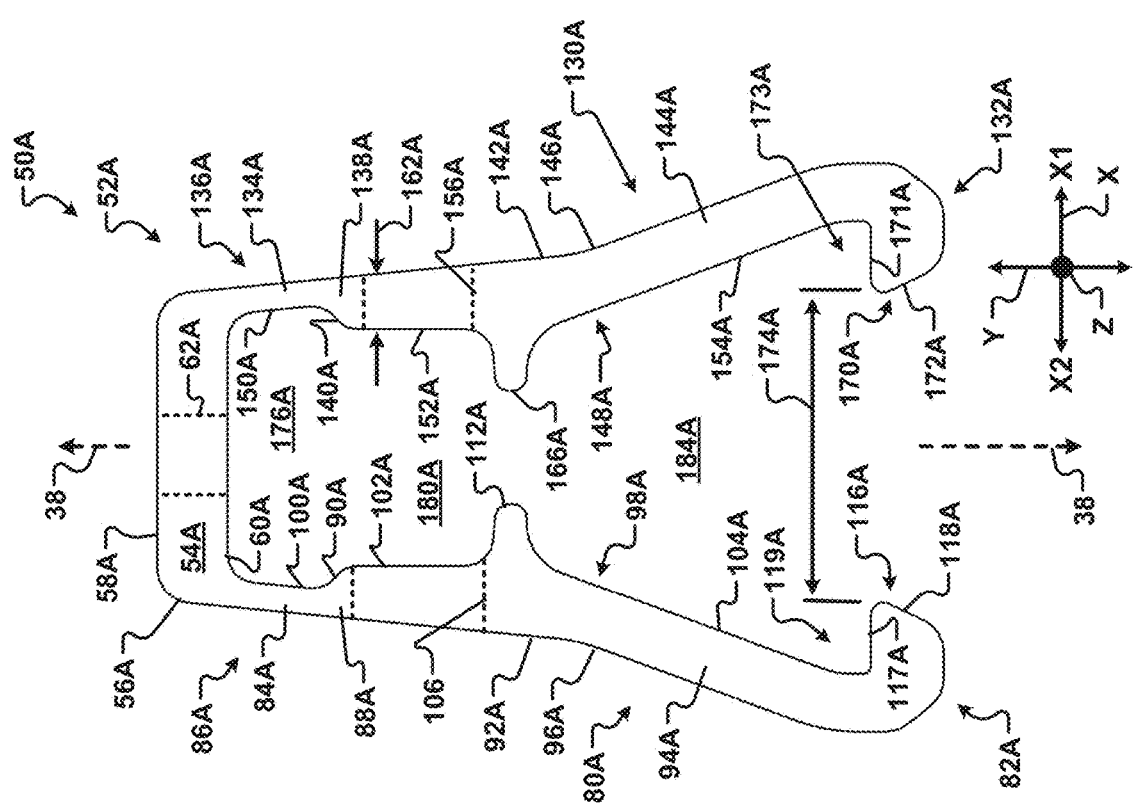
FIG. 2C is a front cross-sectional elevation view of the mounting device of FIG. 2A.
Figures 2D, 2E:
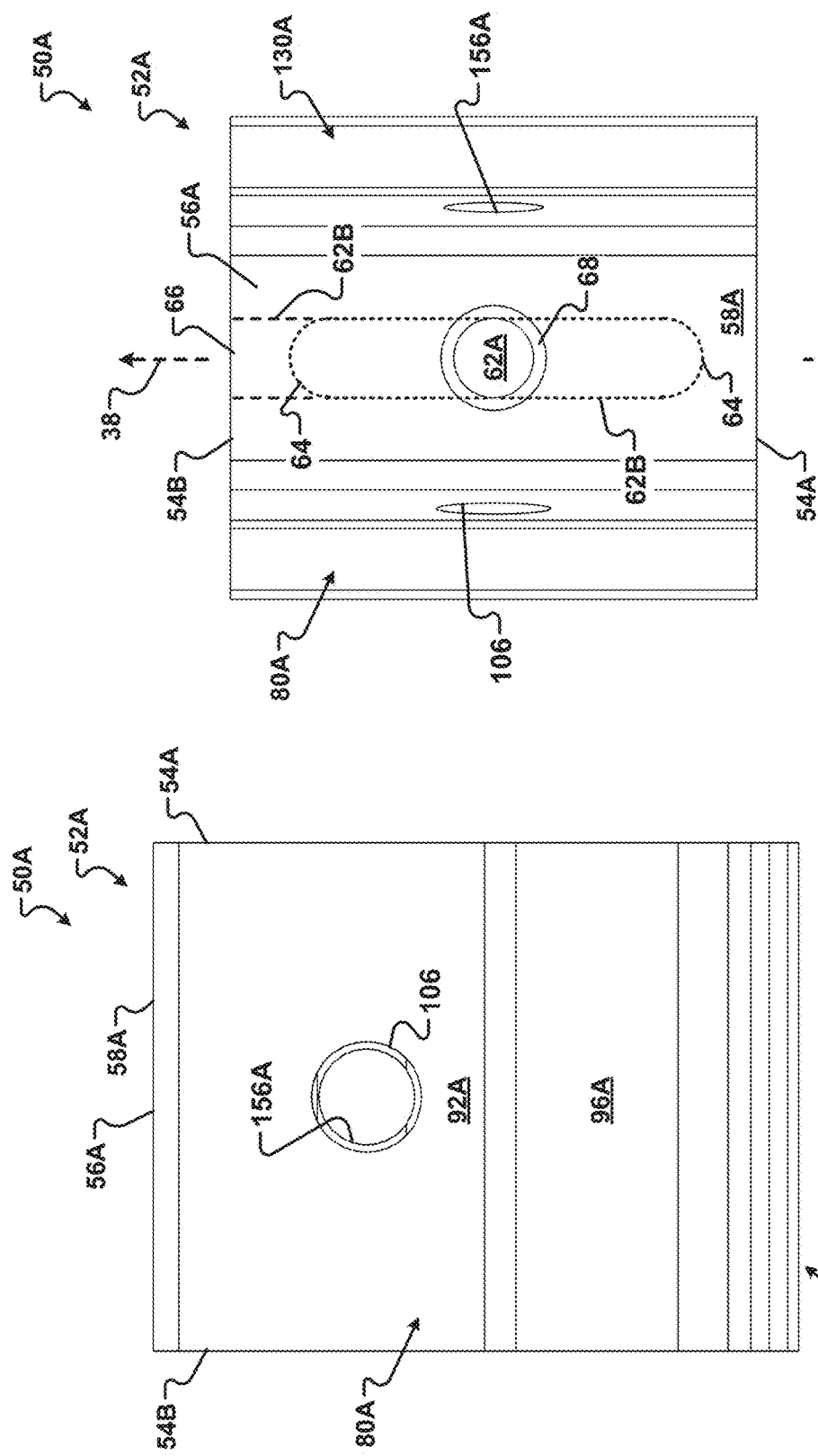
FIG. 2D is a left side elevation view of the mounting device of FIG. 2A.
FIG. 2E is a top plan view of the mounting device of FIG. 2A.

As generally illustrated in FIG. 2E, the attachment aperture 62A may optionally be elongated to define an attachment slot 62B. In some embodiments, the attachment slot 62B extends in the longitudinal dimension Z. Alternatively, although not illustrated, the attachment slot 62B may also be formed to extend in the lateral dimension X.

In some embodiments, the attachment slot 62B does not extend to an edge or end 54 of the wall 56A such that the attachment slot 62B includes two closed ends 64. Alternatively, the attachment slot 62B may extend to an edge or end of the wall (such as end 54B). In these embodiments, the attachment slot 62B comprises one open end 66 and one closed end 64.

In some embodiments, the first leg 80A and the second leg 130A are positioned on opposite sides of the vertical reference plane 38. The first and second legs 80A, 130A both extend away from the wall 56A in the vertical dimension Y to respective first and second free ends 82A, 132A.

The first leg 80A comprises a first portion 84A extending from the wall 56A, a second portion 88A extending from the first portion 84A, and a third portion 94A extending from the second portion 88A to the first free end 82A. A first exterior portion 92A of the first leg 80A is associated with the first and second portions. A second exterior portion 96A of the first leg 80A is associated with the third portion 94A of the first leg.

The first portion 84A has a first thickness measured in the lateral dimension X. The second portion 88A has a second thickness measured in the lateral dimension X that is greater than the first thickness. In some embodiments, the first thickness of the first portion 84A defines the minimum thickness of the first leg 80A.

The decreased first thickness of the first portion 84A compared to the second thickness permits (or enables) the first leg 80A to bend or flex relative to the wall 56A. Accordingly, the first portion 84A may be described as being adapted to bend. The first portion 84A may also be described as a first hinge 86A, or a first "living" hinge.

As will be appreciated by one of skill in the art, the living hinge 86A comprises a piece of material that connects or bridges two thicker portions of the body 52A. Specifically, the first hinge 86A (e.g., as defined by the first portion 84A) is formed of the same material as the wall 56A and the second portion 88A, but is thinner (at least in the lateral dimension X) than the wall and second portion. Accordingly, the second portion 88A and the third portion 94A of the first leg can rotate around an axis parallel to the longitudinal dimension Z at the first hinge 86A defined by the first portion 84A.

When a force oriented in a second lateral direction X2 (away from the second leg 130A) is applied to the first leg, the first leg 80A will bend at the first hinge 86A. In response, the first free end 82A will move in the second lateral direction X2 away from the vertical reference plane 38.

The first leg further comprises a first inside surface 98A, which comprises a first interior surface 100A, a second interior surface 102A, and a third interior surface 104A, which are associated with the first portion 84A, the second portion 88A, and the third portion 94A, respectively.

In one non-limiting example, a first thickness of the first portion 84A measured in the lateral direction X is substantially constant between a first interior surface 100A and a first exterior portion 92A. In another non-limiting example, a second thickness of the second portion 88A measured in the lateral direction X varies between the second interior surface 102A and the first exterior portion 92A along the length of the second portion 88A (or, alternatively, a different exterior portion of the first leg 80A). For instance, the second thickness of the second portion 88A may increase between the second interior surface 102A and the first exterior portion 92A along the length of the second portion 88A. In another non-limiting example, a third thickness of the third portion 94A measured in the lateral direction X is substantially constant between the third interior surface 104A and the second exterior portion 96A.

It is noted that, in some instances, the first thickness of the first portion 84A is less than the third and second thicknesses of the third portion 94A and/or at least a portion of the second portion 88A between the first exterior portion 92A and the respective interior surfaces 100A, 102A, 104A. In addition, in some instances, at least a portion of the second portion 88A may have a greater second thickness than the third thickness of the third portion 94A between the first exterior portion 92A and the respective interior surfaces 102A, 104A.

A first protuberance 112A extends from the first inside surface 98A in a first lateral direction X1 toward the second leg 130A. The first protuberance 112A generally separates the second interior surface 102A from the third interior surface 104A.

A first hook 116A is positioned proximate to the first free end 82A. The first hook 116A extends in the first lateral direction X1 toward the second leg 130A. The first hook 116A is configured to extend into a first recess 18A of a panel projection 8A when the mounting device 50A is engaged to the panel projection 8A.

The first hook 116A may optionally include a first lock shelf 117A. In some embodiments, the first lock shelf 117A extends inward (in the first lateral direction X1) from the first leg 80A (i.e., inward toward the reference plane 38 from the third portion 94A), and optionally faces towards the wall 56A.

A cavity 119A is formed between the first lock shelf 117A and the third portion 94A of the first leg 80A. The first lock shelf 117A and/or the cavity 119A are configured to engage a flange 17A that extends between the first ridge 16A and the first recess 18A of the panel projection 8A. For example, at least a portion of the first lock shelf 117A may engage or contact a lower surface of the flange 17A to resist lift of the mounting device 50A when a negative force is applied in the vertical dimension Y. Thus, the first lock shelf 117A increases the lift-off resistance of the mounting device 50A.

In some embodiments, the first lock shelf 117A is approximately planar. Additionally, or alternatively, the first lock shelf 117A may be oriented approximately perpendicular to the vertical reference plane 38. Other shapes and dimensions of the first lock shelf are contemplated.

A first ramp 118A is optionally formed on the first hook 116A facing the vertical reference plane 38. In some embodiments, the first ramp 118A is oriented at an angle that is approximately equal to an angle of the first upper portion 14A of the first sidewall 12A of the panel projection 8A. This is beneficial during installation of the mounting device 50A on the panel projection 8A to facilitate sliding of the first ramp 118A along the first sidewall 12A.

The first ramp 118A generally slopes away from the vertical reference plane 38 from a top of the first ramp to its bottom. More specifically, a first portion (or top) of the first ramp 118A proximate to the wall 56A is closer to the vertical reference plane 38 than a second portion (or bottom) of the first ramp proximate to the first free end 82A.

In some embodiments, the angle of the first ramp 118A is between approximately 15° and 40° relative to the vertical refence plane 38. In some embodiments, the angle of the first ramp 118A is approximately 25° relative to the vertical reference plane 38.

The third interior surface 104A has a shape adapted to at least partially conform to the first upper portion 14A (which is substantially planar) of the panel projection 8A when the mounting device is engaged to the panel projection 8A. More specifically, in some embodiments, the third interior surface 104A is generally planar between the first hook 116A and the first protuberance 112A.

Notably, in at least some embodiments, the third interior surface 104A has no projections, ridges or protuberances between the upper surface of the first hook and the lower surface of the first protuberance. Forming the third interior surface 104A with no projections, ridges or protuberances is beneficial to prevent damage to the panel projection 8A or coatings on the panel projection. In at least one embodiment, no apertures or holes are formed through the third interior surface 104A or the third portion 94A of the first leg.

The third interior surface 104A generally slopes away from the vertical reference plane 38 from a top of the third interior surface to its bottom. Accordingly, in some embodiments, an upper portion of the third interior surface 104A proximate to the first protuberance 112A is a first distance from the vertical reference plane 38, while a lower portion of the third interior surface 104A proximate to the first hook 116A is a second distance from the vertical reference plane, the second distance being greater than the first distance.

In one non-limiting example, the first portion 84A of the first exterior portion 92A may have a first oblique angle relative to the wall 56A, and the second exterior portion 96A and the third portion 94A may have a third oblique angle relative to the wall 56A. Optionally, the second portion 88A of the first exterior portion 92A may have a substantially similar oblique angle relative to the wall 56A as the first portion 84A, a substantially similar oblique angle relative to the wall 56A as the third portion 94A, or a second, different oblique angle relative to the wall 56A. In some instances, the third oblique angle of the third portion 94A may be greater than the first oblique angle of the first portion 84A. In this regard, at least a portion of the first hook 116A (i.e., a portion of the first lock shelf 117A and/or a portion of the first ramp 118A) may be positioned outward from the reference plane 38 relative to the first portion 84A, such that a second reference plane through the length of the first portion 84A passes through the at least a portion of the first hook 116A. In addition, the cavity 119A may be intersected by the second reference plane through the first portion 84A, such that a portion of the cavity 119A is on either side of the second reference plane through the first portion 84A. It is noted that this difference in oblique angles for the portions 84A, 88A, 94A may be beneficial to ensure the third portion 94A can receive the panel projection 8A, while reducing the material needed for the first portion 84A and/or the second portion 88A, thus reducing manufacturing cost and time.

In some embodiments, the oblique angle of the first portion 84A, the third portion 94A, and/or the second portion 88A of the first leg 80A are each individually between approximately 10° and 40° relative to the vertical refence plane 38. In some embodiments, the oblique angle of the first portion 84A, the third portion 94A, and/or the second portion 88A of the first leg 80A is approximately 20° relative to the vertical reference plane 38.

In one non-limiting example, the third interior surface 104A of the third portion 94A is oriented at an angle of between approximately 10° and approximately 30° relative to the vertical reference plane 38. Optionally, the angle of the third interior surface 104A relative to the vertical reference plane 38 is approximately 20°.

A first aperture 106 extends through the second portion 88A of the first leg 80A between the first exterior portion 92A and the second interior surface 102A. The first aperture 106 may have a perimeter that is generally circular. However, in other embodiments the first aperture 106 may be elongated in the vertical dimension Y. In some embodiments, the first aperture 106 is positioned between the first protuberance 112A and the lower surface 60A of the wall 56A in the vertical dimension.

The first aperture 106 is unthreaded and extends along an axis 110. A first interior diameter 108 of the first aperture 106 is greater than the second outer diameter 210 of the shaft 206 of the clamping fastener 200. Because the first interior diameter 108 is greater than the second outer diameter 210, the clamping fastener 200 can draw the first and second legs 80A, 130A together without the shaft 206 of the clamping fastener binding within the first aperture 106 as the orientations of the first and second legs 80A, 130A change relative to the vertical reference plane 38. In some embodiments, the first interior diameter 108 is between approximately 8 mm and approximately 11 mm. In at least one embodiment, the first interior diameter is about 9 mm.

The second leg 130A comprises elements that generally correspond to the elements of the first leg 80A and that are the same as, or similar to, the elements of the first leg 80A except when indicated otherwise. In some embodiments, the first and second legs may be mirror images of one another. More specifically, in at least one embodiment, the second leg 130A comprises a fourth portion 134A extending from the wall 56A, a fifth portion 138A extending from the fourth portion 134A, and a sixth portion 144A extending from the fifth portion 138A to a second free end 132A. A third exterior portion 142A of the second leg 130A is associated with the fourth and fifth portions 134A, 138A. A fourth exterior portion 146A of the second leg 130A is associated with the sixth portion 144A of the second leg 130A.

The fourth portion 134A has a fourth thickness measured in the lateral dimension X, where the fourth thickness is substantially constant between a fourth interior surface 150A and the third exterior portion 142A. In some embodiments, the fourth thickness of the fourth portion 134A is equal to the first thickness of the first portion 84A of the first leg 80A. In some embodiments, the fourth thickness of the fourth portion 134A defines the minimum thickness of the second leg 130A.

The fifth portion 138A has a fifth thickness measured in the lateral dimension X, where the fifth thickness varies between a fifth interior surface 152A and the third exterior portion 142A along the length of the fifth portion 138A (or, alternatively, a different exterior portion of the second leg 130A). For instance, the fifth thickness of the fifth portion 138A may increase between the fifth interior surface 152A and the third exterior portion 142A along the length of the fifth portion 138A. In at least one embodiment, the fifth thickness of the fifth portion 138A is approximately equal to the second thickness of the second portion 88A of the first leg 80A. Alternatively, the fifth thickness may be greater than (or less than) the second thickness.

The sixth portion 144A has a sixth thickness measured in the lateral dimension X, where the sixth thickness is substantially constant between a sixth interior surface 154A and the fourth exterior portion 144A. In at least one embodiment, the sixth thickness of the sixth portion 144A is approximately equal to the third thickness of the third portion 94A of the first leg 80A. Alternatively, the sixth thickness may be greater than (or less than) the third thickness.

In at least some embodiments, at least a portion of the fifth thickness of the fifth portion 138A is substantially equal to greater than the fourth thickness of the fourth portion 134A. Similar to the first leg 80A, the decreased fourth thickness of the fourth portion 134A of the second leg compared to the fifth thickness of the fifth portion 138A permits (or enables) the second leg to bend or flex relative to the wall 56A at the fourth portion 134A. Thus, the fourth portion 134A may be described as being adapted to bend. The fourth portion 134A may also be described as a second hinge 136A, or a second living hinge.

In at least some embodiments, the sixth thickness of the sixth portion 144A is substantially equal to or greater than at least a portion of the fifth thickness of the fifth portion 144A.

When a force oriented in a first lateral direction X1 (away from the first leg 80A) is applied to the second leg 130A, the second leg will bend around an axis parallel to the longitudinal dimension Z at the second hinge 136A. In response, the second free end 132A will move in the first lateral direction X1 away from the vertical reference plane 38.

The second leg 130A further comprises a second inside surface 148A facing the first inside surface 98A of the first leg. The second inside surface 148A comprises a fourth interior surface 150A, a fifth interior surface 152A and a sixth interior surface 154A, which are associated with the fourth portion 134A, the fifth portion 138A, and the sixth portion 144A, respectively.

A second protuberance 166A extends from second inside surface 148A in the second lateral direction X2 toward the first protuberance 112A of the first leg. However, the first and second protuberances 112A, 166A are separated from one another by an open space.

The second protuberance 166A generally separates the fifth interior surface 152A from the sixth interior surface 154A. When the mounting device 50A is engaged to a panel projection 8A, the first protuberance 112A and the second protuberance 166A are positioned proximate to (and may contact) the endwall 10A of the panel projection 8A. Moreover, as the clamping fastener 200 is tightened, the width of the open space between the protuberances 112A, 166A will decrease, and the first and second protuberances 112A, 166A may contact one another.

Similar to the first leg 80A, the second leg 130A also may optionally include a second hook 170A positioned proximate to the second free end 132A. The second hook 170A extends in the second lateral direction X2 toward the first hook 116A. The second hook 170A is configured to extend into a second recess 28A when the mounting device 50A is engaged to the panel projection 8A.

The second hook 170A may also optionally include a second lock shelf 171A. The second lock shelf 171A may be the same as, or similar to, the first lock shelf 117A. Specifically, in at least some embodiments, the second lock shelf 171A extends inward (in the second lateral direction X2) from the second leg 130A (i.e., inward toward the reference plane 38 from the third portion 144A) and optionally faces towards the wall 56A. A cavity 173A is formed between the second lock shelf 171A and the third portion 144A of the second leg 130A. The second lock shelf 171A and/or the cavity 173A is configured to engage a flange 27A that extends between the second ridge 26A and the second recess 28A of the panel projection 8A. Accordingly, at least a portion of the second lock shelf 171A may engage or contact a lower surface of the flange 27A to resist lift of the mounting device 50A when a negative force is applied in the vertical dimension Y. Thus, the lock shelf 117A increases the lift-off resistance of the mounting device 50A.

In some embodiments, the second lock shelf 171A is approximately planar. Additionally, or alternatively, the second lock shelf 171A may be oriented approximately perpendicular to the vertical reference plane 38.

In at least one embodiment, the second lock shelf 171A is coplanar with the first lock shelf 117A. Other shapes, dimensions, and orientations of the first lock shelf and the second lock shelf are contemplated.

A second ramp 172A is optionally formed on the second hook 170A facing the vertical reference plane 38. The second ramp 172A is oriented at an angle. In some embodiments, the angle of the second ramp 172A is approximately equal to an angle of the second upper portion 24A of the panel projection 8A. This is beneficial during installation of the mounting device 50A on the panel projection to facilitate sliding of the second ramp 172A along the second sidewall 22A.

The second ramp 172A generally slopes away from the vertical reference plane 38 from a top of the second ramp to its bottom. More specifically, a first portion (or top) of the second ramp 172A proximate to the wall 56A is closer to the vertical reference plane 38 than a second portion (or bottom) of the second ramp proximate to the second free end 132A.

In some embodiments, the angle of the second ramp 172A is between approximately 15° and 40° relative to the vertical refence plane 38. In some embodiments, the angle of the second ramp is approximately 25° relative to the vertical reference plane 38.

The sixth interior surface 154A has a shape adapted to at least partially conform to the second upper portion 24A (which is substantially planar) of the panel projection 8A when the mounting device is engaged to the panel projection. More specifically, in some embodiments, the sixth interior surface 154A is generally planar between the second hook 170A and the second protuberance 166A.

Notably, in at least some embodiments, the sixth interior surface 154A has no projections, ridges or protuberances between the upper surface of the second hook 170A and the lower surface of the second protuberance 166A. Forming the sixth interior surface 154A with no projections, ridges or protuberances is beneficial to prevent damage to the panel projection 8A or coatings on the panel projection. In at least one embodiment, no apertures or holes are formed through the sixth interior surface 154A or the sixth portion 144A of the second leg.

The sixth interior surface 154A generally slopes away from the vertical reference plane 38 from a top of the sixth interior surface to its bottom. Accordingly, in some embodiments, an upper portion of the sixth interior surface 154A proximate to the second protuberance 166A is a first distance from the vertical reference plane 38, while a lower portion of the sixth interior surface 154A proximate to the second hook 170A is a second distance from the vertical reference plane, the second distance being greater than the first distance.

In one non-limiting example, the fourth portion 134A of the third exterior portion 142A may have a fourth oblique angle relative to the wall 56A, and the fourth exterior portion 146A of the sixth portion 144A may have a sixth oblique angle relative to the wall 56A. Optionally, the fifth portion 138A of the third exterior portion 142A may have a substantially similar oblique angle relative to the wall 56A as the fourth portion 134A, a substantially similar oblique angle relative to the wall 56A as the sixth portion 144A, or a fifth, different oblique angle relative to the wall 56A. In some instances, the sixth oblique angle of the sixth portion 144A may be greater than the fourth oblique angle of the fourth portion 134A. In this regard, at least a portion of the second hook 170A (i.e., a portion of the second lock shelf 171A and/or a portion of the second ramp 172A) may be positioned outward from the reference plane 38 relative to the fourth portion 134A, such that a third reference plane through the length of the fourth portion 134A passes through the at least a portion of the second hook 170A. In addition, the cavity 173A may be intersected by the third reference plane through the fourth portion 134A, such that a portion of the cavity 173A is on either side of the third reference plane through the fourth portion 134A. It is noted that this difference in oblique angles for the portions 134A, 138A, 144A may be beneficial to ensure the sixth portion 144A can receive the panel projection 8A, while reducing the material needed for the fourth portion 134A and/or the fifth portion 138A, thus reducing manufacturing cost and time.

In some embodiments, the oblique angle of the fourth portion 134A, the sixth portion 144A, and/or the fifth portion 138A of the second leg 130A are each individually between approximately 10° and 40° relative to the vertical refence plane 38. In some embodiments, the oblique angle of the fourth portion 134A, the sixth portion 144A, and/or the fifth portion 138A of the second leg 130A is approximately 20° relative to the vertical reference plane 38.

In one non-limiting example, the sixth interior surface 154A of the second leg 130A is oriented at an angle of between approximately 10° and approximately 30° relative to the vertical reference plane 38. Optionally, the angle of the sixth interior surface 154A relative to the vertical reference plane is approximately 20°.

A second aperture 156A extends through the second leg 130A between the fifth interior surface 152A and the third exterior portion 142A. In some embodiments, the second aperture 156A is unthreaded (as illustrated in FIG. 2C). The second aperture 156A has a second interior diameter 158 which is less than the first interior diameter 108 of the first aperture 106. In some embodiments, the second interior diameter 158 is approximately equal to the second outer diameter 210 of the shaft 206 of the clamping fastener 200. For example, the second interior diameter 158 may be from approximately 5 mm to 10 mm, or approximately 7.4 mm. In some embodiments, the second interior diameter 158 is no less than the shaft of an M8 diameter fastener. However, other dimensions are contemplated.

The axis 110 of the first aperture 106 may be described as intersecting or extending through the second aperture 156A. In some embodiments, the interior opening to the second aperture 156A may be beveled, chamfered, rounded, or otherwise countersunk within the fifth interior surface 152A The countersinking of the interior opening of the second aperture 156A assists in the insertion and guiding of the clamping fastener 200 into the second aperture 156A advancement of the clamping fastener 200 through the first aperture 106.

In one or more embodiments, the axis 110 is approximately perpendicular to the vertical reference plane 38 when the body 52A is in an initial or first state (generally illustrated in FIGS. 2B and 2C).

In at least one embodiment, the second aperture 156A is concentrically aligned with the axis 110 of the first aperture 106. Thus, in some embodiments, the first aperture 106 and the second aperture 156A may be described as being co-axially aligned with the axis 110. Accordingly, the shaft 206 of the clamping fastener 200 may extend in the first lateral direction X1 into the first aperture 106 and out of the second aperture 156A.

Forming the apertures 106 and 156 to be co-axially aligned is a beneficial result of forming the first and second apertures 106, 156 in a single operation in some embodiments. More specifically, after the body 52A is extruded and cut to length, a drilling apparatus (such as a CNC machine) can form the first aperture 106 and then continue through the medial slot 180A and then form the second aperture 156A starting from the fifth interior surface 152A through the fifth portion 138A of the second leg 130A to the third exterior portion 142A. As will be appreciated by one of skill in the art, forming the apertures 106, 156 in a single operation saves time (and costs) because less set up time is required at the drilling apparatus. Moreover, forming the apertures 106, 156 in a single operation ensures the apertures are coaxially aligned to receive the shaft 206 of the clamping fastener 200.

It is noted the configuration of the mounting device 50A optionally including a first aperture 106 elongated in the vertical dimension Y and the generally circular second aperture 156A allows for the movement of the portions 84A, 134A of the first leg 80A and/or the second leg 130A, respectively. Additionally, or alternatively, movement of the portions 84A, 134A of the first leg 80A and/or the second leg 130A, respectively may also be facilitated by forming the first aperture 106 with a first interior diameter 108 that is greater than the second interior diameter 158 of the second aperture 156A.

In particular, and as described in detail further herein, the bending or flexing of the first leg 80A and/or the second leg 130A (i.e., via the portions 84A, 134A), respectively is made easier by forming the first aperture 106 such that it is elongated in the vertical dimension Y or has a greater internal diameter than the diameter of the second aperture 156A to allow for movement of the clamping fastener 200 within the first leg 80A and after the clamping fastener 200 is secured within the second aperture 156A, as the clamping fastener 200 may reposition itself within the elongated first aperture 106 during the clamping process to secure the mounting device 50A to the panel projection 8A.

Although embodiments of the present disclosure are directed to extrusion of the body 52A, it is contemplated that the body 52A may be formed from a piece of stock and then bent using one or more processes (e.g., at least two bending processes and, in some instances, at least four bending processes) to form the leg 80A, the wall 56A, and the leg 130A, without departing from the scope of the present disclosure. In addition, it is contemplated that the differing thicknesses of the various portions of the legs 80A, the wall 56A, and the leg 130A may be formed prior to the bending processes and/or may be formed as a result of the bending processes, without departing from the scope of the present disclosure.

The body 52A further comprises an upper slot 176A positioned between the first interior surface 100A of the first leg and the fourth interior surface 150A of the second leg. The upper slot 176A extends in the longitudinal dimension Z from the first end 54A to the second end 54B of the mounting device 50A. Accordingly, the upper slot 176A may be described as having two open ends.

The attachment aperture 62A extends to the upper slot 176A in at least some embodiments. The upper slot 176A has a predetermined upper slot width measured in the lateral dimension X. In some embodiments, the upper slot width is sufficient to receive a nut, or a flange of the nut (as generally illustrated in FIG. 6A). In this manner, an attachment fastener 220 may extend through the attachment aperture 62A to threadably engage a nut positioned in the upper slot 176A.

In the vertical dimension Y, the upper slot 176A extends between the lower surface 60A of the wall 56A to first and second ledges 90A, 140A (illustrated in FIG. 2B) defined by the second portion 88A and fifth portion 138A of the legs. The upper slot 176A has a first height measured in the vertical dimension Y.

A medial slot 180A is defined between the second interior surface 102A and the fifth interior surface 152A. The medial slot also extends in the longitudinal dimension Z from the first end 54A to the second end 54B, and may be described as having two open ends.

The medial slot 180A is accessible from the upper slot 176A. The medial slot has a medial slot width measured in the lateral dimension X, the medial slot width being less than the upper slot width. In some embodiments, the medial slot 180A width is sufficient to receive a body of a nut.

In the vertical dimension Y, the medial slot extends between the ledges 90A, 140A to the upper surfaces of the first and second protuberances 112A, 166A. The medial slot 180A has a second height measured in the vertical dimension Y. In some embodiments, the second height of the medial slot 180A is greater than the first height of the upper slot 176A.

The body 52A further comprises a receptacle 184A configured to receive the panel projection 8A. The receptacle 184A is positioned between the third interior surface 104A of the first leg and the sixth interior surface 154A of the second leg. In the vertical dimension Y, the receptacle 184A extends from the first and second hooks 116A, 170A to bottom surfaces of the first and second protuberances 112A, 166A. The receptacle 184A is accessible from the medial slot 180A. Accordingly, a shaft of an attachment fastener 220 extending through the attachment aperture 62A could extend into the receptacle 184A. The receptacle 184A has a third height measured in the vertical dimension Y. In some embodiments, the third height is greater than the first height of the upper slot 176A and the second height of the medial slot 180A.

The body 52A has an initial or first state (generally illustrated in FIG. 2B) in which the first and second legs 80A, 130A are unbent and in initial positions relative to the wall 56A and to the vertical reference plane 38. In the first state, the first hook 116A is separated from the second hook 170A by a first distance 174A measured in the lateral dimension X. The first distance 174A is less than the first width 34A separating the first and second ridges 16A, 26A of the panel projection 8A.

In some embodiments, in the first state, the first exterior portion 92A of the first leg is oriented at an oblique angle relative to the vertical reference plane 38. Similarly, in the first state, the third exterior portion 142A of the second leg, may be oriented at an oblique angle relative to the vertical reference plane 38.

During installation of the mounting device 50A onto a panel projection 8A, the mounting device 50A is pressed onto the panel projection 8A such that the panel projection 8A is received in the receptacle 184A. As the first and second hooks 116A, 170A contact the ridges 16A, 26A of the panel projection 8A, the ramps 118A, 172A of the hooks contact the upper portions 14A, 24A of the sidewalls of the panel projection 8A. Contact between the ramps 118A, 172A and sidewalls 12A, 22A apply forces to the legs 80A, 130A, the forces oriented away from the vertical reference plane 38. In response, one or more of the first and second hinges 86A, 136A bends and at least one of the legs moves further away from the vertical reference plane 38. In some embodiments, one or more of the first and second legs 80A, 130A bends between approximately 1° and approximately 7°, or particularly approximately 3°, as one or more of the hinges 86A, 136A bend. At this point the body 52A is in a second state. In the second state, the first hook 116A is separated from the second hook 170A by a second distance that is greater than the first distance 174A.

As the mounting device 50A is further pressed onto the panel projection 8A, the second distance between the hooks 116A, 170A increases until it is greater than the first width 34A separating the ridges 16A, 26A of the panel projection 8A. The hooks can then descend below the ridges 16A, 26A and one or more of the first and second hinges 86A, 136A bends such that the legs return (or snap) inwardly toward the vertical reference plane 38 and at least partially back to their initial shape. Accordingly, the first and second hooks are separated by a third distance that is less than the first width 34A.

In some embodiments, the mounting device returns to the first state and the third distance is approximately equal to the first distance 174A. Alternatively, in other embodiments the third distance is less than the first distance 174A. In at least one embodiment, the third distance is greater than the first distance 174A.

To clamp or secure the mounting device 50A to the panel projection 8A, the shaft 206 of the clamping fastener 200 is inserted through the first aperture 106, through the medial slot 180A, and out of the second aperture 156A. In the embodiment of the mounting device 50A illustrated in FIGS. 2A-2G, a nut 212 is threaded onto the shaft adjacent to an exterior surface of the second leg 130A. This prevents the first and second hinges 86A, 136A from bending outwardly (i.e., away from the vertical reference plane 38) and limits the distance between the first and second hooks 116A, 170A to less than the first width 34A separating the ridges 16A, 26A of the panel projection. Accordingly, the mounting device 50A may not be removed from the panel projection 8A by lifting the mounting device in the vertical dimension Y.

As the nut 212 is tightened on the shaft 206, the nut 212 presses against the exterior surface of the second leg 130A while the head 202 presses against an exterior surface of the first leg 80A. In this manner, the first and second legs bend at the first and second hinges 86A, 136A, and the legs are drawn inwardly toward the vertical reference plane 38. When the nut 212 is tightened to a predetermined torque, the body 52A is in a third state.

In the third state, the first hook 116A is separated from the second hook 170A by a third distance. The third distance is less than the first width 34A separating the ridges 16A, 26A of the panel projection 8A. Optionally, in some embodiments, the third distance is also less than the first distance 174A of the first state.

Additionally, or alternatively, in the third state, the orientation of the first, second and third portions 84A, 88A, 94A, respectively of the first leg 80A and the fourth, fifth and six portions 134A, 138A, 144A, respectively of the second leg 130A change relative to the vertical reference plane 38 compared to their orientations in the first state shown in FIG. 2B. In at least one embodiment, the first, second, third, fourth, fifth and six portions 84A, 88A, 94A, 134A, 138A, 144A of the first and second legs 80A, 130A, respectively, are more vertically oriented, i.e., more parallel to the vertical reference plane 38, in the third state than in the first state.

Moreover, in some embodiments, at least the first exterior portion 92A of the first leg may be approximately parallel to the vertical reference plane 38 in the third state. Similarly, at least the third exterior portion 142A of the second leg may also be approximately parallel to the vertical reference plane 38 in the third state.

Figure 2F:
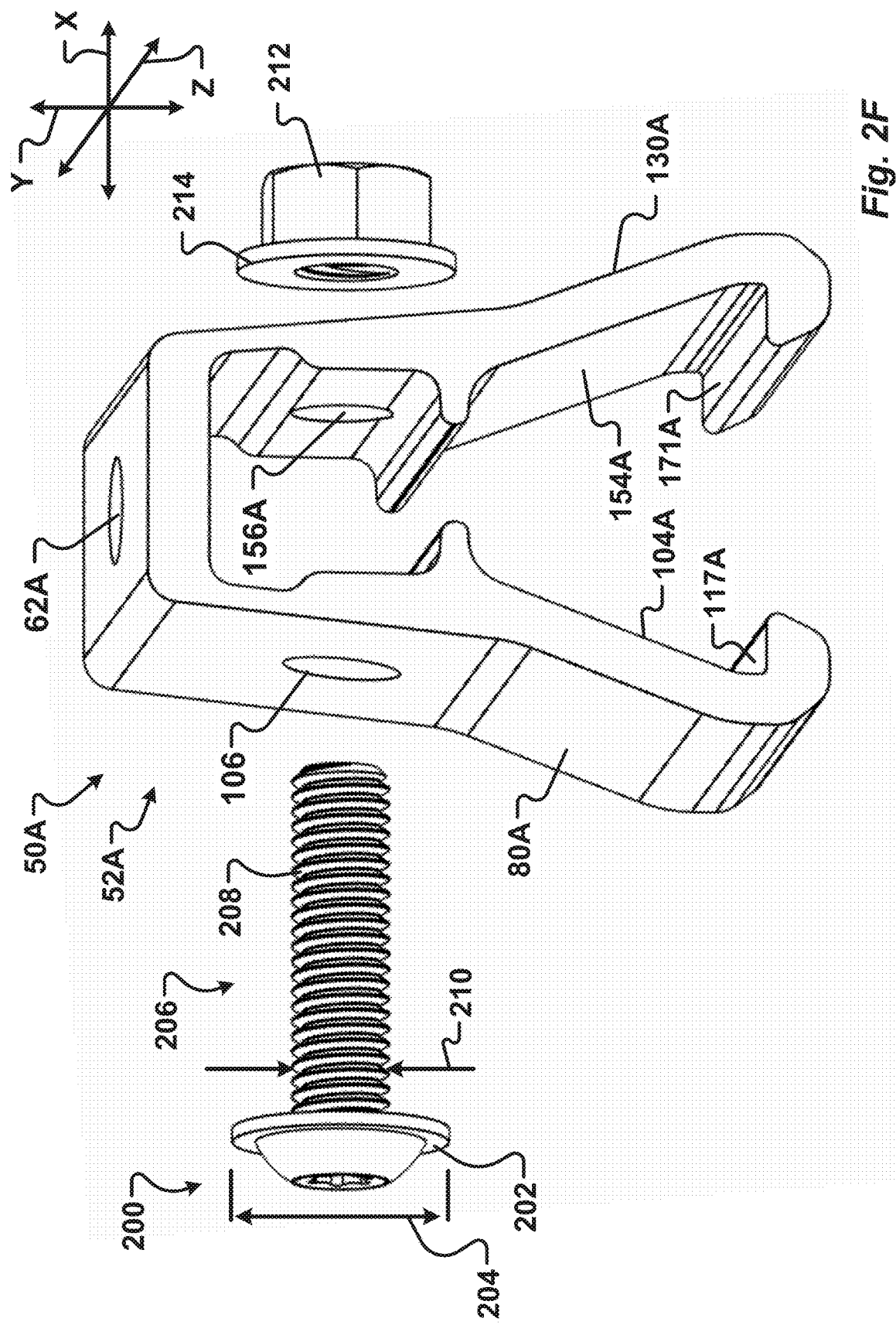
FIG. 2F is an exploded front perspective view of the mounting device of FIG. 2A.
Figure 2G:
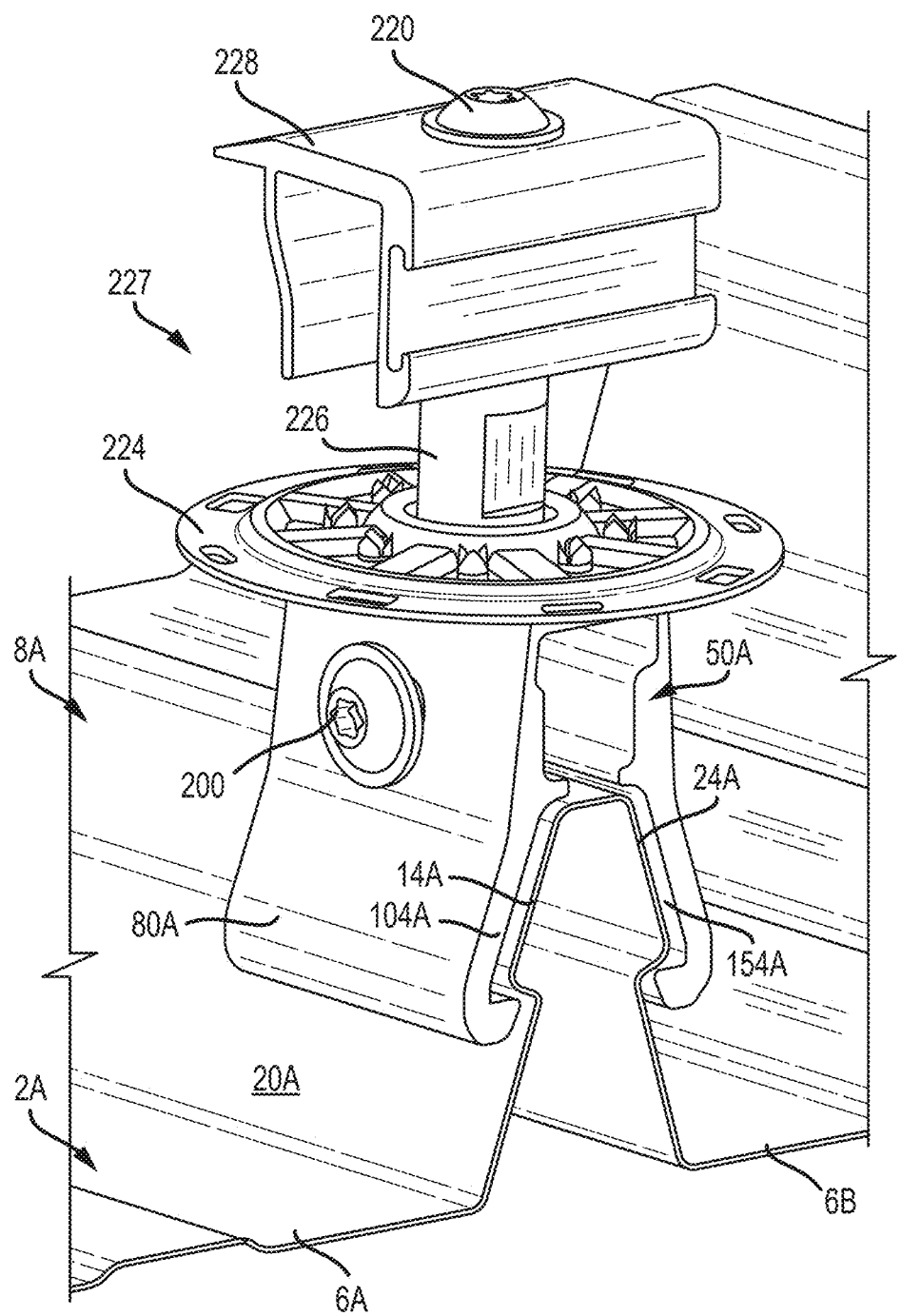
FIG. 2G is a perspective view of the mounting device of FIG. 2A engaged to the panel projection and with an attachment secured to the mounting device.

Referring now to FIG. 2G, when the mounting device 50A is engaged to a panel projection 8A, the third interior surface 104A of the first leg 80A is adjacent to the first upper portion 14A of the panel projection and the sixth interior surface 154A of the second leg is adjacent to the second upper portion 24A. Moreover, at least a portion (or all) of the third and sixth interior surfaces 104A, 154A are in contact with (and may apply a compressive force to) the first and second upper portions 14A, 24A of the panel projection. In this manner, the planar surfaces of the third and sixth interior surfaces 104A, 154A reduce or prevent inadvertent or unintended movement of the mounting device 50A relative to the panel projection 8A. The contact between the third and sixth interior surfaces 104A, 154A with the upper portions 14A, 24A of the panel projection 8A also prevents over insertion of hooks 116A, 170A into the first and second recesses 18A, 28A to prevent damage to the roof or building surface 2A and to the panel projection 8A.

After the mounting device 50A is engaged to a panel projection 8A, an attachment 222 may be connected to the mounting device. For example, as illustrated in FIG. 2G, a photovoltaic module mounting assembly (such as described in U.S. Pat. No. 10,903,785, which is incorporated herein in its entirety) may be connected to the mounting device 50A. Other attachments 222 may also be connected to the mounting device, including those described in U.S. Patent Application Publication 2020/0340712 and U.S. Patent Application Publication 2024/0014770, which are also incorporated herein in their entireties. In some embodiments, the attachment comprises one or more of a mounting plate 224, a stanchion 226 (or standoff), and a PV clamp 228 secured to the stanchion by an attachment fastener 220. Optionally, the stanchion 226 may include a threaded shaft that extends through an optional aperture of the mounting plate and into the attachment aperture 62A (or 62B).

In some tests, the mounting device 50A engaged to a panel projection 8A resisted approximately 1,500 lbs (approximately 6.7 K Newtons) of lift off force without damage to the panel projection 8A (or other roof protrusion) or to the mounting device. In contrast, in a comparison test, one known clamp resisted about 1,000 lbs of lift off force on a similar roof projection 8.

Referring now to FIGS. 3A-3D, a mounting device 50B according to other embodiments of the present disclosure is illustrated. The mounting device 50B is a variant of the embodiments of the mounting device 50A described in conjunction with FIGS. 2A-2G. Accordingly, mounting device 50B includes many of the same or similar features as mounting device 50A. Corresponding components between mounting device 50B and mounting device 50A are identified by the same reference numerals, and the corresponding discussion presented in conjunction with FIGS. 2A-2G is equally applicable to the mounting device 50B unless otherwise noted to the contrary. Those components of the mounting device 50B of the embodiment described in conjunction with FIGS. 3A-3D that differ in at least some respect from the corresponding components of the mounting device 50A are identified with the same reference number, but with a suffix such as "B". Notwithstanding the discussion of differences that may exist between a component of the embodiments of FIGS. 2A-2G and corresponding components in the embodiments of the mounting device 50B described in conjunction with FIGS. 3A-3D, the remainder of the discussion of this corresponding component from FIGS. 2A-2G is equally applicable to the embodiment of FIGS. 3A-3D unless otherwise noted to the contrary.

Figure 3C:
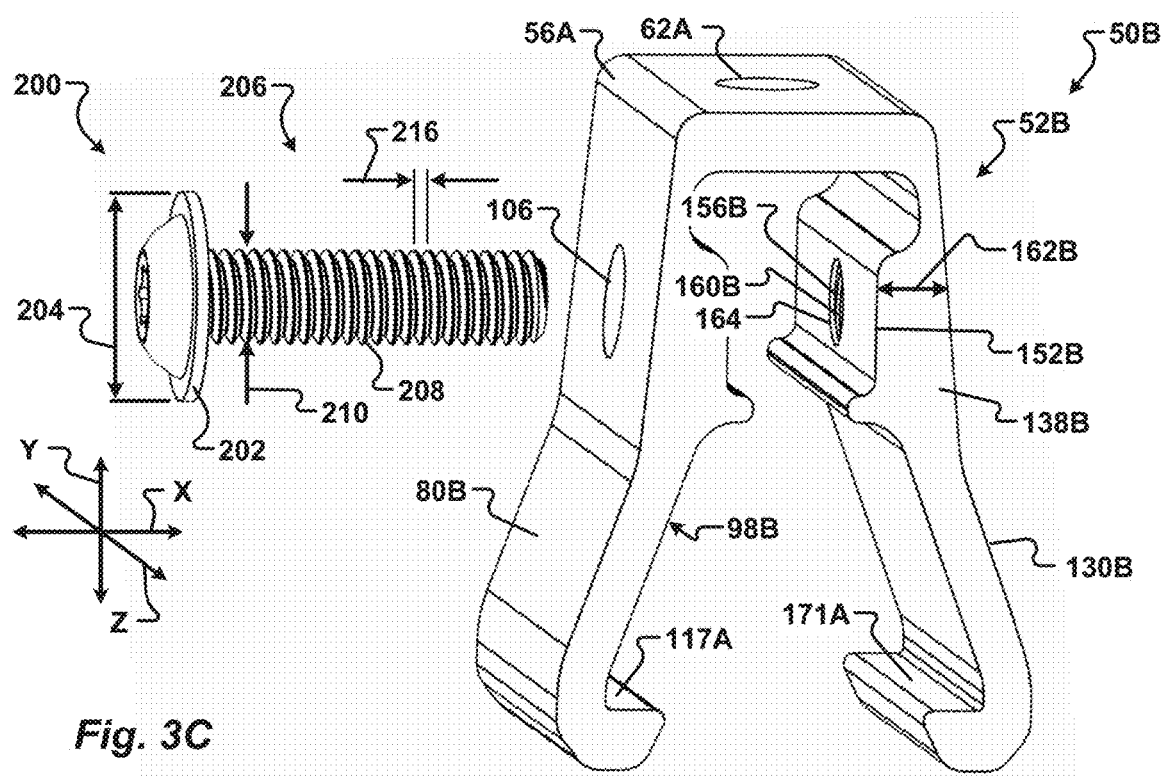
FIG. 3C is a front perspective view of the mounting device of FIG. 3A.
Figure 3D:
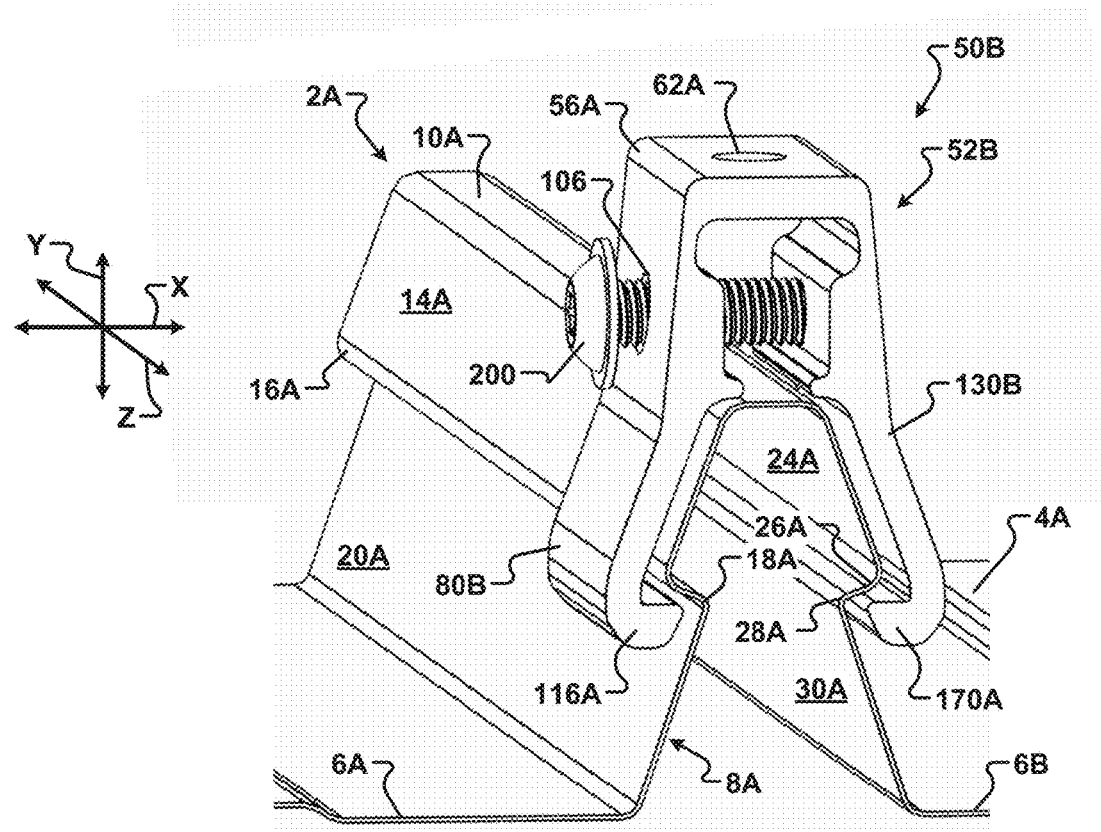
FIG. 3D is a perspective view of the mounting device of FIG. 3A engaged to the panel projection of FIG. 1.

The mounting device 50B comprises a body 52B that is adapted to engage a panel projection 8A in a manner similar to mounting device 50A. Notably, body 52B includes a second leg 130B with a second aperture 156B that is threaded. Accordingly, the second aperture 156B comprises an interior thread 160B that is configured to engage the exterior thread 208 of a clamping fastener 200. Accordingly, as generally illustrated in FIG. 3D, the mounting device 50B can be secured to the panel projection 8A without use of a nut 212 (such as shown in FIG. 2F in conjunction with mounting device 50A).

The threaded second aperture 156B has a length 162B (illustrated in FIGS. 3A and 3C) measured in the lateral dimension X that is equal to the fifth thickness of the fifth portion 138B. The fifth thickness of the fifth portion 138B is selected such that the length 162B of the threaded second aperture 15B is sufficient to allow at least two revolutions of the interior thread 160B. In this manner, the interior thread 160B will provide a strong threaded engagement with the exterior thread 208 of the clamping fastener 200 to prevent pull-out of the clamping fastener.

In some embodiments, the length 162B is at least 3 mm. In another embodiment, the length 162B is about 4 mm. In some embodiments, the length 162B is between about 3 mm and about 7 mm.

In some embodiments, the fifth thickness of the fifth portion 138B is greater than the fifth thickness of the fifth portion 138A of the mounting device 50A described in FIGS. 2A-2G. Optionally, the second thickness of the second portion 88B of the first leg 80B is also greater than the second thickness of the second portion 88A of the first leg 80A of the mounting device 50A.

In at least one embodiment, the fifth thickness of the fifth portion 138B is approximately equal to the second thickness of the second portion 88B of the first leg 80B. Alternatively, the fifth thickness may be greater than (or less than) the second thickness.

Forming the body 52B and the fifth portion 138B of the second leg 130B such that the fifth thickness provides a sufficient length 162B for the threaded second aperture 156B is important to ensure sufficient room for the interior thread 160B to engage the exterior thread 208 of the clamping fastener 200. More specifically, if the length 162B is insufficient, there will not be enough room within the threaded second aperture 156B for a sufficient number of thread rotations (or pitch lengths) within the threaded second aperture 156B to provide engagement with the exterior thread 208 and to prevent thread failure. If the length 162B is insufficient, the interior thread 160B could fail or strip. Accordingly, in some embodiments the length 162B of the threaded second aperture 156B is at least four times greater than the thread pitch 216 (illustrated in FIG. 3C) of the exterior thread of the clamping fastener 200. In this manner, there are a sufficient number of revolutions of the interior thread 160B within the threaded second aperture 156B to provide a strong engagement with the exterior thread 208 of the clamping fastener 200.

Another distinction of the mounting device 50B is that the fifth interior surface 152B associated with the fifth portion 138B of the second leg may optionally include a chamfer, or countersink 164, associated with the threaded second aperture 156B. When present, the countersink 164 faces the opening of the first aperture 106 on the first inside surface 98B of the first leg. As will be appreciated, the optional countersink 164 makes it easier for a threaded clamping fastener 200 to engage the interior thread 160B of the second aperture 156B after being advanced in the first lateral direction X1 through the first aperture 106.

Accordingly, in some embodiments, as the clamping fastener 200 is advanced through the first aperture 106, the shaft 206 will first move into the countersink 164, which will keep the shaft and its exterior thread 208 aligned with the interior thread 160B of the second aperture 156B. In this manner, the optional countersink 164 improves efficiency (and prevents damage) by preventing cross-threading of the clamping fastener 200 in the second aperture 156B.

It is noted the configuration of the mounting device 50B, 50C, 50D, 50E, 50F, 50G optionally including an first aperture 106 that is elongated in the vertical dimension Y or that has a first interior diameter 108 that is greater than the second interior diameter 158 of the second aperture 156A, 156B allows for the movement of the portions 84, 134 of the first leg 80 and/or the second leg 130, respectively. In particular, and as described in detail further herein, the bending or flexing of the first leg 80 and/or the second leg 130 (i.e., via the portions 84, 134), respectively is made easier by elongating the first aperture 106 (or making the first interior diameter greater than the second interior diameter) allowing for movement of the clamping fastener 200 within the first leg 80 (or within the first aperture 106) and after the clamping fastener 200 is secured within the second aperture 156, as the clamping fastener 200 may reposition itself within the first aperture 106 during the clamping process to secure the mounting device 50B to the panel projection 8A.

The first protuberance 112B and the second protuberance 166B are also different compared to the protuberances 112A, 166A of the mounting device 50A described in FIGS. 2A-2G. For example, because the second thickness of the second portion 88B of the first leg and the fifth thickness of the fifth portion 138B of the second leg are greater than in the corresponding second and fifth portions 88A, 138A of the mounting device 50A, upper surfaces of the protuberances 112B, 166B are shorter (or project a decreased distance from the first inside surface 98B and the second inside surface 148B).

In some embodiments, ends of the protuberances 112B, 166B are positioned in approximately the same position as the ends of the protuberances 112A, 166A relative to the vertical reference plane 38. Accordingly, in at least some embodiments, the first protuberance 112B is spaced from the second protuberance 166B by a distance approximately equal to the distance between protuberances 112A, 166A.

Referring now to FIGS. 4A-4B, a mounting device 50C according to other embodiments of the present disclosure is illustrated. The mounting device 50C is a variant of the embodiments of the mounting devices 50A, 50B described in conjunction with FIGS. 2A-2G and 3A-3D. Accordingly, mounting device 50C includes many of the same or similar features as mounting devices 50A, 50B. Corresponding components between mounting device 50C and mounting devices 50A, 50B are identified by the same reference numerals, and the corresponding discussion presented in conjunction with FIGS. 2A-3D is equally applicable to the mounting device 50C unless otherwise noted to the contrary. Those components of the mounting device 50C of the embodiment described in conjunction with FIGS. 4A-4B that differ in at least some respect from the corresponding components of the mounting devices 50A, 50B are identified with the same reference number, but with a suffix such as "C". Notwithstanding the discussion of differences that may exist between a component of the embodiments of FIGS. 2A-3D and corresponding components in the embodiments of the mounting device 50C described in conjunction with FIGS. 4A-4B, the remainder of the discussion of the corresponding components from FIGS. 2A-3D is equally applicable to the embodiment of FIGS. 4A-4B unless otherwise noted to the contrary.

The mounting device 50C comprises a body 52C that is adapted to engage a panel projection 8A in a manner similar to mounting devices 50A, 50B. Notably, the mounting device 50C has a second leg 130C with a fifth portion 138C that has a fifth thickness that is greater than the second thickness of the second portion 88A of the first leg 80A, such that the mounting device 50C is asymmetrical along the reference plane 38 at least with respect to the second portion 88A and the fifth portion 138C. This is beneficial to save material required to manufacture the body 52C. Further, increasing the fifth thickness provides additional space to increase the number of revolutions of the interior thread 160B formed in the second aperture 156B.

In some embodiments, the fifth portion 138C also has a fifth thickness greater than the corresponding fifth portions 138A, 138B of the mounting devices 50A, 50B. Accordingly, the threaded second aperture 156B that has a length 162C that is greater than the length 162B of the mounting device 50B and/or greater than the length 162A of the mounting device 50A. The increased length 162C of the second threaded aperture 156B provides more room to form interior threads 160B in the lateral dimension X. Accordingly, the length 162C improves thread engagement of a clamping fastener 200 within the second threaded aperture 156B. In this manner, the potential for damage or failure of the interior thread 160 is reduced or eliminated.

In some embodiments, the first protuberance 112A and the second protuberance 166C of the mounting device 50C are different from one another due to the differences in the second thickness of the second portion 88A of the first leg and the fifth thickness of the fifth portion 138C of the second leg. For example, because in some embodiments the fifth thickness of the fifth portion 138C of the second leg is greater than in the corresponding second portion 88A, an upper surface of the protuberance 166C is shorter (or projects a decreased distance from the second inside surface 148C) compared to protuberance 112A.

In some embodiments, ends of the protuberances 112A, 166C are positioned in approximately the same position as the ends of the protuberances 112A, 166A of the mounting device 50A described in conjunction with FIGS. 2A-2G. Accordingly, in at least some embodiments, the first protuberance 112A is spaced from the second protuberance 166C by a distance approximately equal to the distance between protuberances 112A, 166A of the mounting device 50A.

Referring now to FIGS. 5A-5B, a mounting device 50D according to other embodiments of the present disclosure is illustrated. The mounting device 50D is a variant of the embodiments of the mounting devices 50A, 50B, 50C described in conjunction with FIGS. 2A-4B. Accordingly, mounting device 50D includes many of the same or similar features as mounting devices 50A, 50B, 50C. Corresponding components between mounting device 50D and mounting devices 50A, 50B, 50C are identified by the same reference numerals, and the corresponding discussion presented in conjunction with FIGS. 2A-4B is equally applicable to the mounting device 50D unless otherwise noted to the contrary. Those components of the mounting device 50D of the embodiment described in conjunction with FIGS. 5A-5B that differ in at least some respect from the corresponding components of the mounting devices 50A, 50B, 50C are identified with the same reference number, but with a suffix such as "D". Notwithstanding the discussion of differences that may exist between a component of the embodiments of FIGS. 2A-4B and corresponding components in the embodiment of the mounting device 50D described in conjunction with FIGS. 5A-5B, the remainder of the discussion of the corresponding components from FIGS. 2A-4B is equally applicable to the embodiment of FIGS. 5A-5B unless otherwise noted to the contrary.

The mounting device 50D comprises a body 52D that is adapted to engage a panel projection 8A in a manner similar to mounting devices 50A, 50B, 50C. Notably, the wall 56D includes an attachment slot 62B extending in the longitudinal dimension Z. The slot does not extend to the first or second ends 54A, 54B. Accordingly, the slot has two closed ends 64.

The first and second legs 80D, 130D of the body 52D include base projections 120D, 186D. A first base projection 120D extends in the first lateral direction X1 from the first inside surface 98D of the first leg 80D toward the second leg 130D. The second base projection 186D extends in the second lateral direction X2 from the second inside surface 148D of the second leg 130D toward the first leg 80D.

The base projections 120D, 186D divide the upper slot 176D into a first upper slot portion 176-1D and a second upper slot portion 176-2D. The first upper slot portion 176-1D extends between a lower surface 60D of the wall 56D and upper surfaces of the base projections 120D, 186D.

In some embodiments the first upper slot portion 176-1D has a width sufficient to retain a flange 214 of a nut 212. Accordingly, the upper slot 176D may be described as a flange slot.

Free ends of the base projections 120D, 186D are separated by a predetermined distance. Optionally, the distance between the free ends of the base projections 120D, 186D is approximately equal to the width of a body 215 of the nut 212 as measured between opposing flat surfaces of the nut body. Accordingly, when the body 215 of the nut 212 is positioned between the base projections 120D, 186D with the nut flange 214 positioned in the upper slot 176, the base projections 120D, 186D prevent rotation of the nut 212 around a vertical axis oriented in the vertical dimension Y. However, the nut 212 may be moved in the longitudinal dimension Z between the base projections 120D, 186D. In this manner, the base projections 120D, 186D facilitate threading the shaft of an attachment fastener 220 to a nut 212 retained in the body 52D.

The base projections 120D, 186D also retain the nut 212 is a predetermined position in the vertical dimension Y relative to the wall 56D. Specifically, the base projections 120D, 186D prevent the flange 214 of the nut 212 from moving downwardly in the vertical dimension Y out of the first upper slot portion 176-1D. However, when engaged by the attachment fastener 220, the nut 212 may be drawn upwardly in the vertical dimension Y against the lower surface 60F of the wall 56D.

Notably, the first hinge 86D is formed between the first base projection 120D and the second portion 88D of the first leg 80D. Similarly, the second hinge 136D is formed between the second base projection 186D and the fifth portion 138D of the second leg 130D.

A medial slot 180D extends below the ledges 90D, 140D to a protuberance 166D associated with the second leg 130D. The first leg 80D does not include a protuberance across from the protuberance 166D, such that the mounting device 50D is asymmetric along the reference plane 38 at least with respect to the second portion 88D and the fifth portion 138D. The medial slot 180D has a greater height measured in the vertical dimension Y than the medial slots 180A of the devices 50A, 50B and 50C. The increased height of the medial slot 180D provides additional room within the body 52D for managing or retaining wires associated with photovoltaic modules or other equipment subsequently mounted to the building surface by the mounting device 50D.

Figure 6B:
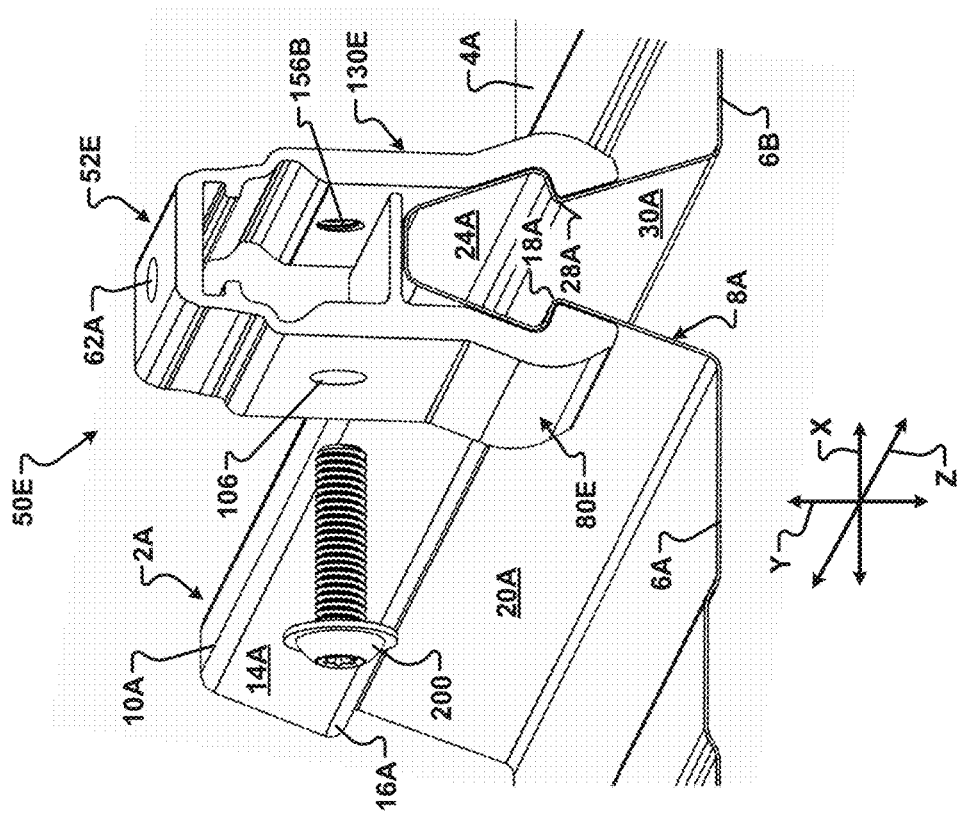
FIG. 6B is a front perspective view of the mounting device of FIG. 6A engaged to the panel projection of FIG. 1.
Figure 6A:
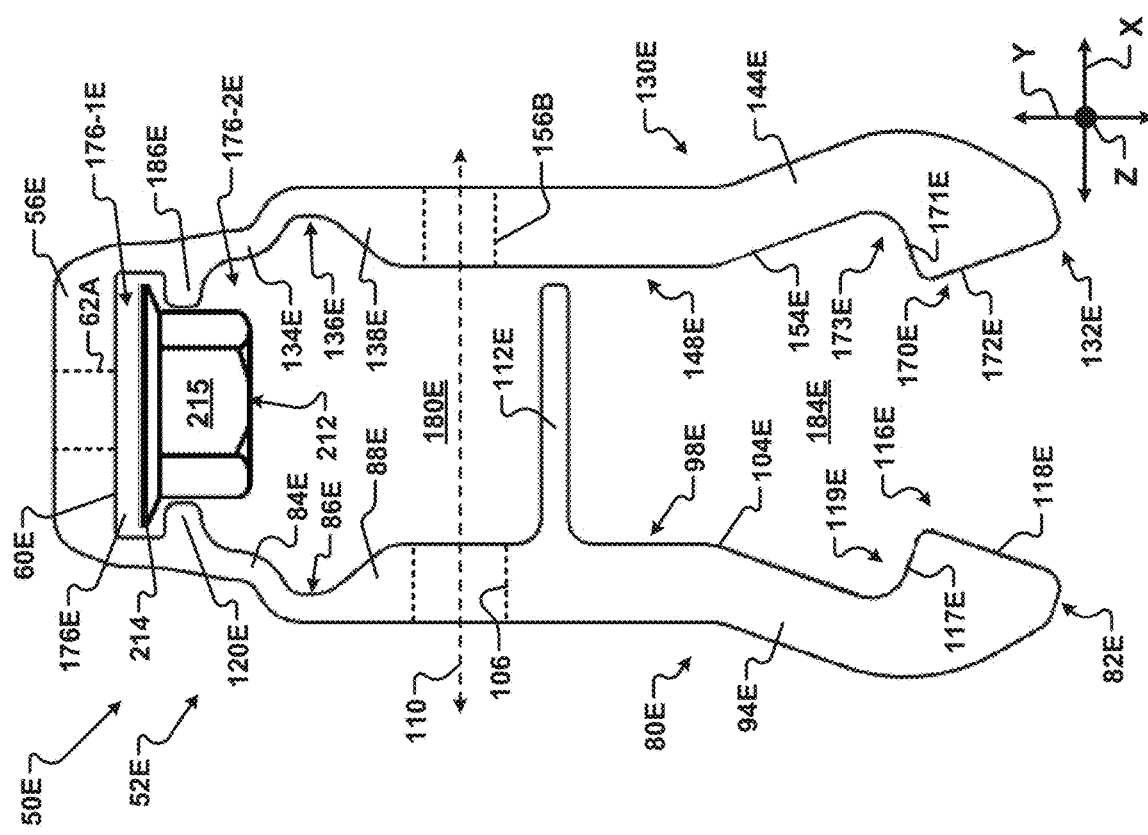
FIG. 6A is a front elevation view of a mounting device according to a fifth embodiment of the present disclosure.

Referring now to FIGS. 6A-6B, a mounting device 50E according to other embodiments of the present disclosure is illustrated. The mounting device 50E is a variant of the embodiments of the mounting devices 50A, 50B, 50C, 50D described in conjunction with FIGS. 2A-5B. Accordingly, mounting device 50E includes many of the same or similar features as mounting devices 50A, 50B, 50C, 50D. Corresponding components between mounting device 50E and mounting devices 50A, 50B, 50C, 50D are identified by the same reference numerals, and the corresponding discussion presented in conjunction with FIGS. 2A-5B is equally applicable to the mounting device 50E unless otherwise noted to the contrary. Those components of the mounting device 50E of the embodiment described in conjunction with FIGS. 6A-6B that differ in at least some respect from the corresponding components of the mounting devices 50A, 50B, 50C, 50D are identified with the same reference number, but with a suffix such as "E". Notwithstanding the discussion of differences that may exist between a component of the embodiments of the mounting devices of FIGS. 2A-5B and corresponding components in the embodiments of the mounting device 50E described in conjunction with FIGS. 6A-6B, the remainder of the discussion of the corresponding component from FIGS. 2A-5B is equally applicable to the embodiment of FIGS. 6A-6B unless otherwise noted to the contrary.

The mounting device 50E comprises a body 52E that is adapted to engage a panel projection 8A in a manner similar to mounting devices 50A, 50B, 50C, 50D. Notably, the first and second legs 80E, 130E have different shapes compared to the first and second legs of the mounting devices 50A, 50B, 50C, 50D.

The first and second legs 80E, 130E also include base projections 120E, 186E that divide the upper slot 176E and that are similar to the base projections 120D, 186D described in conjunction with FIGS. 5A-5B. As generally illustrated in FIG. 6A, the upper slot 176E is divided into a first upper slot portion 176-1E and a second upper slot portion 176-2E by the base projections 120E, 186E.

In some embodiments, the first upper slot portion 176-1E is adapted to receive the flange 214 of a nut 212. Distal ends of the base projections 120E, 186E are separated by a predetermined distance approximately equal to the width of a body 215 of the nut 212. Accordingly, when positioned between the base projections 120E, 186E, the nut 212 is retained in a non-rotating manner relative to the vertical dimension Y. As will be appreciated by one of skill in the art, by holding the nut in a non-rotating manner, the base projections 120E, 186E improve efficiency by eliminating the requirement to engage the nut with a wrench during installation. However, the nut 212 may be moved in the longitudinal dimension Z between the base projections 120E, 186E. In this manner, the base projections 120E, 186E facilitate threading the shaft of an attachment fastener 220 (such as illustrated in FIG. 2A) to a nut 212 retained in the body 52E.

The base projections 120E, 186E also retain the nut 212 is a predetermined position in the vertical dimension Y relative to the wall 56E. Specifically, the base projections 120E, 186E prevent the flange 214 of the nut 212 from moving downwardly in the vertical dimension Y out of the first upper slot portion 176-1E. However, when engaged by the attachment fastener 220, the nut 212 may be drawn upwardly in the vertical dimension Y against a lower surface 60E of the wall 56E.

A medial slot 180E extends below the base projections 120E, 186E to a protuberance 112E extending from the first inside surface 98E of the first leg 80E. The body 52E does not include a protuberance extending from the second leg 130E, such that the mounting device 50E is asymmetric along the reference plane 38 at least with respect to the second portion 88E and the fifth portion 138E. In addition, at least a portion of the medial slot 180E has a medial slot width that is greater than a width of the upper slot 176E.

Notably, the first hinge 86E is formed between the first base projection 120E and the second portion 88E of the first leg. Similarly, the second hinge 136E is formed between the second base projection 186E and the fifth portion 138E of the second leg.

The medial slot 180E has a greater height measured in the vertical dimension Y than the medial slots 180A of the devices 50A, 50B and 50C. The increased height of the medial slot 180E provides additional room within the body 52E for managing or retaining wires associated with photovoltaic modules or other equipment subsequently mounted to the building surface by the mounting device 50E.

The third portion 94E of the first leg 80E and the sixth portion 144E of the second leg 130E have different shapes compared to the legs of devices 50A, 50B, 50C and 50D. However, the third interior surface 104E of the third portion 94E and the six interior surface 154E of the sixth portion 144E are substantially planar, i.e., not curved, between the hooks 116E, 170E and the protuberance 112E. However, there is a bend in the third interior surface 104E and the sixth interior surface 154E such that a portion is at an angle similar to the angle of the upper portions 14A, 24A of the panel projection 8A and a portion is vertical or substantially parallel to the vertical reference plane 38. Accordingly, as generally illustrated in FIG. 6B, when the mounting device 50E is engaged to a panel projection 8A, a substantial portion (or a majority) of the interior surfaces 104E, 154E engages the corresponding upper portions 14A, 24A of the panel projection 8A.

Referring now to FIGS. 7A-7D, a mounting device 50F according to other embodiments of the present disclosure is illustrated. The mounting device 50F is a variant of the embodiments of the mounting devices 50A, 50B, 50C, 50D, 50E described in conjunction with FIGS. 2A-6B. Accordingly, mounting device 50F includes many of the same or similar features as mounting devices 50A, 50B, 50C, 50D, 50E. Corresponding components between mounting device 50F and mounting devices 50A, 50B, 50C, 50D, 50E are identified by the same reference numerals, and the corresponding discussion presented in conjunction with FIGS. 2A-6B is equally applicable to the mounting device 50F unless otherwise noted to the contrary. Those components of the mounting device 50F of the embodiment described in conjunction with FIGS. 7A-7D that differ in at least some respect from the corresponding components of the mounting devices 50A, 50B, 50C, 50D, 50E are identified with the same reference number, but with a suffix such as "F". Notwithstanding the discussion of differences that may exist between a component of the embodiments of FIGS. 2A-6B and corresponding components in the embodiments of the mounting device 50F described in conjunction with FIGS. 7A-7D, the remainder of the discussion of the corresponding component from FIGS. 2A-6B is equally applicable to the embodiment of FIGS. 7A-7D unless otherwise noted to the contrary.

The mounting device 50F comprises a body 52F that is adapted to engage a panel projection 8B (known as a "T-seam") in a manner similar to mounting devices 50A, 50B, 50C, 50D, 50E. As shown in FIG. 7A, the T-seam panel projection 8B extends from base portions 6B-1, 6B-2 of two adjacent metal panels 4B-1, 4B-2. A first sidewall 12B of the panel projection 8B includes a first upper portion 14B that defines a first ridge 16B and a first recess 18B. A first lower portion 20B extends between the first upper portion 14B and the base portion 6B-1. Similarly, a second sidewall 22B has corresponding components including a second upper portion 24B, a second ridge 26B, a second recess 28B, and a second lower portion 30B.

The first and second upper portions 14B, 24B are joined by a crown 10B. In some embodiments, the crown wraps around both the first ridge 16B and the second ridge 26B. A maximum width 34B of the panel projection 8B is measured in the lateral dimension X through the crown 10B and the first and second ridge 16B, 26B.

Notably, the body 52F of the mounting device 50F has legs 80F, 130F that are configured to engage the T-seam projection 8B. More specifically, the first distance 174F between the first and second hooks 116F, 170F is adapted to be less than the maximum width 34B of the projection 8B. Like the other mounting devices 50A, 50B, 50C, 50D, 50E, the first and second legs 80F, 130F have a first hook 116F and a second hook 170F, respectively. Each hook 116F, 170F has a ramp 118F, 172F. Further, ramps 118F, 172F of the first and second legs are adapted to engage the ridges 16B, 26B and the crown 10B as the mounting device 50F is pressed downwardly onto the T-seam projection 8B during installation.

The ramps 118F, 172F are oriented at a predetermined angle with respect to the vertical reference plane 38. In some embodiments the ramps 118F, 172F are oriented at an angle of between about 35° and about 55° relative to the vertical reference plane. In at least one embodiment, the ramps 118F, 172F are oriented at an angle of about 45° relative to the vertical reference plane.

In addition, the third portion 94F of the first leg 80F has a third interior surface 104F that is generally concave between the first hook 116F and a first protuberance 112F of the first leg. Similarly, the second leg 130F has a sixth portion 144F with a sixth interior surface 154F that is also generally concave between the second hook 170F and a second protuberance 166F. The surfaces 104F and 154F may be described as having a "C" shape or a "D" shape when viewed in cross-section as shown in FIG. 7B. The interior surfaces 104F, 154F define a receptacle 184F configured to receive the T-seam projection 8B as shown in FIG. 7A. In some embodiments, the interior surfaces 104F, 154F have shapes selected to substantially conform to the exterior surfaces of the ridges 16B, 26B and crown 10B. In this manner, contact between the surfaces 104F, 154F and the ridges 16B, 26B and crown 10B prevents unintended or inadvertent movement of the mounting device 50F relative to the T-seam projection 8B.

In FIG. 7B, the mounting device 50F is illustrated with a threaded second aperture 156B. However, in some embodiments, the second aperture is unthreaded as described in conjunction with mounting device 50A.

In embodiments in which the second aperture is threaded, the fifth portion 138F has a fifth thickness that is sufficient to form at least two revolutions of the thread 160B within the threaded second aperture 156B. In some embodiments, a length 162F of the threaded second aperture 156B is at least 3 mm. In another embodiment, the length 162F is about 4 mm. In some embodiments, the length 162F is between about 3 mm and about 7 mm.

The mounting device 50F may have an attachment aperture 62A that is threaded (shown) or unthreaded (not shown). In other embodiments, and referring now to FIG. 7D, the attachment aperture may optionally be elongated to define a slot 62B with one or two closed ends 64. Optionally, when present, the slot 62B may have an open end 66.

Yet another embodiment of a mounting device 50G according to the present disclosure is generally illustrated in FIGS. 8A-8D. The mounting device 50G is a variant of the embodiments of the mounting devices 50A, 50B, 50C, 50D, 50E, 50F described in conjunction with FIGS. 2A-7D. Accordingly, mounting device 50G includes many of the same or similar features as mounting devices 50A, 50B, 50C, 50D, 50E, 50F. Corresponding components between mounting device 50G and mounting devices 50A, 50B, 50C, 50D, 50E, 50F are identified by the same reference numerals, and the corresponding discussion presented in conjunction with FIGS. 2A-7D is equally applicable to the mounting device 50G unless otherwise noted to the contrary. Those components of the mounting device 50G of the embodiment described in conjunction with FIGS. 8A-8D that differ in at least some respect from the corresponding components of the mounting devices 50A, 50B, 50C, 50D, 50E, 50F are identified with the same reference number, but with a suffix such as "G". Notwithstanding the discussion of differences that may exist between a component of the embodiments of FIGS. 2A-7D and corresponding components in the embodiments of the mounting device 50G described in conjunction with FIGS. 8A-8D, the remainder of the discussion of the corresponding component from FIGS. 2A-7D is equally applicable to the embodiment of FIGS. 8A-8D unless otherwise noted to the contrary.

The mounting device 50G comprises a body 52G that is adapted to engage a panel projection 8C (known as a "bulb seam") in a manner similar to mounting devices 50A, 50B, 50C, 50D, 50E, 50F. As shown in FIG. 8A, the bulb seam panel projection 8C extends from base portions 6C-1, 6C-2 of two adjacent metal panels 4C-1, 4C-2. A first sidewall 12C of the panel projection 8C includes a first upper portion 14C that defines a first ridge 16C and a first recess 18C. A first lower portion 20C extends between the first upper portion 14C and the base portion 6C-1.

A second sidewall 22C has a second upper portion 24C and a second recess 28C defined between the second upper portion 24C and a second lower portion 30C of the second sidewall. The second lower portion 30C extends between the base portion 6C-2 and the second recess 28C.

The first upper portion 14C wraps over the second upper portion 24C to define a crown 10C of the panel projection 8C as well as a second ridge 26C. The crown 10C has a maximum width 34C measured in the lateral dimension X through the first and second ridges 16C, 26C. Exterior surfaces of the first and second upper portions 14C, 24C of the panel projection 8C have a generally circular shape when viewed along the longitudinal dimension Z as shown in FIG. 8A.

The upper portions of the mounting device 50G (including the wall 56G and the first, second, fourth and fifth portions 84G, 88G, 134G and 138G) may have similar shapes and dimensions as the corresponding elements of the mounting devices 50A, 50B, 50C. However, in some embodiments, the second thickness of the second portion 88G and the fifth thickness of the fifth portion 138G are different than the corresponding second and fifth thicknesses of one or more of mounting devices 50A, 50B, 50C. In at least one embodiment, the second thickness of the second portion 88G and the fifth thickness of the fifth portion 138G are greater than the corresponding second and fifth thicknesses of one or more of mounting devices 50A, 50B, 50C.

Notably, the first and second legs 80G, 130G of the mounting device 50G are configured to engage the bulb seam projection 8C. More specifically, the first distance 174G between the first and second hooks 116G, 170G is adapted to be less than the maximum width 34C of the projection 8C. Further, the ramps 118G, 172G of the first and second legs are adapted to engage the ridges 16C, 26C as the mounting device 50G is pressed downwardly in the vertical dimension Y onto the bulb seam projection 8C during installation. The first and second hooks 116G, 170G are longer and have a different shape than the hooks 116A, 170A for the panel projection 8A.

The ramps 118G, 172G are oriented at a predetermined angle with respect to the vertical reference plane 38. In some embodiments the ramps 118G, 172G are oriented at an angle of between about 5° and about 25° relative to the vertical reference plane. In at least one embodiment, the ramps 118G, 172G are oriented at an angle of about 15° relative to the vertical reference plane.

The shape of the legs 80G, 130G is also adapted to fit over and engage the exterior surfaces of the bulb seam of the panel projection 8C. More specifically, the third portion 94G of the first leg 80G has a third interior surface 104G that is generally concave between the first hook 116G and a first protuberance 112G of the first leg. Similarly, the second leg 130G has a sixth portion 144G with a sixth interior surface 154G that is also generally concave between the second hook 170G and a second protuberance 166G.

The interior surfaces 104G, 154G are generally arcuate. In some embodiments, the interior surfaces 104G, 154G have a constant radius of curvature for at least a majority of the interior surfaces 104G, 154G. In some embodiments, the interior surfaces 104G, 154G have radii of curvature that are approximately equal to the radii of curvature of the first upper portion 14C where it defines the first and second ridges 16C, 26C. Accordingly, when the mounting device 50G is secured to the panel projection 8C, at least some of (and optionally, substantially all of) the interior surfaces 104G, 154G will engage the first upper portion 14C and its ridges 16C, 26C.

The surfaces 104G and 154G may also be described as having a "C" shape when viewed in cross-section as shown in FIG. 8B. The interior surfaces 104G, 154G define a receptacle 184G that is generally circular and which is configured to receive the bulb seam projection 8C as shown in FIG. 8A.

In some embodiments, the interior surfaces 104G, 154G have shapes selected to substantially conform to the exterior surfaces of the ridges 16C, 26C. In this manner, contact between the surfaces 104G, 154G and the ridges 16C, 26C prevents (or eliminates) unintended or inadvertent movement of the mounting device 50G relative to the bulb seam projection.

In FIG. 8B, the mounting device 50G is illustrated with a threaded second aperture 156B. However, in some embodiments, the second aperture is unthreaded as described in conjunction with the unthreaded second aperture 156A of the mounting device 50A.

In embodiments in which the second aperture is threaded, the fifth portion 138G has a fifth thickness that is sufficient to form at least two revolutions of the thread 160B within the threaded second aperture 156B. In some embodiments, a length 162G of the threaded second aperture 156B is at least 3 mm. In another embodiment, the length 162G is about 4 mm. In some embodiments, the length 162G is between about 3 mm and about 7 mm.

The attachment aperture 62A of the mounting device 50G may be threaded or unthreaded. In other embodiments, and referring now to FIG. 8D, the attachment aperture may optionally be elongated to define a slot 62B with one or two closed ends 64. Optionally, when present, the slot 62B may have an open end 66 at one end of the mounting device 50G.

The mounting devices of all embodiments described herein provide many benefits compared to known mounting devices. For example, the mounting devices of the present disclosure are less expensive to manufacture than comparable mounting devices that are known. The mounting devices of the present disclosure are also simpler to install, and can be installed more quickly, than known mounting devices configured to engage panel projections of the same profile.

Another benefit of the mounting devices of the present disclosure is that they are designed and configured to engage a panel projection in such a way that the mounting devices do not inhibit differential movement of the metal panels forming a building surface during thermal cycling. Said differently, the mounting devices of the present disclosure are designed to accommodate differential movement of metal panels that occurs during thermal cycling. This is especially important when mounting devices are secured to a panel projection comprising a T-seam, a bulb seam, and other known metal panel profiles. In contrast, some known mounting devices engage panel projections which prevent (or reduce) thermal movement of metal panels.

While various embodiments of the system and method have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as, additional items. Further, it is to be understood that the claims is not necessarily limited to the specific features or steps described herein. Rather, the specific features and steps are disclosed as embodiments of implementing the claimed systems and methods.

One aspect of the disclosure comprises any one or more of the aspects/embodiments as substantially disclosed herein.

Another aspect of the disclosure is any one or more of the aspects/embodiments as substantially disclosed herein optionally in combination with any one or more other aspects/embodiments as substantially disclosed herein.

It is another aspect of the present disclosure to provide one or more means adapted to perform any one or more of the above aspects/embodiments as substantially disclosed herein.

To provide additional background, context, and to further satisfy the written description requirements of 35 U.S.C. § 112, the following references are incorporated by reference herein in their entireties: U.S. Patent App. Pub. 2014/0311087, U.S. Patent App. Pub. 2018/0031279, U.S. Patent App. Pub. 2019/0296689, U.S. Patent App. Pub. 2020/0191180, U.S. Patent App. Pub. 2020/0340712, U.S. Patent App. Pub. 2021/0285222, and U.S. Patent App. Pub. 2021/0285223.

What is claimed is:

1. A mounting system selectively engageable to a panel projection extending from a surface of a building, comprising:
    a mounting device with a body, the body comprising:
        a wall with an upper surface and an attachment aperture extending through the upper surface;
        a first leg that extends from the wall to a first free end, the first leg comprising:

a first inside surface; and a first aperture extending along a first axis through the first leg, the first aperture being unthreaded and having a first interior diameter;

a second leg that extends from the wall to a second free end, the second leg comprising:

a second inside surface facing the first inside surface; and a second aperture extending through the second leg, the second aperture having a second interior diameter that is less than the first interior diameter, wherein the first axis extends through the second aperture;

a receptacle for the panel projection defined by portions of the first and second inside surfaces, the receptacle positioned between the first and second apertures and the first and second free ends of the first and second legs; and a clamping fastener, comprising:

a head with a first outer diameter that is greater than the first interior diameter of the first aperture;

a shaft extending from the head, the shaft comprising a second outer diameter that is less than: the first outer diameter, the first interior diameter of the first aperture, and the second interior diameter of the second aperture; and an exterior thread.

2. The mounting system of claim 1, wherein the second aperture has an interior thread configured to engage the exterior thread of the clamping fastener.

3. The mounting system of claim 2, wherein the exterior thread of the clamping fastener has a thread pitch, and wherein the second aperture has a length at least two times greater than the thread pitch.

4. The mounting system of claim 2, wherein when the body is engaged to the panel projection, the exterior thread of the shaft is engaged with the interior thread of the second aperture and the head of the clamping fastener is adjacent to an outside surface of the first leg.

5. The mounting system of claim 1, further comprising:

a first hook proximate to the first free end of the first leg, the first hook extending in a first lateral direction toward the second leg; and a second hook proximate to the second free end of the second leg, the second hook extending in a second lateral direction substantially opposite to the first lateral direction.

6. The mounting system of claim 5, wherein when the body is engaged to the panel projection:

the first hook of the first leg is positioned at least partially within a first recess on a first side of the panel projection; and the second hook of the second leg is positioned at least partially within a second recess on a second side of the panel projection.

7. The mounting system of claim 5, wherein the first and second legs are flexibly deflectable from a first position to a second position such that:

in the first position, the first and second hooks are separated by a first distance; and in the second position, the first and second hooks are separated by a second distance that is greater than the first distance.

8. The mounting system of claim 1, further comprising:

a first portion of the first leg extending from the wall, the first portion defining a first hinge such that the first leg is flexible relative to the wall, wherein the first portion has a first thickness measured in a lateral dimension;

a second portion of the first leg extending from the first portion, wherein the second portion has a second thickness measured in the lateral dimension, the second thickness being greater than the first thickness; and a third portion of the first leg extending from the second portion to the first free end.

9. The mounting system of claim 8, wherein the first aperture extends through the second portion of the first leg.

10. The mounting system of claim 8, wherein the body is configured such that:

when the head of the clamping fastener is not applying a force to the body, the second portion is oriented at a first angle with respect to a vertical reference plane that bisects the body and extends through the attachment aperture; and when the head of the clamping fastener is applying a force to an outside surface of the second portion of the first leg, the orientation of the second portion changes to a second angle with respect to the vertical reference plane.

11. The mounting system of claim 1, wherein the first interior diameter is at least approximately 8 mm, and the second interior diameter is between approximately 5 mm and 8 mm.

12. The mounting system of claim 1, wherein the upper surface of the wall is generally planar.

13. The mounting system of claim 12, wherein no portion of the body extends above the upper surface of the wall.

14. The mounting system of claim 1, wherein the body is formed by an extrusion process, and wherein the body is of a one-piece construction.

15. The mounting system of claim 1, further comprising a countersink formed in the second inside surface at an intersection with the second aperture, wherein the countersink faces the first aperture.

16. A mounting body selectively engageable to a panel projection extending from a surface of a building, comprising:

a wall with an upper surface and an attachment aperture extending through the upper surface;

a first leg that extends from the wall to a first free end, the first leg comprising:

a first inside surface;

a first portion extending from the wall and having a first thickness measured in a lateral dimension;

a second portion extending from the first portion, the second portion having a second thickness measured in the lateral dimension, wherein the second thickness is greater than the first thickness; and a first aperture formed through the second portion and extending along a first axis through the first leg;

a second leg that extends from the wall to a second free end, the second leg comprising:

a second inside surface facing the first inside surface;

a third portion extending from the wall and having a third thickness measured in the lateral dimension;

a fourth portion extending from the third portion, the fourth portion having a fourth thickness measured in the lateral dimension, wherein the fourth thickness is greater than the third thickness; and a second aperture formed through the fourth portion, wherein the first axis extends through the second aperture; and a receptacle for the panel projection defined by portions of the first and second inside surfaces, the receptacle positioned between the first and second apertures and the first and second free ends of the first and second legs.

17. The mounting body of claim 16, wherein:

the first aperture is unthreaded and has a first interior diameter; and the second aperture has a second interior diameter that is less than the first interior diameter.

18. The mounting body of claim 16, wherein, when the mounting body is in a first position, the first aperture is concentrically aligned with the second aperture.

19. The mounting body of claim 16, wherein the second aperture has an interior thread, and wherein the fourth thickness of the fourth portion is at least about 3 mm.

20. The mounting body of claim 16, further comprising a countersink formed in the second inside surface at an intersection with the second aperture, wherein the countersink faces the first aperture.

\* \* \* \* \*